US006923377B2

(12) United States Patent
Postman et al.

(10) Patent No.: US 6,923,377 B2
(45) Date of Patent: Aug. 2, 2005

(54) PCMCIA INTERFACE CARD FOR COUPLING INPUT DEVICES SUCH AS BARCODE SCANNING ENGINES TO PERSONAL DIGITAL ASSISTANTS AND PALMTOP COMPUTERS

(75) Inventors: Joel R. Postman, Palo Alto, CA (US); George B. Miller, Hingham, MA (US); Ronald C. Fish, Morgan Hill, CA (US)

(73) Assignee: PSC Inc., Eugene, OR (US)

( * ) Notice: Subject to any disclaimer, the term of this patent is extended or adjusted under 35 U.S.C. 154(b) by 108 days.

(21) Appl. No.: 10/365,713

(22) Filed: Feb. 11, 2003

(65) Prior Publication Data

US 2004/0041029 A1 Mar. 4, 2004

Related U.S. Application Data

(63) Continuation of application No. 09/526,710, filed on Mar. 15, 2000, now Pat. No. 6,536,670, which is a continuation of application No. 08/815,006, filed on Mar. 14, 1997, now Pat. No. 6,041,374, which is a division of application No. 08/428,692, filed on Apr. 25, 1995, now Pat. No. 5,671,374, which is a continuation-in-part of application No. 08/236,630, filed on Apr. 29, 1994, now Pat. No. 5,664,231.

(51) Int. Cl.[7] .......... G06K 19/00

(52) U.S. Cl. .......... 235/487; 235/486; 235/475; 235/380

(58) Field of Search .......... 235/375, 380, 235/382, 382.5, 487, 492, 493, 486, 475

(56) References Cited

U.S. PATENT DOCUMENTS 4,323,772 A 4/1982 Serge .......... 235/463
4,550,247 A 10/1985 Winter et al. .......... 235/472
4,621,189 A 11/1986 Kumar et al. .......... 235/472
4,728,784 A 3/1988 Stewart .......... 235/462.15

(Continued)

FOREIGN PATENT DOCUMENTS

JP 1176168 7/1989 .......... H04N/5/225
WO WO 95/22804 8/1995 .......... G06K/9/00

OTHER PUBLICATIONS

Photographs of Norand RT1000 Handheld Data Terminal, manufactured May 1994.
Photograph of the Apple Newton PDA about 1993.
McGee, Ann Marie, "Ten questions worth asking about mobile computing", *Computers in Healthcare,* Dec. 1993, pp. 30–36.

(Continued)

*Primary Examiner*—Karl D. Frech
(74) *Attorney, Agent, or Firm*—Stoel Rives LLP

(57) ABSTRACT

A variety of PC card interfaces to interface from many different types of input devices to Personal Digital Assistants or palmtop computers through PCMCIA slots. The disclosed interfaces can receive data in undecoded format from laser based, wand based or CCD based barcode scanning engines, decode the data to alphanumeric characters and pass the decoded data to the PDA via the PCMCIA 68 pin bus. Other PC card based interfaces are also disclosed which can accept input data in the form of ASCII or EBCDIC characters from virtually any type of input device which a standard serial or parallel output or custom output bus and input that data to the PDA through the PCMCIA bus. Some embodiments use programmed general purpose microprocessors to decode undecoded barcode scan data on the PC card. Other embodiments use custom-programmed, commercially available barcode decoding chips to decode incoming undecoded barcode scan data. Some embodiments of PC card interfaces sample undecoded barcode scan signals and pass the samples to the host through the PCMCIA bus for decoding by a suitably programmed host computer.

9 Claims, 34 Drawing Sheets

U.S. PATENT DOCUMENTS

| | | | | |
|---|---|---|---|---|
| 4,855,581 | A | 8/1989 | Mertel et al. | 235/462 |
| 4,873,426 | A | 10/1989 | Sarna et al. | 235/462 |
| 4,879,456 | A | 11/1989 | Cherry et al. | 235/462 |
| 4,894,522 | A | 1/1990 | Elliott | 235/472 |
| 4,943,868 | A | 7/1990 | Yoshinaga et al. | 358/403 |
| 4,948,955 | A | 8/1990 | Lee et al. | 235/462 |
| 4,972,457 | A | 11/1990 | O'Sullivan | 379/59 |
| 4,983,818 | A | 1/1991 | Knowles | 235/472 |
| 5,015,831 | A | 5/1991 | Eastman et al. | 235/462 |
| 5,043,721 | A | 8/1991 | May | 340/825 |
| 5,111,423 | A | 5/1992 | Kopec, Jr. et al. | 395/500 |
| 5,115,120 | A | 5/1992 | Eastman | 235/462 |
| 5,132,871 | A | 7/1992 | Densham et al. | 361/380 |
| 5,134,648 | A | 7/1992 | Hochfield et al. | 379/98 |
| 5,139,439 | A | 8/1992 | Shie | 439/359 |
| 5,155,343 | A | 10/1992 | Chandler et al. | 235/462 |
| 5,183,404 | A | 2/1993 | Aldous et al. | 439/55 |
| 5,187,612 | A | 2/1993 | Plesko | 359/896 |
| 5,189,287 | A | 2/1993 | Parienti | 235/375 |
| 5,189,291 | A | 2/1993 | Siemiatkowski | 235/472 |
| 5,196,685 | A | 3/1993 | Izumi | 235/462 |
| 5,200,597 | A | 4/1993 | Eastman et al. | 235/455 |
| 5,207,586 | A | 5/1993 | MacGregor et al. | 439/76 |
| 5,216,231 | A | 6/1993 | Ouchi | 235/463 |
| 5,218,187 | A | 6/1993 | Koenck et al. | 235/375 |
| 5,227,614 | A | 7/1993 | Danielson et al. | 235/480 |
| 5,227,953 | A | 7/1993 | Lindberg et al. | 361/393 |
| 5,239,662 | A | 8/1993 | Danielson et al. | 395/800 |
| 5,241,542 | A | 8/1993 | Natarajan et al. | 370/95.3 |
| 5,242,310 | A | 9/1993 | Leung | 439/76 |
| 5,245,167 | A | 9/1993 | Takenaka | 235/462 |
| 5,287,456 | A | 2/1994 | Rhodes et al. | 395/200 |
| 5,305,181 | A | 4/1994 | Schultz | 361/680 |
| 5,313,053 | A | 5/1994 | Koenck et al. | 235/472 |
| 5,357,092 | A | 10/1994 | Lee | 395/309 |
| 5,369,264 | A | 11/1994 | Rosa et al. | 235/462 |
| 5,371,347 | A | 12/1994 | Plesko | 235/462.15 |
| 5,404,493 | A | 4/1995 | Bolme et al. | 395/200 |
| 5,457,601 | A | 10/1995 | Georgopulos et al. | 361/686 |
| 5,468,952 | A | 11/1995 | Alexander et al. | 235/492 |
| 5,481,616 | A | 1/1996 | Freadman | 381/90 |
| 5,497,464 | A | 3/1996 | Yeh | 395/200.01 |
| 5,506,394 | A | 4/1996 | Plesko | 235/472 |
| 5,519,577 | A | 5/1996 | Dudas et al. | 361/737 |
| 5,519,851 | A | 5/1996 | Bender et al. | 395/500 |
| 5,521,369 | A | 5/1996 | Kumar | 235/472 |
| 5,543,610 | A | 8/1996 | Bard et al. | 235/462 |
| 5,550,367 | A | 8/1996 | Plesko | 235/472 |
| 5,596,442 | A | 1/1997 | Plesko | 359/199 |
| 5,596,446 | A | 1/1997 | Plesko | 359/214 |
| 5,656,805 | A | 8/1997 | Plesko | 235/472 |
| 5,659,800 | A | 8/1997 | Zhang et al. | 395/832 |
| 5,664,231 | A | 9/1997 | Postman et al. | 395/893 |
| 5,671,374 | A | 9/1997 | Postman et al. | 395/309 |
| 5,691,528 | A | 11/1997 | Wyatt et al. | 235/462 |
| 5,880,452 | A | 3/1999 | Plesko | 235/472 |
| 5,902,991 | A | 5/1999 | Kumar | 235/492 |
| 5,974,162 | A | 10/1999 | Metz | 382/124 |
| 6,036,093 | A | 3/2000 | Schultz | 235/462.44 |
| 6,036,098 | A | 3/2000 | Goldman et al. | 235/486 |
| 6,041,374 | A | 3/2000 | Postman et al. | 710/73 |

OTHER PUBLICATIONS

"LaserData Unmanned Scanners Power Record Order Turnaround for JC Penny", *Automatic I.D. News,* vol. 10, No. 5, May 1994.

"Supertags Could Be Part of Consumer Future", *Automatic I.D. News,* vol. 10, No. 5, May 1994.

Brochure Telxon PTC–600 Handheld Data Terminal (1992).

Brochure for Telxon PTC–860RF portable micro computer, no date.

Rose Philip, "PCMCIA", PC Sources Journal, vol. 4, No. 6, Jun. 1993, pp. 114–120.

"NPD/Nielsen Reshapes the Future of Home–Based Market Research", *Real Times,* vol. 3, No. 2, 1991.

"PTCs Speed POS Conversions at Woolworth Corporation", *Real Times,* vol. 3, No. 2, 1991.

"Coupon Clearing Blasts into Present", *Automatic I.D. News,* vol. 10, No. 5, May 1994.

"Telxon Touch Screen Technology Captures Customers' Approval", *Real Times,* vol. 3, No. 2 1991.

Ikeya, Brian "PCMCIA Current Topics" http://www.pc–card.com, visited Aug. 23, 2000.

Ikeya, Brian, "PC Card Technology Primer", (1998), http://www.pc–card.com/pccard.htm, visited Aug. 23, 2000.

Ikeya, Brian "CardBus Information", (1998), http://www.pc–card.com/cardbus.htm, visited Aug. 23, 2000.

Ikeya, Brian "Miniature Card Technology Primer", (1998), http://www.pc–card.com/miniaturecard.htm, visited Aug. 23, 2000.

Ikeya, Brian "SmartMedia Technology Primer", (1998), http://www.pc–card.com/smartmedia.htm.

Ikeya, Brian "PCMCIA Bookstore", (1998), http://www.pc–card.com/bookstore.htm, visited Aug. 23, 2000.

Press Releases (for PCMCIA) (1998), (the press releases indicating various dates from 1995–2000), http://www.pc–card.com/press.htm, visited Aug. 23, 2000.

Ikeya, Brian "CardBay Information: Executive Summary of CardBay: Blueprint for Tomorrow's Modular Mobile Add–In Technology by Claude A. Cruz and Ken Stufflebeam", http://www.pc–card.com/cardbay.htm, visited Aug. 23, 2000.

Claude A. Cruz and Ken Stufflebeam "CardBay: Blueprint for Tomorrow's Modular Mobile Add–In Technology", Aug. 19, 1999, pp. 1–10 accessed from http://www.pc–card.com/cardbay.htm, visited Aug. 23, 2000.

Ikeya, Brian "About PCMCIA", (1998), http://www.pc–card.com/about.htm, visited Aug. 23, 2000.

Ikeya, Brian "PCMCIA Membership Application", (1998), http://www.pc–card.com/application.htm, visited Aug. 23, 2000.

Ikeya, Brian "Board of Directors and Staff", (1998), http://www.pc–card.com/board.htm, visited Aug. 23, 2000.

Ikeya, Brian "PCMCIA International", (1998), http://www.pc–card.com/international.htm, visited Aug. 23, 2000.

Ikeya, Brian "PCMCIA PC Card Standard Reciprocal Grant of Immunity and Sublicense", (1998), http://www.pc–card.com/grant.htm, visited Aug. 23, 2000.

Ikeya, Brian "Benefits of Membership", (1998), http://www.pc–card.com/benefits.htm, visited Aug. 23, 2000.

Ikeya, Brian "Modular Peripheral Events", (1998), http://www.pc–card.com/meetings.htm, visited Aug. 23, 2000.

Ikeya, Brian "PCMCIA PlugFest Interoperability Workshop General Information", (1998), http://www.pc–card.com/plugfest.htm, visited Aug. 23, 2000.

Ikeya, Brian "PCMCIA Member List", (1998), http://www.pc–card.com/directory/mem–list.html, visited Aug. 23, 2000.

Ikeya, Brian "PCMCIA Mission Statement and Strategic Objectives", (1998), http://www.pc–card.com/mission.htm, visited Aug. 23, 2000.

Ikeya, Brian "PCMCIA Technical Activities", (1998), http://www.pc–card.com/activities.htm, visited Aug. 23, 2000.

Ikeya, Brian "Frequently Asked Questions About PC Card Technology", (1998), http://www.pc–card.com/faq.htm, visited Aug. 23, 2000.

Cruz, Claude A. "New Bus Architectures: How CardBus Fits with IEEE 1394, USB, PCI and Others", ©1997 PCMCIA accessed from http://www.pc–card.com/papers/new__bus.htm, visited Aug. 23, 2000.

Lempesis, Bill "The Future of PC Card Technology", © PCMCIA Mar. 1997 accessed from http://www.pc–card.com/papers/future.htm, visited Aug. 23, 2000.

Gerber, Maria "Thermal Management for PC Cards", © PCMCIA Sep. 1996, accessed from http://www.pc–card.com/papers/thermal.htm, visited Aug. 23, 2000.

Pathak, Sanjiv "The Zoomed Video Port for PC Cards", © PCMCIA Mar. 1996 accessed from http://www.pc–card.com/papers/zv.htm, visited Aug. 23, 2000.

"CardBus—The 32–bit PC Card Option", © PCMCIA 1995 accessed from http://www.pc–card.com/papers/cardbus.htm, visited Aug. 23, 2000.

"DMA Support in the PC Card Standard", © PCMCIA 1995 accessed from http://www.pc–card.com/papers/dma.htm, visited Aug. 23, 2000.

McLean, Pete "The 3.3 Volt Option in PC Cards", © PCMCIA 1994 accessed from http://www.pc–card.com/papers/lowvolt.htm, visited Aug. 23, 2000.

"Multiple Function PC", © PCMCIA 1995 accessed from http://www.pc–card.com/papers/multfunc.htm , visited Aug. 23, 2000.

Stufflebeam, Ken "Power Management Support in the PC Card Standard", © PCMCIA 1994 accessed from http://www.pc–card.com/papers/powman.htm , visited Aug. 23, 2000.

"PC Card Resource Directory", © 2000 PCMCIA accessed from http://www.pcmcia.oaktree.com/main.cfm, visited Aug. 23, 2000.

Ikeya, Brian "Ask PCMCIA", (questions and answers dated 1997–1999) http://www.pc–card.com/askpcmcia.htm , visited Aug. 23, 2000.

Ikeya, Brian "PCMCIA Bookstore", (1998) http://www.pc–card.com/bookstore.htm , visited Aug. 23, 2000.

Ikeya, Brian "PC Card Technical Support", (1998) http://www.pc–card.com/techsupport.htm , visited Aug. 23, 2000.

Ikeya, Brian "Tuple ID Registration", (1998), http://www.pc–card.com/tupleid.htm , visited Aug. 23, 2000.

Ikeya, Brian "Links"(to PC–Cards sites and usenet newsgroups) (1998), http://www.pc–card.com/links.htm , visited Aug. 23, 2000.

News Release: "Symbol Technologies, Inc. Announces Hand–Held Pen Computer with Integrated Bar Code Scanner", Symbol Technologies, Inc. Bohemia, NY (Jan. 4, 1003).

"Leading the Pack with PCMCIA Cards," *Memory Card,* undated.

Brochure for "MobileWand 400 Bar Code Reader for PDA's", TPS Electronics (about Dec. 1993).

PCMCIA INTERFACE CARD FOR COUPLING INPUT DEVICES SUCH AS BARCODE SCANNING ENGINES TO PERSONAL DIGITAL ASSISTANTS AND PALMTOP COMPUTERS

RELATED APPLICATIONS

This is a continuation of U.S. patent application Ser. No. 09/526,710, filed Mar. 15, 2000, now U.S. Pat. No. 6,536,670, issued Mar. 25, 2003, which was a continuation of U.S. patent application Ser. No. 08/815,006, filed Mar. 14, 1997, now U.S. Pat. No. 6,041,374, which was a divisional of U.S. patent application Ser. No. 08/428,692, filed Apr. 25, 1995, now U.S. Pat. No. 5,671,374 issued Sep. 23, 1997, which was a continuation-in-part of U.S. patent application Ser. No. 08/236,630, filed Apr. 29, 1994, now U.S. Pat. No. 5,664,231 issued Sep. 2, 1997.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71 (d).

COMPUTER PROGRAM LISTING APPENDIX

This application includes a computer program listing appendix on a single compact disc, the contents of which are herein incorporated by reference. The compact disc contains four files; a 5.73 kb file entitled 09-526710-1, a 9.05 kb file entitled 09-526710-2, a 22.8 kb file entitled 09-526710-3, and a 3.47 kb file entitled 09-526710-4, each created on Aug. 6, 2002.

BACKGROUND OF THE INVENTION

The invention pertains to the field of input devices for handheld computers in general, and to PCMCIA defined PC card interfaces between barcode scanning devices and other input devices and portable computers in particular.

Portable barcode scanning systems are useful for many applications such as inventory control. Portable barcode scanning systems exist in the prior art and are commercially available from such vendors as Symbol Technologies, Inc. of Bohemia, N.Y. and Telxon. To date however portable barcode scanners have been custom units of proprietary design. An example of a custom designed, proprietary portable barcode scanning system is the model PTC-600 available from Telxon. This device uses a custom designed portable computer to which is attached a clip-on barcode scanning engine. This technology is described in more detail in U.S. Pat. No. 4,621,189, the teachings of which are incorporated by reference. However the process of decoding barcodes is well known and can be done by any suitably programmed computer having appropriate interface circuitry so there is no need to buy a custom designed computer system simply to do one type of task when a general purpose computer with suitable peripheral circuitry and software can do the same task as well as other tasks. Further, there is a disadvantage to the consumer in that as better barcode scanning engines or better computers become available, the consumer is precluded from using them in a custom designed system unless he or she is willing to give up their investment in the custom designed system already purchased.

With the introduction of palmtop computers, Personal Communicators such as the AT&T EO and Personal Digital Assistants (hereafter PDA's) there has arisen a need to modify these general purpose devices for use with various input devices such as barcode scanning engines to create "open system" non-proprietary portable barcode scanning apparatus.

Therefore, there is described herein an open system interface for various input devices such as bar code scanners, magnetic stripe readers etc. which can be integrated onto a PCMCIA defined PC card.

SUMMARY OF THE INVENTION

The teachings of the invention contemplate a genus of interfaces for portable laser-scanning, charge coupled device and wand type barcode scanning engines, magnetic stripe and magnetic ink readers, keyboards or 10-key keypads, optical character recognition devices, and trackballs using PCMCIA defined PC cards to interface these devices with host PDA's or palmtop computers.

The advantages of implementing interfaces for frequently used input devices on industry standard PC cards are plentiful. First and foremost is the fact that such an "open system" combination gives the user the advantage of not being locked into a proprietary technology that can become obsolete in a matter of months in the fast moving world of high tech electronics. What this means to a user is that when a better PDA or palmtop computer comes out, the user does not have to buy all new input devices designed specifically to work only with that computer as long as the new computer has an industry standard PC card slot. Thus, if the manufacturer of the new computer does not offer a proprietary CCD or laser based barcode scanner, the user is not precluded from using such an input device as long as the new computer has a PC card slot. Likewise, when a new input device with better features appears on the market, the user is not precluded from switching to the new input device for use with his or her existing PDA so long as he or she has a PC card implementing an appropriate interface for the new input device to convert the output of the new input device to signals on 68 pin bus defined by PCMCIA standards accepted industry wide.

In one embodiment of the interface for a laser type barcode scanning engine, the PCMCIA defined PC card has attached thereto a housing which contains a visible light laser diode, scanning optics and a photodetector. The scanning optics scan a laser beam across a barcode and detect reflected light. In some embodiments, the PCMCIA defined PC card has circuitry integrated thereon to sample the analog signal from the photodetector and create a digital image thereof in memory and decode the digital image in memory into an ASCII or EBCDIC character string representing the alphanumeric text encoded into the barcode (ASCII or EBCDIC are industry standard codes that define for each alphanumeric character a unique string of 1's and 0's that are a binary code for that character). In addition there is circuitry integrated on the PCMCIA defined PC card to send the decoded data from the photodetector to the host PDA for use by an application program in execution thereon.

In some embodiments, the PC card interface contains circuitry to sample TTL level or wand type signals from an input device and send the sample data to a host computer through the PCMCIA slot. The host computer then decodes alphanumeric characters from the sample data.

In other embodiments, the PC card interface contains circuitry to make the TTL level or wand type signal available on a pin of the PCMCIA bus where the host periodically samples the voltage level on the pin and creates a sample buffer. The alphanumeric characters encoded in the samples are then decoded by the host computer.

In one embodiment, the signal from an undecoded barcode scan engine or other input device that outputs electrical signals that encode alphanumeric characters is coupled to a specially programmed decoder chip on the PC card. The barcode scan engine or other input device is either external to the PC card or physically mounted thereon. The decoder chip decodes the electrical signals into alphanumeric characters and generates an interrupt to the host computer through a pin on the PCMCIA bus. The host computer then does an I/O transaction to the PC card to retrieve the decoded data. In one particularly useful species of this genus, the PC card includes nonvolatile memory which may be accessed by the host computer through the PCMCIA bus without blocking access to the decoder through the PCMCIA bus. In this way, host computers that are memory limited like PDA's may replace their PC memory card with a barcode decoder PC card having on-board nonvolatile memory and have the benefit of both PC card barcode decoding (or access to data from other types of input devices) while not losing the benefit of also have external nonvolatile memory which may be used for any purpose.

Additional aspects and advantages of this invention will be apparent from the following detailed description of preferred embodiments, which proceeds with reference to the accompanying drawings.

DETAILED DESCRIPTION OF PREFERRED EMBODIMENTS

Figure 1:
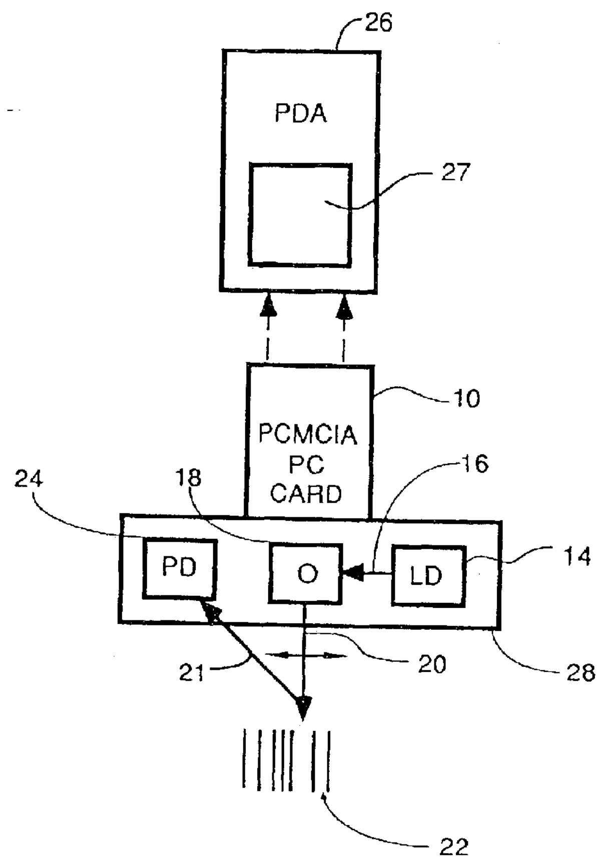
FIG. 1 is a diagram of a PC card with integrated laser based barcode scanning engine.

Referring to FIG. 1, there is shown a diagram of the one species of a portable laser-based barcode scanner peripheral with a PCMCIA PC card interface within with the genus of the invention. The peripheral comprises a PCMCIA defined PC card 10 which has integrated thereon an interface circuit for a portable laser based barcode scanning engine mounted within a housing 13 which is permanently affixed to the PC card. PC cards are small removable peripheral devices for portable computers which are roughly the size of a credit card (2.126"×3.37") but have different thicknesses. A type I card has a thickness of approximately 3.3 millimeters (mm) while Type II and Type III cards have thicknesses of 5 mm and 10.5 mm, respectively. The PCMCIA "PC card" standards incorporated by reference herein cover physical dimensions, pin assignments, electrical specifications, protocols and file formats. PC cards interface with 8 and 16 bit buses and support physical access to up to 64 megabytes of memory. The interface circuit on the PC card can be designed in any one of many different ways, and the general principles of interfacing to microcomputers are known. Many very good publications exist in this area, one of which is "Microcomputer Interfacing" by Bruce Artwick (Prentice Hall, Englewood Cliffs, N.J.) 1980 ISBN 0-13-580902-9 which is hereby incorporated by reference.

PC card 10, and all the other PC cards in other embodiments disclosed herein, is compatible with PCMCIA PC card Standards including PC card Standard Release 2.01, Socket Services Specification Release 2.0, Card Services Specification Release 2.0, ATA Specification Release 1.01, AIMS Specification Release 1.0 and the Recommended Extensions Release 1.0, all of which are incorporated by reference herein.

Incorporating an interface for any input device, and especially a barcode scanning engine on a PC card for a PDA such as the Apple Newton(tm) using open systems standards has several advantages. First, such a portable barcode scanning system can be less expensive since the general purpose devices are mass produced such that economies of scale and other price erosion factors such as rapid obsolescence apply to hold the price down and to lower the price over time. Second, it is possible with an open system interface to avoid locking customers into a particular vendor or into a particular technology which rapidly becomes obsolete in the fast paced world of high technology electronics. If the barcode scanner interface or interface for other input device such as a magnetic strip reader etc. is integrated into a PCMCIA defined PC card such that the input device can communicate with the host PDA/palmtop via an industry standard PCMCIA bus, the user may simply slip the PCMCIA defined PC card interface into another palmtop or PDA when a new generation input device or PDA becomes available. This same concept means rapid turnaround time for maintenance in case of failure of the input device or PDA.

Returning to the discussion of PCMCIA based barcode scanning engine, the barcode scanning engine input device uses a visible light or infrared laser diode 14 to generate a beam of visible, coherent light 16 which is coupled to the input of known scanning optics 18. If an infrared laser diode is used, a spotter beam or light source that is comprised of visible light and which is directed by the same scanning optics used by the laser is usually used. The purpose of the scanning optic system 18 is to receive the light beam 16 and to focus the beam down to a small spot size and to scan the output beam across a barcode 22 located at a reference plane which is anywhere from less than an inch to several feet away from the laser scanning engine. The scanning optics 18 should focus the output beam 20 down to a spot size at the reference plane where barcode 22 exists which is small enough to resolve the light and dark patterns of barcode 22.

An acceptable spot size at the reference plane would be approximately 6–12 mils across.

Further, the scanning optics might and usually does scan the output beam 20 through a range of movement at the focal plan which is large enough to span any barcode to be scanned. Typically, barcodes are less than two inches across, although in some applications, they can be wider. The scanning optics 18 should cause the output beam 20 to be focussed at a focal plane which far enough away from the scanner to give the scanner a useful range such that barcodes can be scanned at a distance without having the scanner in physical contact with the barcode. Generally, this range is from about two inches up to about two feet although longer ranges are desirable in some applications. Further, the scanning optics 18 should focus the output beam at the reference plane such that the output beam has a sufficiently large depth of field that the barcode does not have to be located exactly at the focal plane to be decoded. Generally, the depth of field, should be made as large as possible, and an acceptable depth of field would be about from one to twenty inches on either side of the focal plane with a focal plane located about three to four inches away from the scanner.

A suitable optical system 18 to focus a output beam from a laser diode is disclosed in U.S. Pat. No. 5,021,641 which is hereby incorporated by reference as one of many possible embodiments for the laser scanning engine within housing 13. In one embodiment of the input device structure shown in FIG. 2, a visible laser diode is substituted for the invisible light laser diode of U.S. Pat. No. 5,021,641 and the visible light source and 3-state trigger of that patent are eliminated. A software trigger to be described below or no trigger mechanism at all is substituted. The optical system taught in U.S. Pat. No. 5,021,641 uses an aperture stop which is circular and approximately 1.2 millimeters in diameter to cut down the cross section of the output beam from the laser diode to acceptable limits. This aperture stop is located from about 9.7 millimeters to 9.2 millimeters away from the emitter of the laser diode.

The system disclosed in U.S. Pat. No. 5,021,641 utilizes a laser diode which does not emit visible light. This is inconvenient to users who must aim the scanning beam such that it traverses the barcode but who do not know the path the beam is travelling because of its invisible nature. Therefore, to improve the user interface, the optical system taught in U.S. Pat. No. 5,021,641 includes a trigger activated visible light aiming system and a movable scanning mirror.

Reflected light from the barcode being scanned, represented by vector 21 is detected by photodiode 24 and an analog signal is generated for decoding by interface circuitry on the PC card 10. The PC card 10 slips into either a type II, or III PCMCIA slot of a personal digital assistant (PDA) or palmtop computer 26 which hereafter will be referred to as the portable host or the host.

The portable host 26 has a CPU and associated control program (not separately shown), a display 27 and possibly a keyboard. In one embodiment, the PDA is an Apple Newton Model 110 with a pen based display user input system. The CPU and associated control program of the portable host can do the decoding of the barcode in some embodiments such as the embodiments shown in FIGS. 23 and 24, but in the preferred embodiment, the decoding is done by a microprocessor on the PC card interface circuit 10. Decoding of the barcode by the PDA CPU is done by reading digital data representing a "digitized image" of the barcode pattern from a memory in the PC card 10 and analyzing the ratios between the lengths of the various light and dark spaces. The "digitized image" as that phrase is used herein for one dimensional barcodes means a string of logical 1's and 0's stored in sequential memory locations which encode the transition between light and dark and the relative spacing between these transitions as opposed to actual analog-to-digital conversion of the analog values of a video signal at a plurality of pixels.

Figure 2:
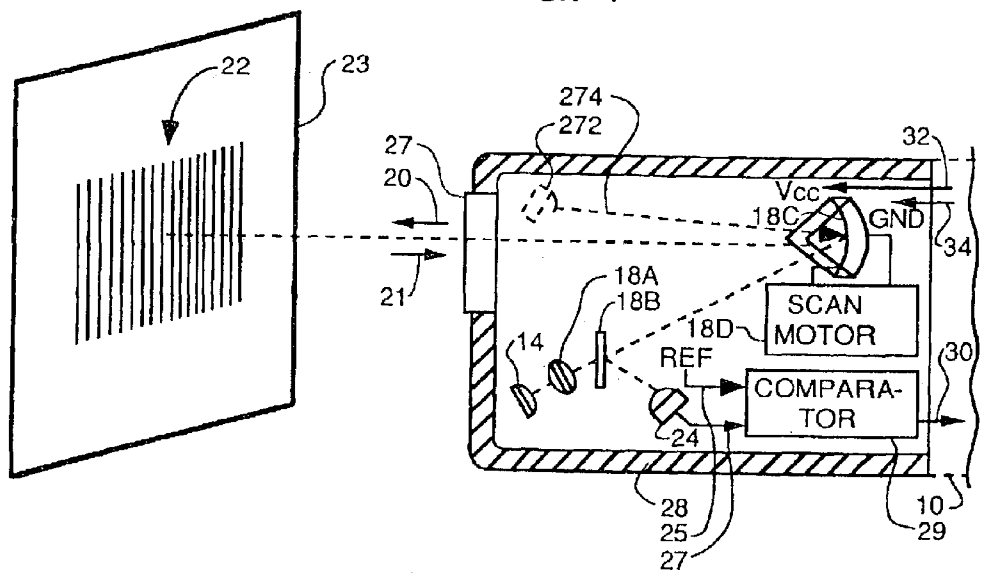
FIG. 2 is a cross-sectional diagram of a typical laser diode based barcode scanning engine that can be integrated within a housing affixed permanently or by clip-on connection to a PC card.

Referring to FIG. 2, there is shown a drawing of one embodiment for a visible light laser diode barcode scanning engine which can be embodied within housing 13. Although the particular details of the construction and arrangement of the laser barcode scanning engine are not critical to the invention, the arrangement of FIG. 2 is one structure that is contemplated to be within the teachings of the invention. A semiconductor visible light laser diode 14 emits a coherent light beam when scanning of a barcode starts. The light beam is focussed by a lens 18A and passes through a partially silvered mirror 18B. The light beam generated by the laser diode exits the partially silvered mirror and impinges upon a scanning mirror 18C which is driven in an oscillatory pattern by a scanning motor 18D. The scanning motor 18D may be a stepper motor, a piezoelectric motor, one or more bimorphs, a D.C. motor, one or more solenoids, a mylar film resonant motor or any other source of motive power which can oscillate the mirror 18C at the desired scan rate. The scan rate can be any desired rate, but generally 200 scans per second is typical. The resultant scanning laser beam 20 exits a light-transmissive window 27 and scans repeatedly across a barcode symbol 22 located at a reference plane 23. Reflected light, symbolized by arrow 21 re-enters housing 28 through light-transmissive window 27 and impinges upon scanning mirror 18C where it is reflected toward partially silvered mirror 18B. A portion of the reflected light is deflected into the input aperture of photodiode 24 where the intensity of the reflected light over time is converted into an analog signal called HHLC. This conversion is done by comparator 29 which receives the raw analog signal from the photodiode on line 27 and compares the voltage thereof to a reference voltage on line 25. The reference voltage is set at a level such that if the analog voltage on line 27 is higher than the reference voltage, the reflected light which generated that voltage level on line 27 was, in all probability, light from a white space portion of the barcode being scanned. If the analog voltage on line 27 is lower than the reference voltage, it is likely that the reflected light was from a dark portion of the barcode. The comparator 29 outputs a TTL level signal which switches states from logic 1 to logic 0 each time the voltage level on line 27 drops below the reference voltage level and which transitions from logic 0 to logic 1 each time the voltage on line 27 rises above the level of the reference voltage.

More detail about the structure depicted in FIG. 2, the structure of the scanning motor and the shock resistance thereof, can be gleaned from study of U.S. Pat. No. 5,198,651 which is hereby incorporated by reference. Details of other laser scanning engines which are exemplary of the types of laser scanning engines which may be incorporated within housing 28 are given in U.S. Pat. No. 4,387,297, U.S. Pat. No. 4,760,248, U.S. Pat. No. 4,409,470, and U.S. Pat. No. 4,652,750, all of which are hereby incorporated by reference.

In some species within the scope of the genus of the invention, circuitry will be included within housing 28 to decode the HHLC signal output from the laser scanning engine within housing 28 and output the ASCII or EBCDIC alphanumeric characters to interface circuitry on the PC card. The PC card interface then buffers these characters in memory and generates an interrupt to the portable host alerting the host that decoded barcode characters are available in the memory of the PC card to be read. The nature of this decoding circuitry and the interface circuitry will be apparent to those skilled in the art from a study of the interface circuitry of FIG. 3 which describes the interface circuitry which performs these same functions on the PC card.

Figure 3:
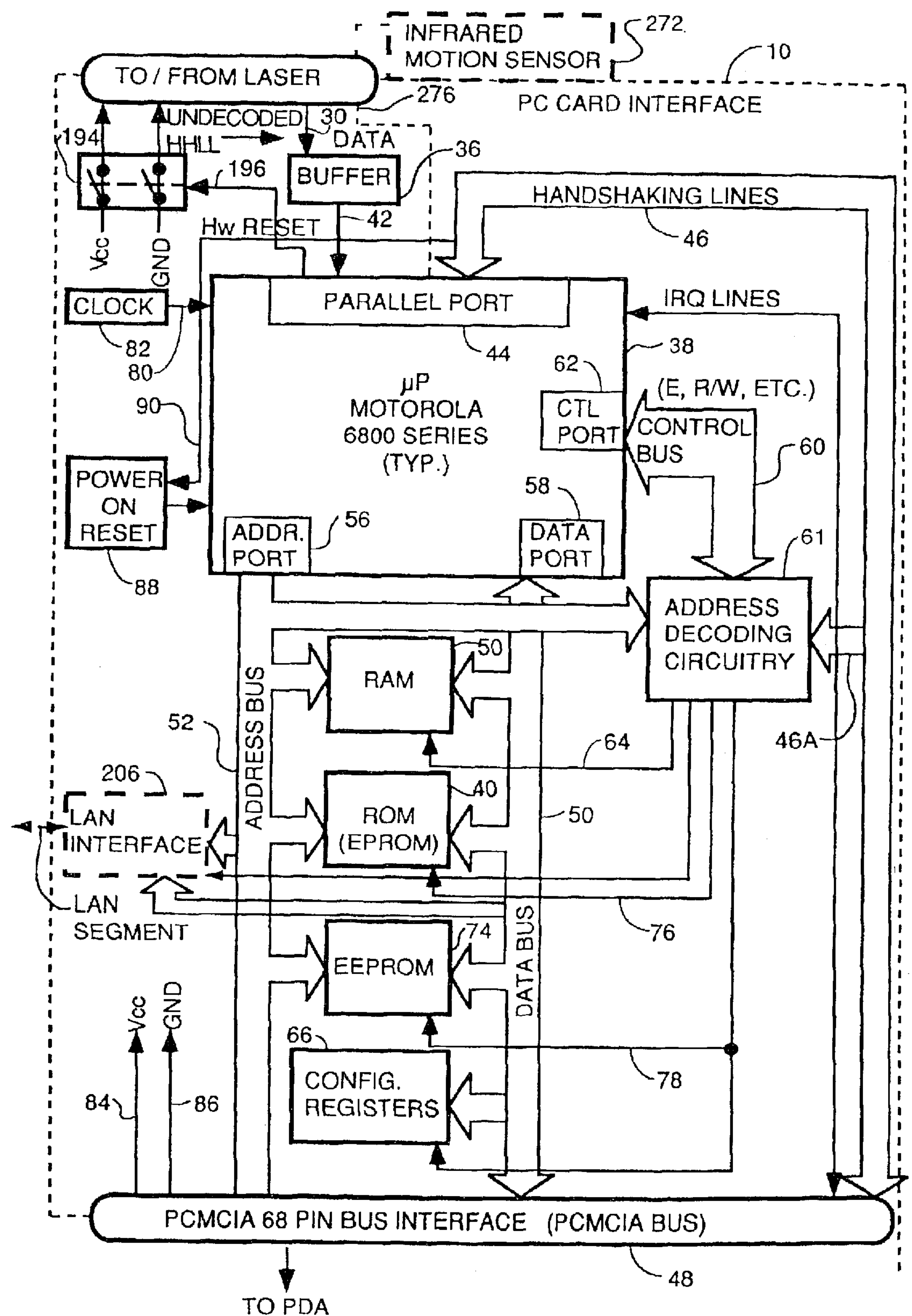
FIG. 3 is a block diagram of one embodiment of a PC card interface circuit for interfacing to an input device such as laser based barcode scanning engine which outputs undecoded binary data.

Referring to FIG. 3, there is shown a block diagram of one embodiment of the interface circuitry within PC card 10 for an embodiment where the output of the laser scanning engine is not decoded when it arrives at the PC card and is decoded by circuitry on the PC card. The undecoded HHLC signal from the photodiode 24 arrives on line 30. Vcc power and signal ground are supplied to the input device components within housing 28 from the PC card via lines 32 and 34. The undecoded signal on line 30 is buffered and level shifted if necessary by amplifier 36 to condition the signal for sampling by microprocessor 38. The microprocessor executes a decoding program encoded in read only memory 40. ROM 40 may also be EPROM, and, preferably, is Intel Flash EPROM. The details of the decoding program are given in the flow chart of FIGS. 6A through 6C, which will be described further below. Under control of the decoding program, the microprocessor 38 samples the HHLC data on line 42 from the output of the buffer 36. Typically, the microprocessor 38 is any of a number of different microprocessors.

The signal on line will be essentially a binary representation of the barcode being scanned in that it will be logic 1 for times when the laser beam is impinging upon and reflecting from white spaces and logic 0 when the laser beam is impinging upon and reflecting from dark portions of the barcode (or vice versa). The amount of time the signal on line 42 is logic 1 and logic 0 is determined by the pattern of the barcode and the speed of scanning. However the alphanumeric information encoded within the barcode is usually encoded by the ratios of light to dark spaces, so the relative times that the signal on line 42 is logic 1 and logic 0 is what is important.

The signal on line 42 is sampled at one pin of a parallel port 44. Other pins of this parallel port are coupled to various handshaking lines on bus 46. This handshake bus is coupled to the 68 pin edge connector PCMCIA defined PC card bus/interface 48 hereafter referred to as the PCMCIA Bus 48. In the presently considered embodiment, the decoded alphanumeric data from the barcode will be passed to the PDA by placing the alphanumeric data in random access memory 50 (hereafter RAM) and notifying the PDA to retrieve the data from the RAM 50. RAM 50 is coupled to a shared address bus 52 and a shared data bus 50, both of which are coupled to the microprocessor 38 address and data ports, respectively, and the address and data lines of the PCMCIA Bus 48. RAM 50 is memory mapped in the Common Memory address space shared by both the PDA 26 and the microprocessor 38. This Common Memory address space is defined by the PCMCIA standards that have been incorporated by reference herein. The signals on the handshake bus 46 are used to control whether the microprocessor 38 or the PDA has control of the shared address bus 52 and the data bus 54 coupled to the RAM 50 at any particular time so as to prevent bus conflicts. No bus arbitration is necessary in most embodiments, although a separate bus arbitration chip is within the genus of the invention for alternative embodiments.

One manner of using the handshaking signals on the handshake bus is for the microprocessor 38 to assert a Ready/Busy signal on bus 46 when microprocessor 38 is busy writing decoded data to the RAM 50 and does not want to be interrupted. This restricts the PDA's access to the PC card until microprocessor 38 is finished writing a decoded message to RAM 50. Decoded alphanumeric data is written to RAM 50 by microprocessor 38 by using address port 56 to output on address bus 52 the address of the storage location in RAM 50 with a decoded alphanumeric character to be written or programmed. To select RAM 50 and control the read/write mode thereof, the microprocessor 38 writes appropriate control signals on control bus 60 via control port 62 to address decoding circuitry 61. The address decoder 61 receives the read/write control signals on control bus 60 and the address from address bus 52, determines that the address is in the address space occupied by RAM 50 and activates chip select and read/write control signals on bus 64 to select RAM 50 and place it in write mode. The data to be written is placed on data bus 50 via data port 58 and will then be placed by RAM 50 into the desired storage location.

A complete message as that term is used herein represents all or some selected subset of the data encoded within the barcode that has been scanned. In one embodiment, when a complete message has been decoded and written into RAM 50, the microprocessor 38 notifies the PDA 26 to retrieve the data. To do this, the microprocessor 38 activates some signal that will be detected by the PDA and passes the PDA pointer and length information. The pointer information comprises a pointer address indicating where in the Common Memory address space, the message starts. The length information indicates how many storage locations need to be read to get the complete message.

In alternative embodiments for some nonstandard and rarely used barcodes, the microprocessor 38 notifies the PDA each time any character from the message has been written into RAM 50.

Notification of the PDA of the existence of a decoded message is done by either activating an interrupt signal on the handshaking bus 46 or by setting a bit in one of the configuration registers 66 that is periodically polled by the PDA.

The configuration registers 66 comprise a Configuration Option register and a Card Configuration and Status Register. The Card Configuration and Status Register is located two bytes above the Configuration Option register in the Attribute Memory space (see FIG. 4 for the details of the three PCMCIA defined regions in the address space of a PC card). The Card Configuration and Status Register provides the PDA with a mechanism to control a Status Changed Signal, an Audio Signal and a Power Down Request. It also provides status information in the "set" or "not set" states of certain bits defining a Status Changed State and an Interrupt Request State.

In one embodiment, the PC card notifies the PDA of the existence of a message to be picked up by asserting a Level Mode Interrupt signal on the handshake signal bus 46.

The microprocessor 38 can be interrupted by the PDA via an IRQ signal line 70. Such an interrupt request could be asserted by the PDA, for example, when the PDA has control of the shared address and data buses 52 and 50, respectively, so as to prevent the microprocessor 38 from attempting to take control of these shared buses. The interrupt service routine of the microprocessor 38 would put the microprocessor in a suspended state where no processing is carried out since it is not possible for the microprocessor 38 to access program instructions from ROM 40 while the PDA has control of the shared buses 50 and 52.

Chip selection of ROM/EPROM 40 and EEPROM 74 to activate these memories and read/write control of EEPROM 74 is carried out via control bus 60, address decode circuitry 61 and buses 76 and 78, respectively. EEPROM 74 is used to store PC card Information Structure (CIS) data in conformity with PCMCIA standards, said CIS data defining the formatting and organization of data on the PC card. In this way, any new PDA can read the CIS data to determine the format and organization of data stored in the PC card to insure compatibility of the laser based barcode scanner across multiple platforms having standard PCMCIA slots.

The microprocessor 38 receives a clock signal on line 80 from clock 82. Power and ground connections are supplied to the PC card from the PDA via lines 84 and 86, respectively from the PCMCIA Bus 48. At power up time, a Power On Reset circuit 88. A PCMCIA hardware reset signal on line 90 from the handshake signal bus 46 causes the PC card to be reset under control of the PDA in case of a trap or other need to reset the program counter (not separately shown) of the microprocessor 38 back to its initial state. The socket services software layer described below can cause a hardware reset by asserting a Reset signal (not shown but part of the handshake signal bus 46) to the PC card. A hardware reset automatically puts the PC card in Memory Only Interface mode (as opposed to I/O mode) and it resets the Configuration Option Register to 00 Hex (00H). Other configuration registers and the Ready/Busy signal on the Handshake Signal bus 46 are also affected as described in the PCMCIA PC card Document which is incorporated herein by reference.

Figure 4:
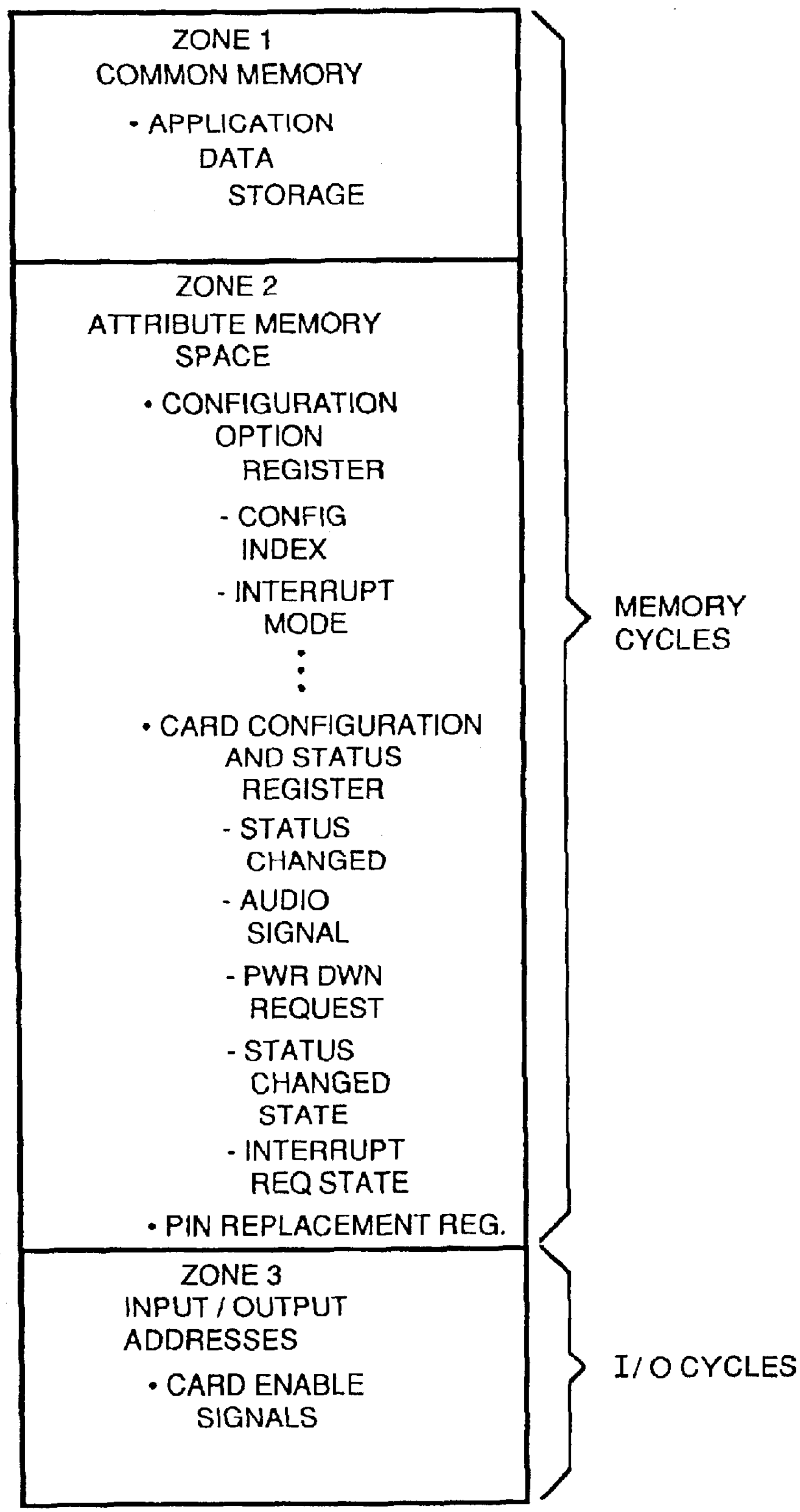
FIG. 4 is a memory map of the three memory zones of the PC card interfaces disclosed herein.

Referring to FIG. 4, there is shown a memory map of the three zones in the address space defined for a PC card by the PCMCIA Standards. Zone 1 is the Common Memory Space mentioned earlier. This shared memory space can be accessed either by the PC card microprocessor 38 or by the PDA through a Memory Cycle as that term is defined in the PCMCIA Standards. The Common Memory Space may be used in some embodiments to store data such as the decoded data from the barcode and is used in one embodiment as the principal interprocess data path between the decoding process in execution on the PC card and any application process in execution on the PDA which needs the decoded data. In other embodiments, the decoded data can be transferred to the PDA through Input/Output cycles. The Common Memory Space is also used in the preferred embodiment for the nonvolatile memory on the PC card which any application running on the PDA or host computer can freely access for any purpose.

Figure 41A:
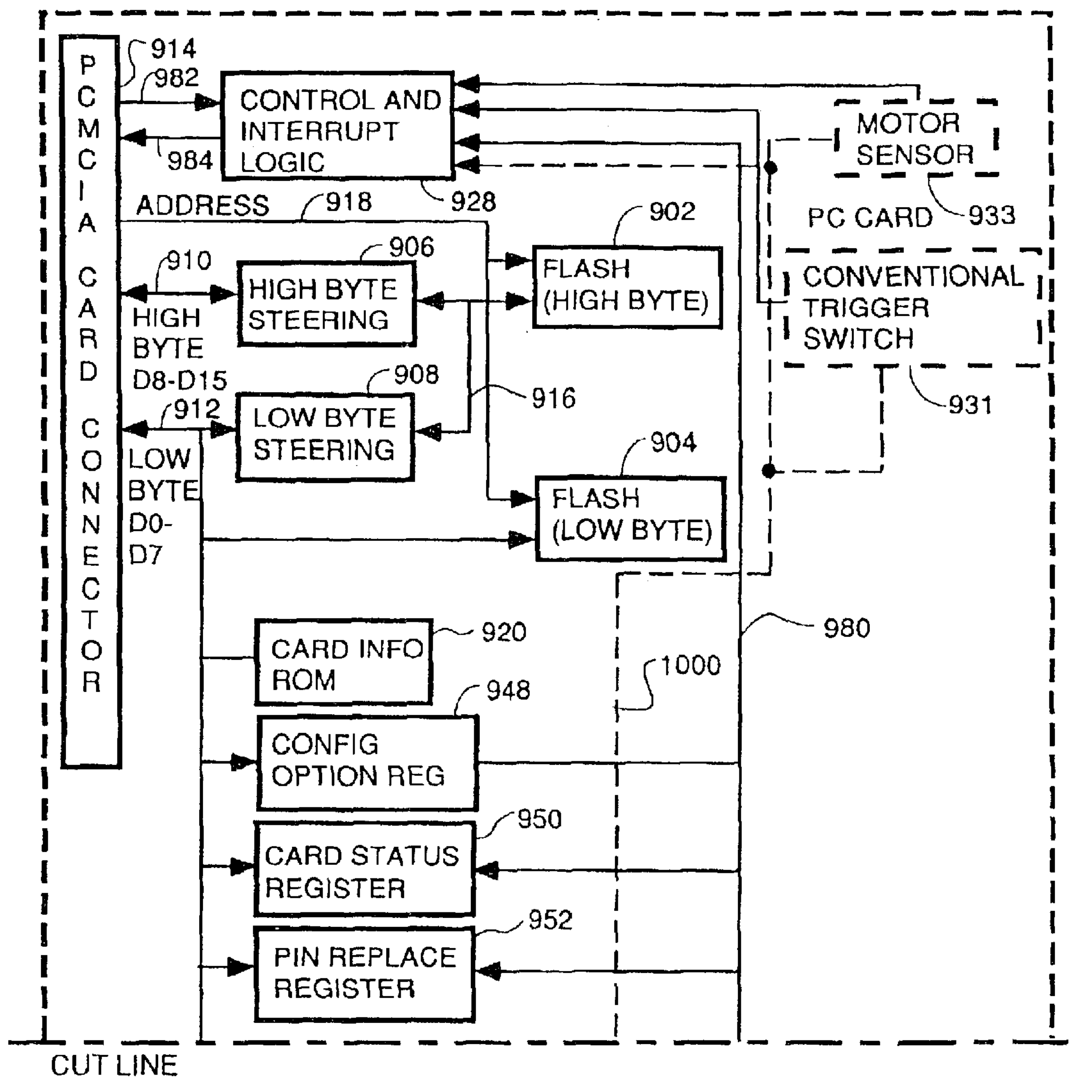
FIGS. 41A, 41B is a block diagram of the preferred circuit for a PCMCIA barcode decoder card that feeds decoded alphanumeric data to the host computer and which has on-board nonvolatile flash EEPROM available for use by the host.
Figure 41B:
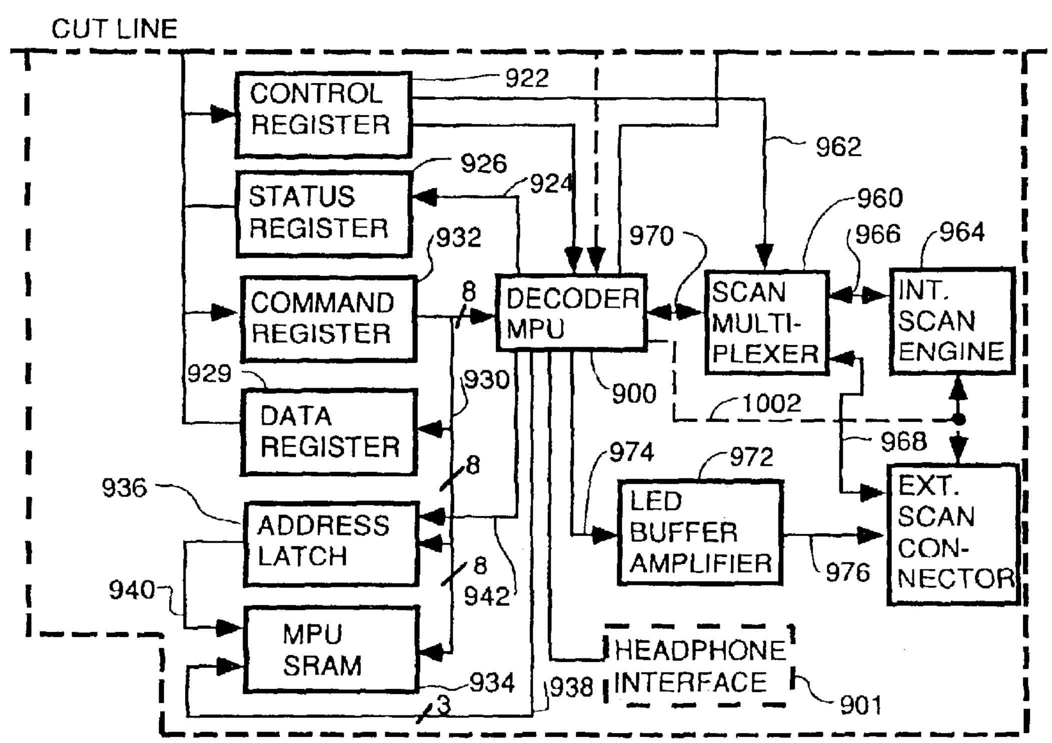

Zone 2 in the address space of the PC card is the Attribute Memory Space. This memory space may be accessed by the PDA through Memory Cycles. The Attribute Memory Space is the address space in which the various configuration registers on FIG. 41 and other Figures reside. The configuration registers 66 in FIGS. 3 and 41 are defined by the PC card Standards incorporated by reference herein and are used by the PDA to control the operational configuration of the PC card. One of these configuration registers is the Configuration Option Register which stores the Configuration Index data in bits 0–5, the Interrupt Mode in bit 6 (pulsed=0, Level=1) and the PCMCIA Soft Reset in bit 7 (asserted=1). Another of the configuration registers is the Card Configuration and Status Register which stores data mentioned earlier herein.

Zone 3 comprises the Input/Output addresses accessed by the PDA through I/O Cycles by asserting the I/O Read signal, IORD, or the I/O Write Signal, IOWR, on the Handshake Signal bus 46 while the Attribute Memory Select Signal, REG, and at least one Card Enable signal are asserted (all of these signals are on the Handshake Signal bus 46 and are not separately shown for the sake of simplicity in the figure).

Figure 5:
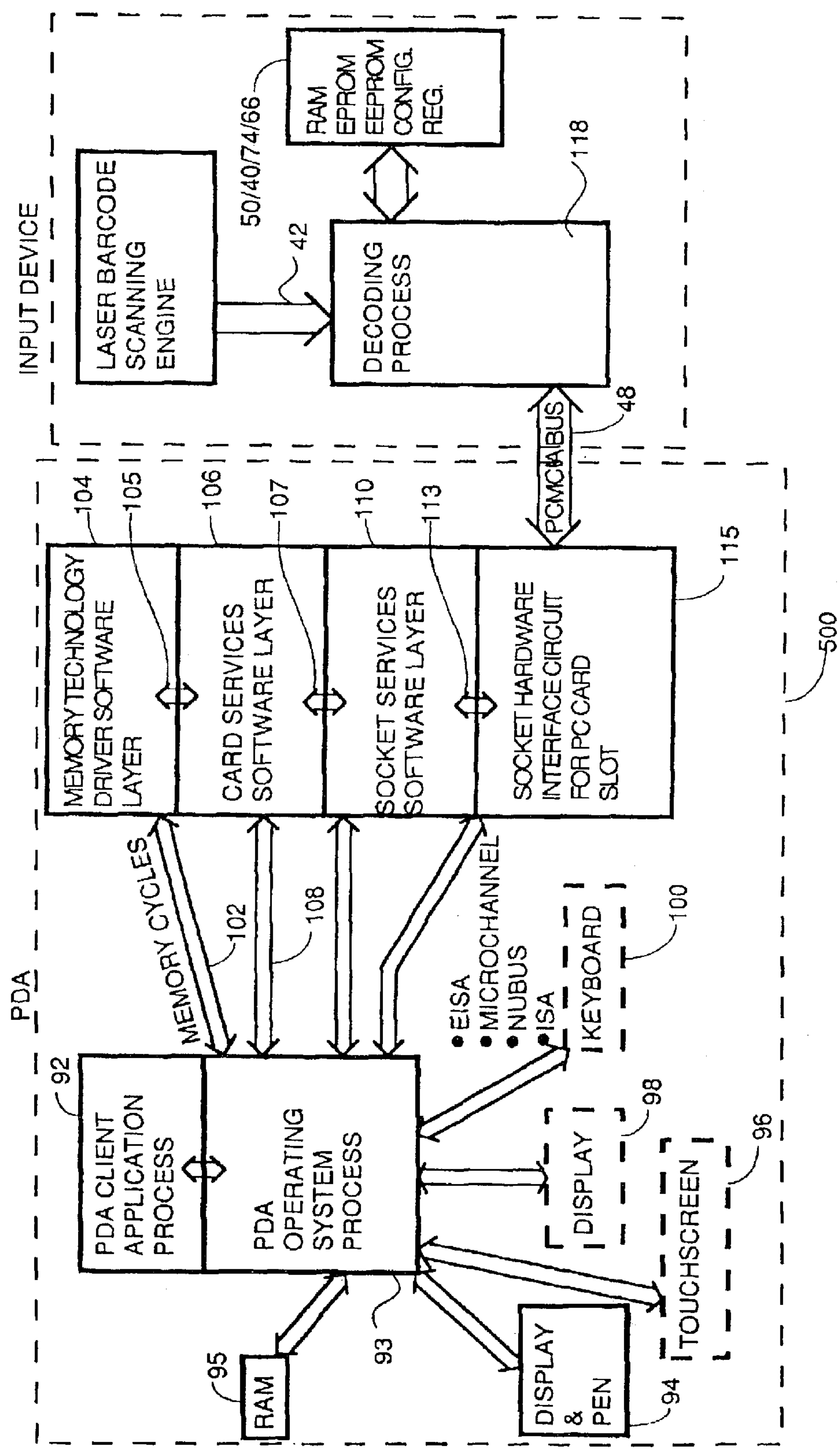
FIG. 5 is a diagram of the software architecture within the PDA which supports the PC card.

Referring to FIG. 5, there is shown a diagram of one possible software architecture in the PDA to implement the industry standard PCMCIA PC card slot and interact with the PC card through the PCMCIA Bus. The PDA has in execution thereon a client application 92 such as an inventory processing program which uses barcode data to provide raw data input as to what merchandise is in a particular inventory. The client application 92 interacts through the PDA operating system process 93 with the RAM 95, other circuitry and "native" input devices of the PDA, i.e., the pen-based display 94 or a touchscreen 96 or a conventional display 98 and keyboard 100. The operating system process 93 receives requests from the client process 92 to read data from or write data to RAM, receives interrupts from or polls the input devices and the PC card regarding any new data from the input devices or PC card and passes that data to the client process 92 for processing.

The operating system process interacts with the PC card through a multilayer software process, a hardware interface and the PCMCIA Bus. When the operating system process desires to read data from or write data to an address in the Common Memory Space, it utilizes interprocess data path 102 coupling the operating system process to a Memory Technology Driver software process 104, i.e., layer. The function of this Memory Technology Driver process is to implement an interface with a Card Services software process 106 to mask the details of accessing specific memory technologies. For example RAM is accessed differently in bipolar and CMOS and differently from one manufacturer to another sometimes. Also, RAM is accessed differently than EPROM which is accessed differently than EEPROM. To decouple the operating system process 93 from this complexity, the Memory Technology Driver software process 104 contains the appropriate protocols and driver routines to access whatever type of memory exists in the PC card coupled to the PCMCIA Bus.

The Card Services software layer 106 serves to coordinate access to whatever PC card or Cards that are connected to the PCMCIA Bus 48, sockets and systems resources among multiple client processes for the card(s) in the PCMCIA socket. For access to memory on the PC card, the Card Services process 106 will receive a request via interprocess data path 105 from the Memory Technology Driver process 106. For other requests, the operating system process communicates directly with the Card Services process via interprocess data path 108. There are numerous vendors for Card Services Software listed in the PCMCIA Resource Reference Book of Spring 1994 and the details of their offerings are hereby incorporated by reference.

The Card Services process 106 communicates via an interprocess data path 107 with a Socket Services software process 110. This process 110 serves to provide a standardized programmatic interface with the PC card such that different client applications and operating systems may be decoupled from the details of the PC card hardware and software structure and changes therein and can communicate with and control different PC cards in a uniform, standardized way. The Socket Services process 110 also serves to control and communicate with a Socket Hardware Interface Circuit 112 via data and control path 113 to drive and control the hardware interface for the PCMCIA Bus 48 so as to send data to, or get data from, the PC card, receive interrupts from the PC card, send interrupt requests to the PC card and exchange various handshaking control signals with the PC card. There are numerous vendors for Socket Services Software listed in the PCMCIA Resource Reference Book of Spring 1994 and the details of their offerings are hereby incorporated by reference.

The function of the Socket Hardware Interface Circuit is to drive data and control signals, power and ground potentials onto the pins of the PCMCIA Bus for transmission to the card and to receive data and control signals from the PC card via the PCMCIA Bus and pass them to the Socket Services process 110 which then passes them to the Card Services process 106 from which they are passed, if necessary, to the Memory Technology driver process 104 and the operating system 93.

The details of the client application process 92, the operating system process 93, the Memory Technology Driver process 104, the Card Services process 106, the Socket Services process 110 and the Socket Hardware Interface circuit 115 are not critical to the invention and any process or circuit that can interact in the manner described herein with the software and circuitry described herein as resident on the PC card will suffice for purposes of practicing many species of the invention. Some species have on-board memory which the host must be able to access through the PCMCIA bus without blocking access through the PCMCIA bus for I/O transactions with the decoder. The details of the Card Services Layer and Memory Technology Driver layer pertinent to these species are given below.

A decoding process 118 in execution on the microprocessor 38 in the PC card exchanges the data and control signals with the Socket Hardware interface to carry out the decoding of data from the signal on line 42 from the laser scanning engine and passing of that data to the PDA Client process 92.

Figure 6A:
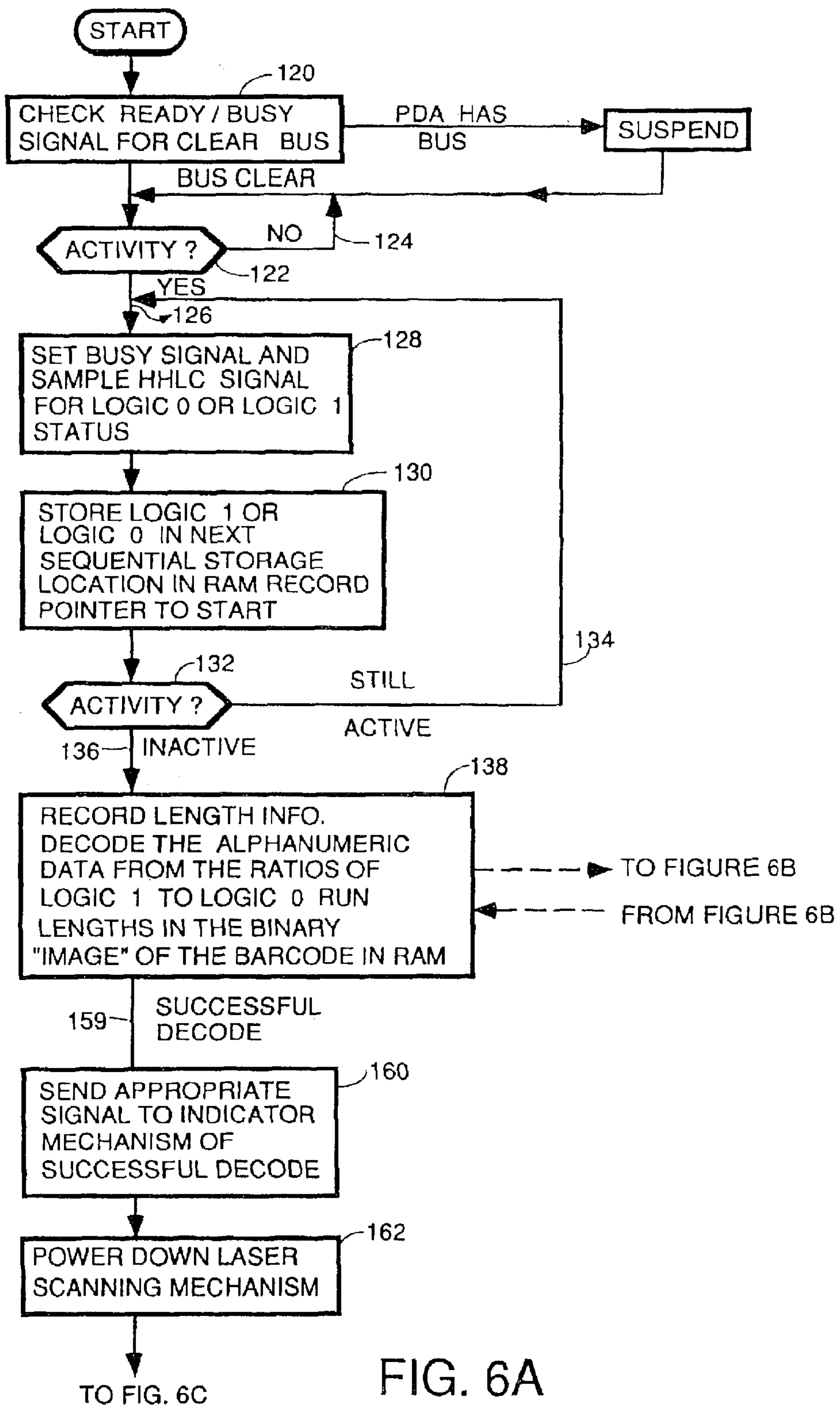
FIGS. 6A, 6B and 6C are a flow chart of the processing performed on a PC card interface according to the teachings of the invention which samples and stores undecoded HHLC data and decodes it and sends the decoded alphanumeric characters to the PDA.

Referring to FIG. 6A, there is shown a flow chart of the pertinent parts of the decoding process 118 carried out in the PC card in one subgenus. In another subgenus, the same or a similar decoding process takes place on the host. The decoding process starts with sampling of the HHLC signal state on line 42 in FIG. 3 so as to create a binary image of the barcode being scanned in memory prior to attempting to decode the image. First, the microprocessor 38 must make sure it has control of the buses. This step may not be necessary where the decoding process is being done on the host. This process is symbolized by step 120. If the PDA has control of the buses, processing is suspended until the shared buses 50 and 52 are clear. Then step 122 is performed which represents the process of polling the signal level on line 42 for changes to determine if a barcode is being scanned. If no changes are occurring, the decoding process does nothing and idles waiting for a change in level on line 42 as symbolized by path 124. As soon as change occurs, path 126 is taken to box 128 which immediately set the Ready/Busy signal on the handshake signal bus 46 to the busy state.

Box 128 generally represents the process of periodically sampling the HHLC signal on line 42 in FIG. 2 to determine its current state as either logic 1 or logic 0. This is done by performing a read operation of parallel port 44 to determine the logical state of whatever pin to which line 42 is connected.

Box 130 represents the process of storing the logic 1 or 0 obtained from line 42 in the next sequential storage location in RAM 50. The microprocessor 38 periodically reads line 42 and assigns a particular storage location in a sequence of storage locations in RAM 50 to the result of the read operation. The sequence of storage locations can be either contiguous or a linked list, the order of the locations in the sequence corresponds to the order of the read operations. Thus the sequence of logical ones and zeroes stored in the sequence of locations will represent a digital "image" of the transitions between white and black in the barcode. The "image" is not an actual image but does accurately reflect the relative widths of the white and dark spaces in the barcode, and it is in the ratios between the black and white widths, i.e., the relative widths of the white and black spaces, that the alphanumeric information is encoded. Because the reading of the status of line 42 is periodic, the number of sequential logic 1's and logic 0's reflecting the width of any particular light or dark space will vary depending upon the speed of the scan versus the period of the read cycles. However, the relative scan speeds between successive scans of the same barcode cancels out in the decoding process because the sought after information is encoded in the ratios of white to black, and these ratios remain constant for any particular barcode regardless of scan speed. Box 130 also represents a process of recording a pointer address to the start of the binary image message for data from the current scan.

Box 132 represents the process of checking for transitions on line 42 indicating that barcode scanning is being performed by the laser scanning engine. If transitions are still occurring on line 42, path 134 is taken back to the process represented by box 128 to take the next sample. If no transitions have occurred for a period long enough to indicate that no barcode is being scanned, path 136 is taken to the decode step 138. Path 136 is only taken once a complete scan of a barcode has occurred.

The first thing that is done by the process represented by box 138 is to retrieve the count from an address counter variable used that is indicative of the length of the sequence of storage locations that store the sequence of binary 1's and 0's making up the binary image of the current scan. This data will be used to flush the data from RAM 50 by a bad read routine to be described later in case of an unsuccessful decode operation. If a linked list has been used, the number of entries on the list and their locations is retrieved for passing to the bad read routine if an unsuccessful decode occurs on the current scan.

Decode step 138 represents the known process of decoding the alphanumeric data encoded in the ratios of run lengths of logic 1's and logic 0's in the binary "image" stored in RAM 50 of the barcode being scanned. The details of how to decode barcodes are well known in the art and are not critical to the invention. The barcode scanning systems commercially available from Symbol Technologies, Inc. of Bohemia, N.Y., Telxon Corporation (model PTC-600), and PSC, Inc. of Webster, N.Y. all contain such decoding software which will work to practice the invention, and the details thereof are hereby incorporated by reference. The decode routine details may depend upon the type of barcode being decoded if the decoding software does not have an autodiscrimination routine which automatically determines the type of barcode being scanned. In the most useful embodiments however, an autodiscrimination routine is included. The steps of the flow chart of FIG. 6B indicate the basic functions of the decode step 138 that should be performed.

Figure 6B:
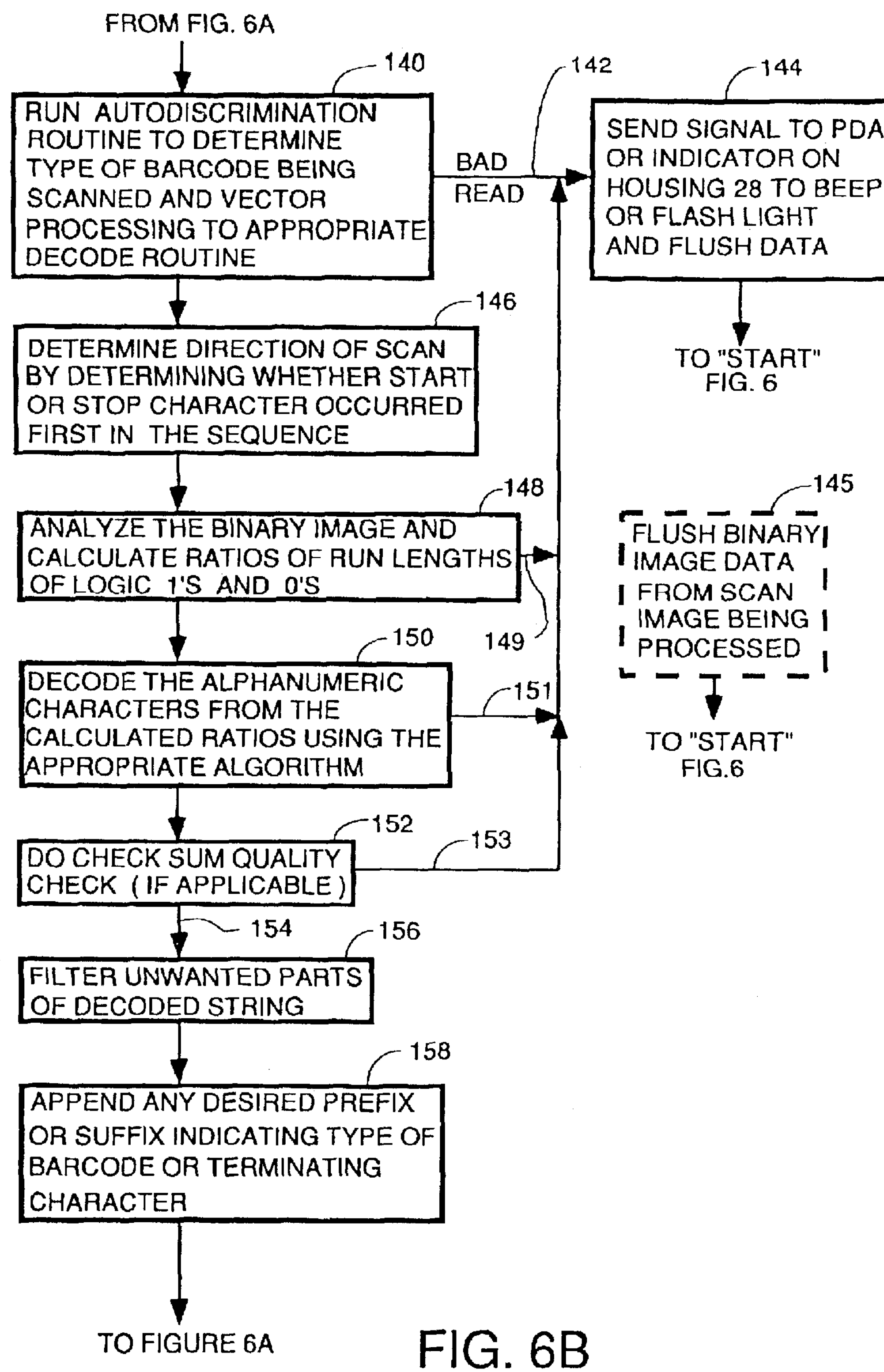

Referring to FIG. 6B, those steps will be briefly described. Box 140 represents the process of executing the autodiscrimination routine to determine what type of barcode was scanned. This is done by examining the beginning and ending segments of the binary "image" to look for the start and stop characters. These start and stop characters are different for each different class of barcodes and also indicate the beginning and end of encoded alphanumeric information. The autodiscrimination routine decodes the start and stop characters and then vectors processing to a decode routine which is appropriate to the type of barcode which was scanned. If the type of start and stop characters are not types which are recognized or indicate the barcode is of a type for which no decode routine exists in decode process 138, path 142 is taken to the "bad read" process represented by box 144. Path 142 also represents the process of passing to the bad read routine a pointer to the first location used in RAM 50 for the binary "image" of the scan being processed and length or location information indicating all the locations in which components of the image are stored. The bad read process, in one embodiment, simply sends an appropriate signal to the PDA or to some indicator mechanism on housing 28 to cause an audible beep or a flashing visual indication. In order to flush the data from the bad scan, the bad read routine then retrieves the pointer to the start of the binary image recorded for the current scan by the process of box 130 and retrieves the length of the sequence of storage locations which store data defining the "image" from the routine symbolized by box 138. The bad read routine then flushes the image data from the bad scan and resets the pointer and image length variables/counters (depending upon whether hardware or software are used to keep track of where and how long the image is in memory 50). In embodiments where linked lists are used, the bad read routine retrieves the pointer to the start of the image and the locations where each member of the sequence is stored flushes the data for the binary image from the RAM 50 and resets the pointer and locations data to prepare for the data from the next scan. Processing then returns to box 120 on FIG. 6A to wait for the next scan data.

If a memory usage/allocation table is used to keep track of what locations are used in RAM 50 and which locations are still available, the usage/allocation table data is altered to indicate that the locations used for the bad scan data are now. available. Since scanning is continuous until either a timeout or an indication of a successful decode occurs, preferably, RAM 50 will have sufficient size to be able to store data from enough complete scans so as to not overflow by the time a bad read indication on any particular scan occurs and the memory consumed by that scan is freed by the bad read process for reuse.

An alternative bad read process to eliminate annoying visual or audible indications of bad reads is symbolized by box 145 outlined in dashed lines in FIG. 6B. In this process, the data from the bad scan is flushed in the manner described above and the pointer and length information is reset. Any memory usage/allocation table data is altered to indicate the locations erased are available for reuse.

Next, the decoding process determines the direction of scan by examining whether the start or stop character occurred first in the sequence as symbolized by box 146. If the scan was in the reverse direction, the process of box 146 will reverse the order of the decoded alphanumeric characters.

Box 148 represents the process of analyzing the binary image to calculate the ratios of the run lengths of logic 1's and 0's. This is done by counting the number of consecutive logic 1's and the numbers of consecutive logic 0's in the adjacent runs of 0's and calculating the pertinent ratios. Path 149 is taken to the bad read routine if the ratios do not calculate properly or for some reason are not valid. Path 149 also represents the process of passing pointer and length or location information pertaining to the storage locations in RAM 50 used by the "image" data for the scan being processed to the bad read routine for use by the bad read routine in flushing the image data from the bad scan.

Decoding of the alphanumeric data from the ratios calculated in the process of box 148 is symbolized by block 150. There are many different barcode encoding schemes, and block 150 represents the unique processing necessary to decode whatever type of barcode has been scanned, as determined by the process represented by block 140. For example, if a 3-of-9 barcode has been scanned, each alphanumeric character is encoded by 9 barcode elements of which 5 are black bars and 4 are white spaces. Of these 9 elements, 3 are wide and 6 are narrow. All wide elements are the same width and all narrow elements are of the same width. The process of calculating the ratios symbolized by block 148 determines from the ratios in the image what sequence of wide and narrow black and white spaces occurred. Each alphanumeric character has its own unique sequence. The process of block 150 compares the detected sequence to the known sequences, and if a match occurs, selects the assigned alphanumeric character for addition to the decoded message and moves on to the next group of barcode elements.

If decoding is not possible, i.e., there is no match on any detected sequence with a known sequence, path 151 is taken to the bad read routine symbolized by either box 144 or 145. Path 151 also represents the process of passing pointer and length or location information pertaining to the storage locations in RAM 50 used by the "image" data for the scan being processed to the bad read routine for use by the bad read routine in flushing the image data from the bad scan.

Box 152 represents the optional process of calculating a checksum on the decoded result and comparing it to a checksum encoded into the barcode if applicable. Not all barcodes have encoded checksums, so this step is omitted in cases where no checksum is available from the scanned barcode. In cases where a checksum is available, if the two checksums do not match, path 153 is taken to the bad read routine. Path 153 also represents the process of passing pointer and length or location information pertaining to the storage locations in RAM 50 used by the "image" data for the scan being processed to the bad read routine for use by the bad read routine in flushing the image data from the bad scan.

If the two checksums do match in the process symbolized by box 152, a successful decode has occurred, and path 154 is taken to the process of box 156.

The process of box 156 is optional, but is almost always useful. Many barcodes have some encoded characters that are not needed by the client processes that used the data such as encoded checksum, supplementary suffix barcodes, start and stop characters etc. Box 156 represents the process of filtering out any undesired characters from the decoded string. Box 156 will retrieve a filter specification from the client process 92 in FIG. 5. Typically, the user can enter data defining which portions of a barcode to filter out and this data will be stored by the client process 92 and passed to the process symbolized by box 156.

Box 158 represents the process of appending any desired prefix or suffix information to the decoded string. Typical prefix information includes some identifier indicating the type of barcode which was decoded or a terminating character indicating the end of the decoded string or which the client process 92 needs to know when it has received the last character decoded from the barcode.

Returning consideration to FIG. 6A, after successful decoding has occurred, path 159 is taken to the process symbolized by box 160. This process involves sending an appropriate signal to an audible indicator or visual indicator on housing 28 or on the PDA indicating a successful decode operation has occurred. The process symbolized by box 162 is then performed to stop the laser scanning mechanism from further scanning and cut off power to the laser, the scanning motor and other electronics within housing 28 so as to conserve the PDA battery.

Figure 6C:
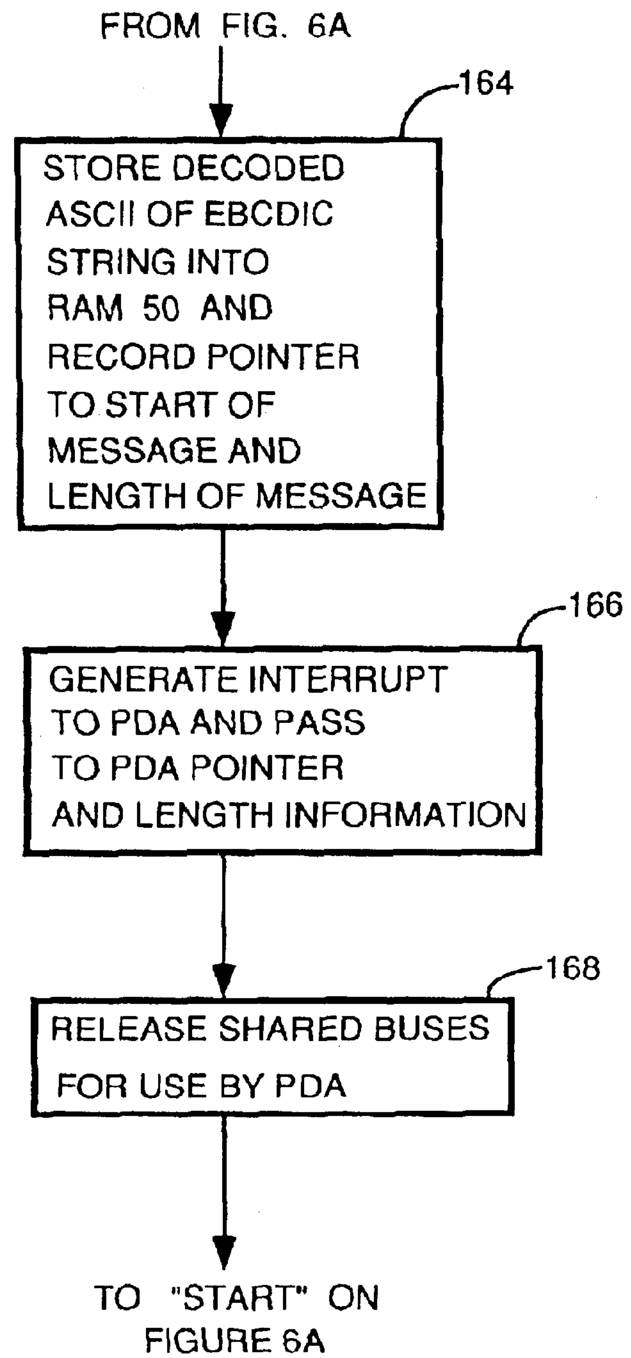

Continuing on FIG. 6C, after the laser scanning engine is shut down, the process symbolized by box 164 is performed to store the ASCII or EBCDIC characters resulting from the decoding operation in RAM 50. A pointer address pointing to the start of the message in RAM 50 and length information identifying how many storage locations should be read by the PDA to get the entire message are also stored by the process of box 164.

Next, the process symbolized by box 166 is performed to notify the PDA that a decoded message awaits in RAM 50 for use by the client application process 92 in FIG. 5. In most embodiments, the PDA is notified by generation of an interrupt, although in other embodiments, the PDA may be notified of the existence of a decoded message by setting a bit in a particular location in the Common Memory Space, the Attribute Space or the Input/Output Space to a state indicating that a decoded message awaits. The client application process 92 in FIG. 5 would periodically poll this storage location using memory cycles or I/O cycles to ascertain when the particular bit changes states, and, when it does, vector processing to a routine to retrieve the pointer and length information and then to retrieve the decoded message.

The process of box 166 also represents the process of either actively transferring to some prearranged memory location in RAM 95 on the PDA or some prearranged register(s) in the PDA pointer and length information. The pointer information indicates the starting location in RAM 50 where the decoded message begins and the length information indicates how many storage locations the PDA should read.

Processing then loops back to "start" on FIG. 6A after the process of box 168 is performed to release the shared address bus 52 and data bus 50. The buses are released by reversing the state of the Ready/Busy signal to a state indicating the buses are free for use by the PDA to access RAM 50.

Note that RAM 50 can have more capacity than is needed simply to implement the PCMCIA interface. This allows the bar code scanning engine interface to have the additional function as serving as a flash memory card for the PDA since many PDA and palmtop devices are severely limited in memory capacity and need more to run complex programs. Up to four megabytes of RAM can be addressed in the Common Memory Space of a PCMCIA defined PC card, but usually only two megabytes or less are required for the bar code scanning engine interface. This enables PDA and palmtop devices with only one PCMCIA slot to have the functionality of an expansion memory card in addition to a laser based bar code scanning or other input device without having to switch PC cards. Expansion memory cards of DRAM, EEPROM and EPROM types are commercially available and manufacturers thereof are listed in the PCMCIA Resource Reference Book of Spring 1994. The details of these commercially available memory expansion cards is hereby incorporated by reference.

Figure 7:
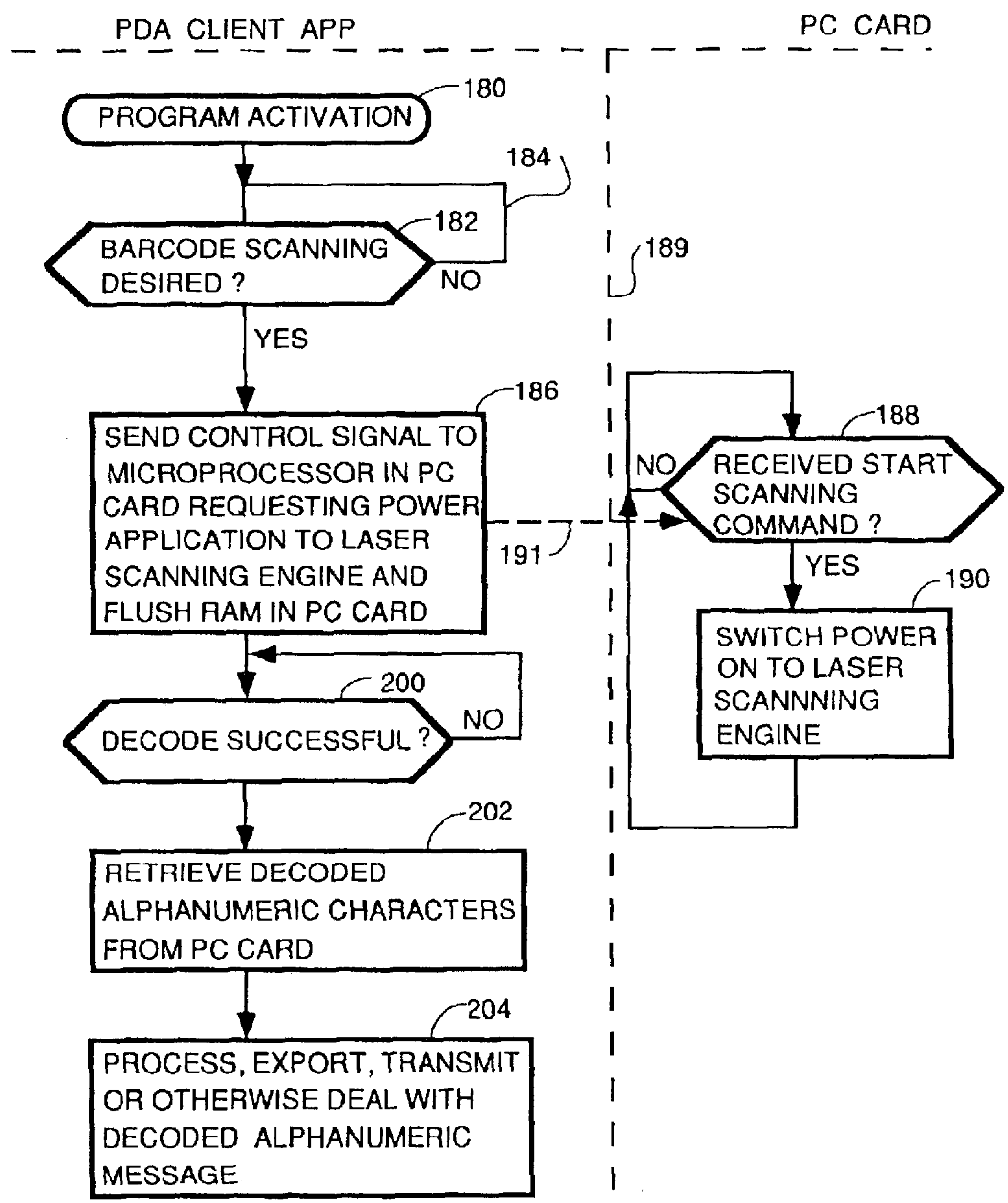
FIG. 7 is a flow chart of the processing which occurs in the PDA to support the PC card interface to an input device such as a barcode scanning engine.

Referring to FIG. 7, there is shown a flowchart of typical processing that occurs in a client application such as client application 92 in FIG. 5 to turn the laser based barcode scanner on and collect the decoded data. The user may have several programs on his or her PDA. Block 180 represents activation of the bar code scanning application. Block 182 represents a test performed by the client application 92 to determine if the user has given a command to scan a barcode which has been placed in front of the laser scanning engine. This command can take many forms. For example, it can be a keyboard command in the case of a PDA or palmtop with a keyboard, or it can be a touch of a specific area displayed on the touchscreen 96 in FIG. 5 or pen-based display 94. In the case of a touchscreen or pen-based display, there will typically be an area displayed on the screen that queries the user for his or her intentions such as "Start Scanning?" etc.

Until the user gives this start scanning command, the client application idles as symbolized by path 184 in a typical embodiment. In alternative embodiments, the client application can process previous messages in foreground and perform the process shown in FIG. 7 in the background to collect new decoded messages to be placed in a queue for later processing by the foreground process. The latter embodiment would find typical application where heavy barcode scanning activity was occurring. No attempt will be made here to detail the processing of the foreground process in these embodiments since that processing can take at least as many forms as there are uses for barcodes. For example, it may be a point of purchase program to list items purchased and communicate that data to another inventory accounting or inventory re-order process, or it may be shelf inventory program which gathers data about the type of items in inventory where the clerk enters the type information by scanning barcodes and then types or writes in the number of that type item remaining manually.

Once the user has given the start scanning command, the process symbolized by block 186 is performed. In this process, the PDA client process sends a command signal or data to the microprocessor in the PC card telling it that the laser scanning engine is to be turned on. This triggers a process executed in the PC card symbolized by blocks 188 and 190 to apply power to the laser scanning engine. Block 188 represents the process of polling a particular memory location or register bit to determine if the PDA has written data there indicating scanning is to be started or an interrupt service routine which is performed when the PC card receives a particular interrupt request indicating that scanning is to be started. When the process of step 188 determines that the start scanning command has been given, the yes path to the process symbolized by block 190 is taken. The process of block 90 simply sends a command via parallel port 44 and signal path 196 in FIG. 3 to a power control switch 194 to cause the switch to apply Vcc and ground potentials to the laser scanning engine. Power to the laser scanning engine is cut off by switch 194 by the process of block 162 on FIG. 6A after a successful decoding operation has been performed. Dashed line 189 in FIG. 7 represents the hardware and software interface between the PDA and the PC card. Specifically, dashed line,189 represents any processing necessary by: Memory Technology Driver software process 104, Card Services process 106, Socket Services process 110, Socket Hardware Interface 115 and the various interprocess transfer mechanisms, which may be necessary to get the control signal(s)/data represented by dashed line 191 properly from the PDA to the PC card to cause the desired actions while providing a uniform, industry standard, PCMCIA defined programmatic interface to the PDA client application 92 and operating system 93 regardless of the details hardware or software processes implemented in the PC card. By implementing the barcode scanning engine on a PC card using an industry standard PCMCIA socket and bus, many advantages are achieved. Among them are: (1) many different input devices can be added to the PDA to add different functionality to it to create many different types of portable computing systems with the same PDA; (2) easy and fast maintenance because the system is not custom and the input device simply plugs into an industry standard PCMCIA socket, so when the input device or the PDA fail, a new input device or PDA can be quickly and effortlessly be substituted with very little downtime; (3) the customer is not locked into a particular technology or supplier so when technology improves or a supplier goes bankrupt or fails to introduce new technology to keep up with the state of the art, the customer can simply buy the desired technology from a different source with no fear of compatibility problems causing downtime.

The process symbolized by block 186 in FIG. 7 also sends a command to the PC card indicating that it is permissible to flush the RAM 50 of any binary "image" data and any decoded alphanumeric characters which are no longer needed as being related to barcodes which have already been processed by the client application 92.

After the laser scanning engine has been started and RAM 50 has been initialized, the client application simply waits for a successful decode of the scanned barcode, as symbolized by block 200. As noted earlier herein, the PC card may notify the PDA of a successful decode by generating an interrupt, performing an I/O operation to send data to a polled location in the PDA memory 95 in FIG. 5 or some status register (not shown) within the PDA, or write data to a memory location in RAM 50 or one of the configuration registers that is regularly polled by the PDA.

Block 202 represents the process of retrieving the decoded alphanumeric characters from the PC card. In particular, the PC card will pass to the PDA a pointer address in RAM 50 where the decoded message starts and the length of the message. In the case of an interrupt-based notification process, block 202 represents the process of vectoring to the appropriate interrupt service routine to retrieve the message and carrying out that interrupt service routine. Processing by the service routine will set the Ready/Busy signal to a state to obtain for the PDA sole control of the shared address and data buses 52 and 50, respectively, and then carry out a number of memory cycles to retrieve the data. This is done by writing the address of the first alphanumeric character on shared address bus 52 and setting suitable control signals on Handshaking Signal bus 46 and 46A to indicate that a read memory cycle of an address in RAM 50 is desired by the PDA. This causes the address decoding circuitry 61 to activate the chip select signal coupled to RAM 50 and to generated suitable control signals on bus 64 to put RAM 50 into read mode. The desired character is then retrieved by RAM 50 and put on shared data bus 50 where it is read by the PDA. The address on the shared address bus 52 is then incremented to the next address in the message, and the process is repeated until all decoded alphanumeric characters have been retrieved.

In one embodiment, the memory cycles result in the decoded data being transferred from RAM 50 in the PC card to the RAM 95 in the PDA for further processing so as to free RAM 50 to store data resulting from subsequent barcode scans of different barcodes. In alternative embodiments, the execute-in-place capability of the PC card will be utilized to process the decoded alphanumeric data directly out of the RAM 50 without first moving it to the PDA RAM 95 in FIG. 5. This has the disadvantage of locking out the PC card microprocessor 38 from access to RAM 50, so no new barcode scanning can occur. However, in the case of most client applications, processing of the decoded barcode data will be so fast, that there will be no noticeable "dead" time where barcodes cannot be scanned.

Block 204 represents whatever processing the client application does with the decoded alphanumeric data from the scanned barcode. The decoded data can processed for inventory control or point of purchase needs, exported to another process in execution on the PDA, transmitted out on a local area network to another process in execution on a different platform or otherwise dealt with including any combination of the above processing scenarios. In the case where the PDA or palmtop does not have a built-in Local Area Network interface, box 206 in FIG. 3 represents commercially available hardware and software that has already been integrated on other PC cards by various manufacturers for interfacing to Ethernet, FDDI, token ring etc. networks. These suppliers include Accton Technology Corporation of Fremont, Calif., and Advance Micro Devices, Inc. of Sunnyvale, Calif. as well as the other manufacturers of PC card Ethernet, token ring and other types of LAN interfaces listed in the PCMCIA Resource Reference Book from Spring of 1994. The LAN interface can be wireless, and such PC card based wireless LAN interfaces are available from such manufacturers as NCR Corporation of Somerset, N.J. and the other manufacturers listed in the PCMCIA Resource Reference Book of Spring 1994. The details of these commercially available LAN interfaces is hereby incorporated by reference.

The details of the LAN circuitry and hardware are not critical to the invention and will not be described here. Any network interface for 10Base2, 10BaseT, FOIRL or other type of network media from any manufacturer that can integrate the interface on a PC card and which will not interfere with access by the host to the decoder through the PCMCIA bus or access to the sample data or HHLC signal through the PCMCIA bus will suffice regardless of whether the interface is RF, infrared or hardwired.

Figure 8:
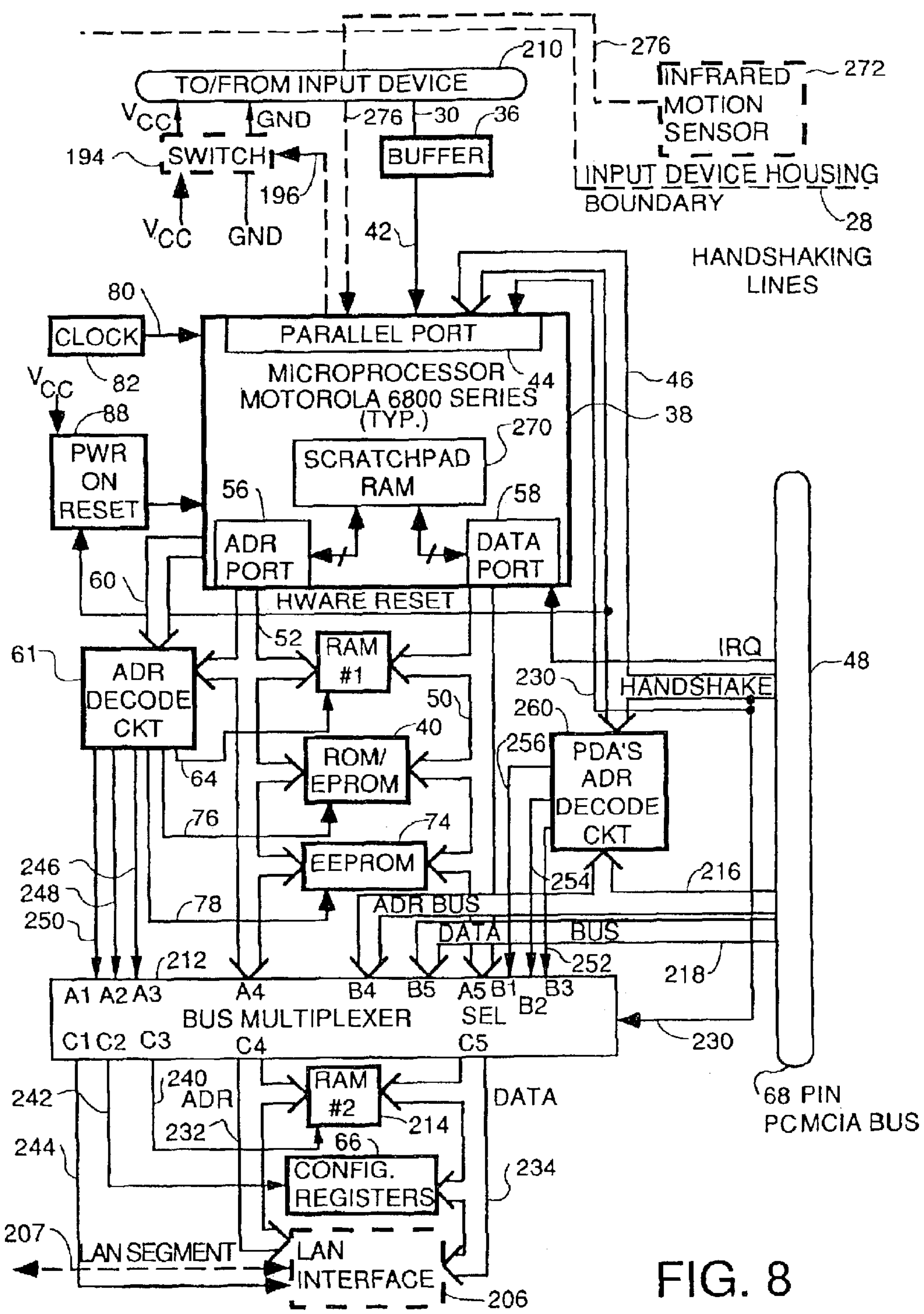
FIG. 8 is an alternative circuit for a PC card interface circuit using one RAM devoted to the process of gathering data from the input device and another RAM in the Common Memory Space for storing data to be transferred to the PDA.

In alternative embodiments, the PC card may contain two separate RAM memories, one of which is devoted solely to storing binary image data from the scanned barcode and storing the alphanumeric characters which result from the decoding process, and the other of which serves as expansion memory for the PDA. Such an embodiment can be used to implement any of the peripherals described herein. However, it is more useful in the slower data stream embodiments using PC card interfaces such as wand-based barcode readers, magnetic stripe readers, trackballs etc. so that the microprocessor 38 in the PC card does not dominate the shared RAM 50 during the long time it takes to process the input data in the slow input stream thereby blocking access by the PDA to RAM 50 (which may be needed expansion memory for the PDA in some embodiments). In such an embodiment, the microprocessor 38 need not check the Ready/Busy handshaking signal before accessing its dedicated memories since the PDA will not be allowed access to the memories dedicated to the PC card microprocessor. Such an embodiment is shown in FIG. 8. In FIG. 8, circuits having the same reference numbers as circuits in FIG. 3 have the same structure and purpose in the combination and nothing further will be said about these circuits. Circuits outlined in dashed lines are optional. Note that the power control switch 194 is indicated as optional. This is because the typical input device circuitry coupled to port 210 to which the interface of FIG. 8 is typically connected consumes less power than a laser based scanning engine and may be left on all the time the PC card is in its socket on the PDA. If a laser based scanning engine is coupled to port 210 and the interface is designed for use in a portable environment as with a PDA, switch 194 is preferred and is controlled by the microprocessor 196 either through a manual trigger or the software start-stop mechanism previously described.

In FIG. 8, RAM#1 is the random access memory devoted to the microprocessor 38 of the PC card. RAM#2 is the expansion RAM for the PDA but is in the Common Memory space shared by the PDA and PC card. A bus multiplexer 212 serves to select which address and data buses are coupled to the shared circuits 214, 66 and 206. The multiplexer selects either the address bus 52 or the data bus 50 of the microprocessor 38, or the address bus 216 and data bus 218 of the PCMCIA Bus 48 for application to the applicable address and data ports, respectively, of the shared circuits. Control of this selection is made by the state of the Ready/Busy signal 230 which is one of the signals on the Handshaking Signal bus 46. When this signal is in a state indicating that the microprocessor 38 is not asserting control over shared address bus 232 and shared data bus 234, bus multiplexer 212 is in a state where the address bus 216 is coupled to shared address bus 232 via input B4 and output C4 of the multiplexer and data bus 218 is coupled to shared data bus 234 via input B5 and output C5 of the multiplexer. This allows the PDA to read and write data stored in RAM#2 and the configuration registers 66 or to bilaterally communicate with the LAN Interface 206 such that data can be sent or received on LAN segment 207 (this segment can be hard-wired or can be an RF or infrared link).

The Ready/Busy signal on line 230 is asserted by the PC card when the PC card microprocessor 38 needs to have access to one or more of the shared circuits RAM#2, configuration registers 66 or LAN Interface 206. When the bus multiplexer 212 is in this state, address bus 52 is coupled to shared address bus 232 via input A4 and output C4 and data bus 50 is coupled to shared data bus 234 via input A5 and output C5 of the bus multiplexer.

The chip select signal inputs of the shared circuits 214, 66 and 206 are coupled to the C3, C2 and C1 outputs of the multiplexer 212 via chip select lines 240, 242 and 244, respectively. These chip select lines are coupled to chip select lines 246, 248 and 250, respectively, from the PC card's address decode circuit 61 when the microprocessor 38 has control of the shared buses 232 and 234. Chip select lines 240, 242 and 244 are coupled to chip select lines 252, 254 and 256, respectively, from the PDA's address decode circuit 260 when the PDA has control of the shared circuits.

The parallel port 44 of the microprocessor 38 has one pin which is coupled to the Ready/Busy signal line so that microprocessor 38 can assert control over the shared buses 232 and 234 when necessary and block the PDA's access to RAM#2. This typically happens after the microprocessor 38 decodes the alphanumeric data from the barcode and has it stored in RAM#1 but wants to move it to RAM#2 prior to notifying the PDA that a message is waiting in RAM#2 for pickup. To move the data from RAM#1 to RAM#2, the microprocessor 38 uses on-board scratchpad RAM 270 to store each alphanumeric character temporarily after a read operation with RAM#1 and then writes the character from scratchpad RAM 270 to RAM#2. The microprocessor then notifies the PDA of the existence of a message in RAM#2 by one of the mechanisms previously described.

In any embodiment disclosed herein for the PC card interface for a barcode reader input devices, an infrared motion sensor can be used as an optional means for starting the barcode reading process. This optional configuration is symbolized by block 272 outlined in dashed lines in FIG. 8, although it is equally applicable to the embodiment shown in FIG. 3. The motion sensor 272, is also shown in dashed lines in FIG. 2 showing one possible embodiment. The symbol marked 272 in FIG. 2 is supposed to represent the infrared beam generation and detection apparatus and supporting circuitry of known motion sensors such as are found in common use to turn porch lights on in homes upon the approach of a moving object to the front door of a home. The circuitry and optical design of these units is hereby incorporated by reference. Motion sensor 272 emits infrared interrogation beams from the front window 27 by bouncing a beam 274 off the scanning mirror 18c so as to direct the beam out the window 27. Obviously the scanning mirror must be able to reflect infrared radiation and the window 27 must be able to pass it. When motion occurs in front of the front window 27, the interrogation beam is reflected and doppler shift or changes in reflected energy levels trigger the motion sensor to generate a control signal on line 276 in FIG. 8. This signal is detected by the microprocessor 38 which generates a signal on line 196 to switch 194 to apply power to the other barcode scanning circuits in the housing 28. The motion sensor has power applied to it at all times the PC card is inserted in its socket as long as the PDA is on.

Figure 9:
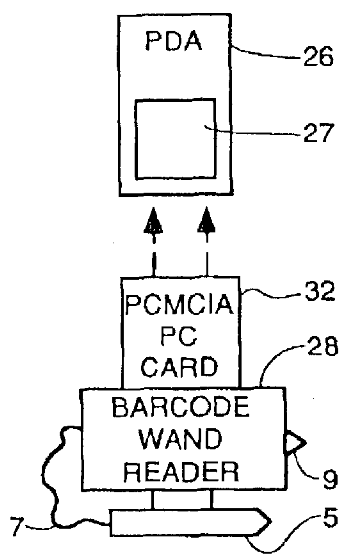
FIG. 9 is a diagram of a PC card interface with integrated wand type barcode reader.

Referring to FIG. 9, there is shown an embodiment of wand-type barcode reader coupled to a PDA through a PCMCIA PC card. The wand 5 of the barcode reading engine within housing 28 is shown as tethered to housing 28 by cable 7. In the alternative, the optical and light source equipment within wand 5 may be built into a nipple projection 9 extending from the side of front of the housing 28. Wand type barcode readers require a different type of interface circuit integrated on the PC card because the signal output from the wand type barcode reader is usually different from the signal output by a laser-based barcode scanning engine. The principal difference between the wand barcode scanning engine and a laser-based HHLC output is in the speed of the data stream. The output signal from a wand barcode reader is slow enough to decode in real time. Therefore, although the circuit of FIG. 3 may be used with or without a LAN interface, the software that microprocessor 38 implements for the interface implemented on the PC card 32 in FIG. 9 need not buffer the data of the binary image in RAM 50. Other than that, the software that implements the wand interface on the PC card is quite similar to the software shown in FIGS. 6A, 6B and 6C, and the software run by the client application 92, the Memory Technology driver process 104, the Card Services process 106, and the Socket Services process 110 is identical to the software symbolized by FIG. 5 and described in part in FIG. 7. Likewise, the hardware interface circuit 115 and interprocess transfer mechanisms symbolized on FIG. 5 are identical to those needed to implement the PC card interface for a laser-based barcode scanning engine.

Figure 10:
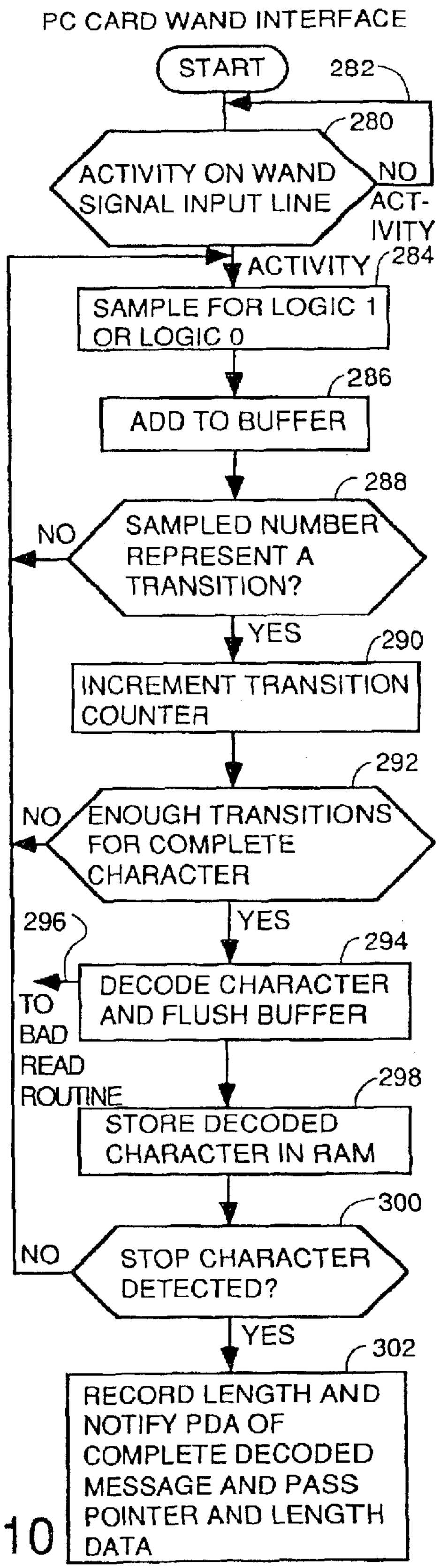
FIG. 10 is a flow chart of the software process executed by the PC card to decode undecoded serial data from a wand type barcode reader "on the fly".

Referring to FIG. 10, there is show a flow chart for a typical process flow to implement a PCMCIA based PC card interface for a conventional wand type barcode reader housed within housing 28 shown in FIG. 9 as attached to the PC card interface circuit 32. The circuitry of either FIG. 3 or FIG. 8, or equivalents, including interfaces based upon the Dr. Neuhaus PCMCIA Interface Controller Chip, which is commercially available from Neuhouse GMBH, the details of which are hereby incorporated by reference, may be used to implement the interface on PC card 32 or any of the other PC card interfaces disclosed herein. The software of FIG. 10 may be executed on any of these equivalent circuits.

In addition, the software depicted in FIG. 10 is only one exemplary embodiment of the type of interface software which may be executed on the circuitry integrated on PC card 32. Numerous wand based bar code readers are presently commercially available, and the decoding software in these devices can be adapted to the requirements of the PCMCIA defined PC card and ported to the particular circuitry used on the PC card. The details of the commercially available wand based barcode reading software is hereby incorporated by reference.

The process symbolized by the flow chart of FIG. 10 starts by checking for activity on the signal line 42 from the buffer 36. It is assumed that Vcc power and ground potentials have been applied to the wand circuit by one of the trigger mechanisms previously described or power is applied continuously. Step 280 represents the process of monitoring line 42 for changes in the signal level thereon. If no changes are occurring, the process idles at step 280 as symbolized by path 282. Once activity is detected, step 284 is performed to sample line 42 to determine if a logic 1 or logic 0 is present. This sampling is done periodically so that the relative ratios of white space width to black space width can be calculated.

Although with a wand interface, it is not necessary to store all the ones and zeroes of the complete "image" of the barcode, it is desirable to store enough 1's and 0's to have a stored image of at least the barcode elements that make up one character or, at a minimum, enough 1's and 0's so as to have enough elements of the barcode to determine by ratios of run lengths whether a particular set of 1's or 0's is a wide bar, a narrow bar, a wide white space or a narrow white space or quiet zone. This may be done with a timer timing the times between transitions such as by using a counter which starts at one transition and stops at the next etc. and storing the times between transitions. Therefore, step 286 is performed to add the sampled logic 1 or 0 to a buffer used to store the necessary bits in the minimum image.

Figure 11:
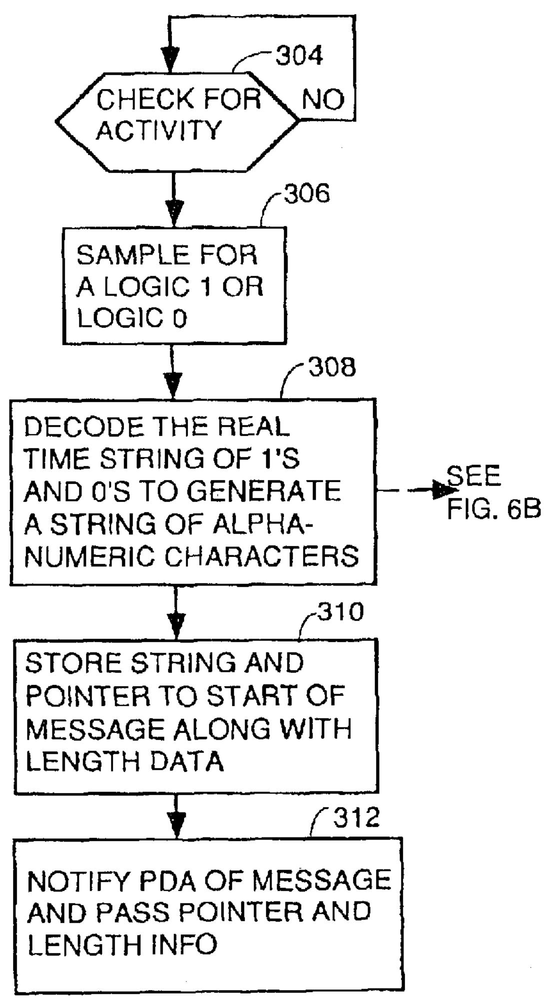
FIG. 11 is a flow chart of the software process executed by the PC card to decode undecoded serial data from a wand type barcode reader "on the fly" without counting transitions.

Step 288 represents a test to compare the sampled value from step 284 to the last sampled value to determine if the new sampled bit represents a transition from a logic high to a logic low state or vice versa. This is done so as to keep track of how many barcode elements have been received where two transitions represent the two edges of either a dark bar or a white space. It is necessary in some barcodes such as 3-of-9 to know how many barcode elements have been received so that it is known when to start decoding a character since a character is encoded into 9 barcode elements in 3-of-9 code. In some other codes, the number of barcode elements making up a character may vary, so the steps detailed herein revolving around counting how many transitions have occurred may be eliminated. The most general software interface for a wand barcode reader interface on a PC card is shown in FIG. 11 where the type of barcode being read is detected and processing is vectored to a decode routine which is appropriate to decode that type of barcode. However, in the embodiment of FIG. 10, it is assumed that the barcode uses the same number of barcode elements to encode each alphanumeric character and only alters the sequence to distinguish between characters. As such, step 290 represents the process of incrementing a transition count kept in hardware or software. Step 292 tests the transition counter and compares the number of transitions against the number of transitions which define a complete set of barcode elements encoding one alphanumeric character.

The process symbolized by block 294 does the decoding work. More specifically, the process represented by block 294 represents a multiplicity of functions which are similar, and mostly identical to those previously described with reference to step 138 in FIG. 6A and its substeps detailed on FIG. 6B. First, the numbers of logic 1's and 0's in the run lengths are counted, and the ratios calculated and compared. This yields ratios of logic 1 to logic 0 run lengths from which the sequence and relative widths of the black bars and white spaces can be calculated. Next, if the decode step is being done on the first character, the type of barcode and direction of scan is determined by determining the sequence and timing of transitions as the start/stop character is scanned (the same character coding is used for both, but it is asymmetrical so that the direction of scan can be determined). The type of barcode can be determined by determining what start/stop character was scanned since each barcode type uses a different start/stop characters. Processing is then vectored to a decoding routine which is appropriate for the type of barcode scanned and the particular sequence of barcode elements is compared to the known sequences. If no match occurs, path 296 is taken to a bad read routine which was previously described at blocks 144 or 145 of FIG. 6B. If a successful match is found, decoding of the character is deemed to be successful and the buffer memory, typically RAM#1 in FIG. 8, is flushed of any image data which pertains to the character successfully decoded. Step 298 is then performed to store the decoded character in RAM#1 or, in some embodiments, in RAM#2 so as to avoid the need for a later transfer.

Step 300 represents the process of determining whether the character just decoded is the stop character. If not, processing is vectored back to step 284 to begin the process of sampling for the image data for the next character. If the stop character is detected, the barcode has been completely scanned and decoded. In that event, step 300 represents the process of recording the length information defining how long the decoded message is and a pointer to where the decoded message starts in RAM#1 or RAM#2. Step 302 then is performed to notify the PDA of the existence of decoded barcode message and pass the pointer and length information to the PDA.

Referring to FIG. 11, a flowchart for a more general type of PC card implemented wand interface is shown which can decode any type of barcode. It will be appreciated by those skilled in the art that the wand interfaces described herein can also be used for laser scanning engines that have a wand emulation mode and for any other type of input device which outputs a stream of 1 's and 0's in which data is encoded in the ratios of the relative run lengths. Steps 304 and 306 in FIG. 11 serve the same purpose as steps 280 and 284 in FIG. 10. Step 308 represents known decoding processes in commercially available wand-based barcode readers to decode the stream of 1's and 0's. In some embodiments, this may be done "on the fly", i.e., without storing them in a buffer, and in other embodiments, this is done by buffering some or all of the "image" data. The individual steps performed as part of step 308 are as described above with reference to FIG. 6B to determine the type of barcode which has been scanned, the direction of scan, calculation of run lengths and ratios, determining the sequences of barcode elements and decoding the sequence using an algorithm which is appropriate to the type of barcode which has been scanned, calculate a checksum and compare it to a checksum encoded in the barcode, filtering out unwanted parts of the decoded message, and appending any desired suffix or prefix characters or a termination character. Steps 310 and 312 represent the process of recording the decoded characters in either RAM#1 or RAM#2 along with a pointer to where the message starts and length information and passing the pointer and length information to the PDA with notification of the existence of the message.

Figure 12A:
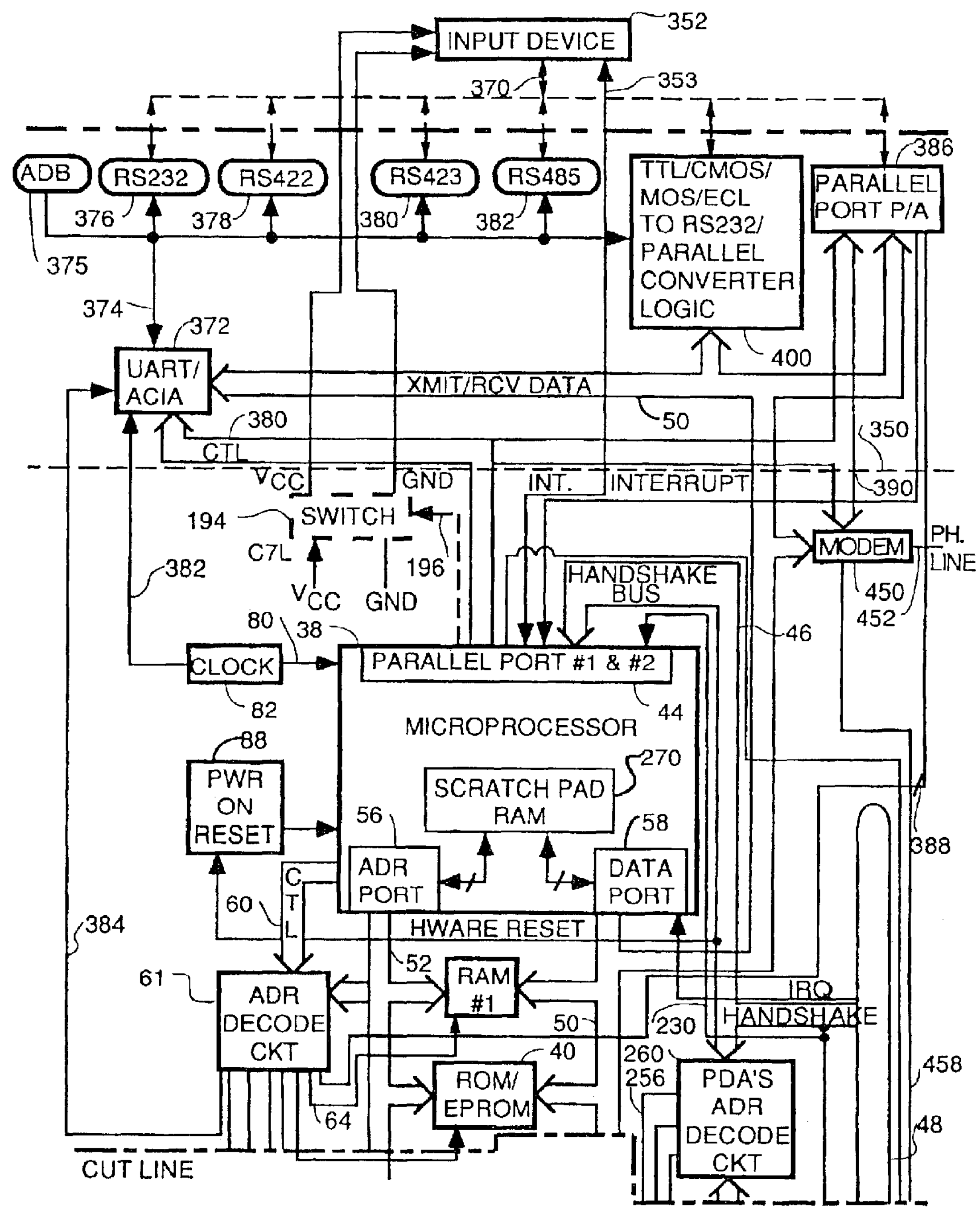
FIGS. 12A, 12B is a block diagram of a PC card interface for coupling to any type of input device which outputs serial or parallel format data or has TTL/MOS, CMOS or ECL logic level data.
Figure 12B:
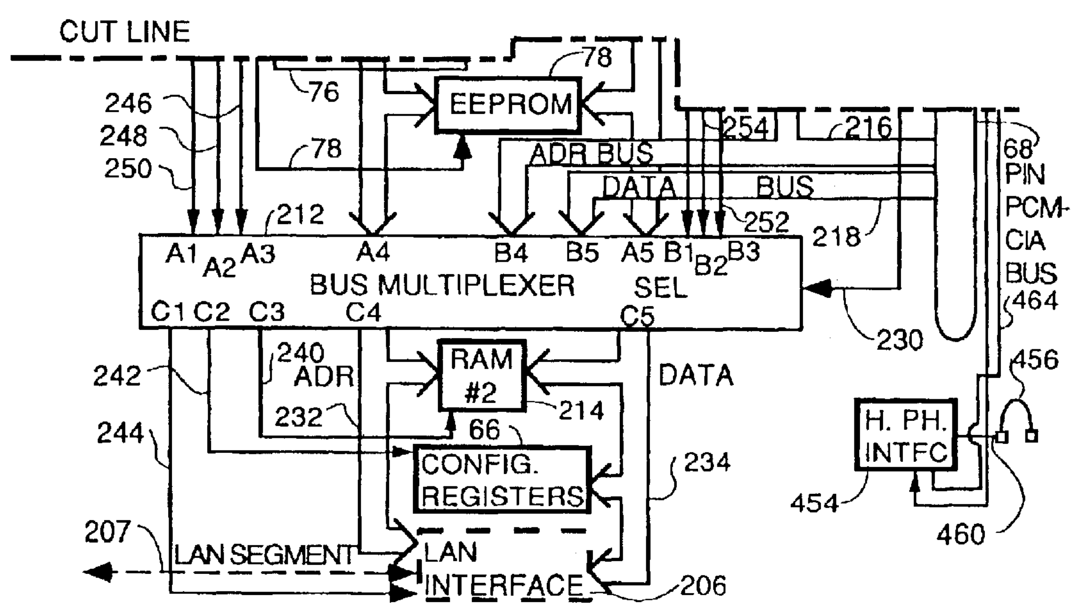

Referring to FIG. 12, there is shown a block diagram of an interface for integration on a PC card to couple virtually any type of input device that has an output port at which appear signals defined in any of the EIA defined serial interfaces, or which a parallel format output port or which outputs data at signals at standard TTL or CMOS or MOS or ECL logic levels. The circuits that have the same reference numbers as circuits in FIG. 8 have the same structure and purpose in the combination as-their counterparts in FIG. 8 and will not be described further.

Figure 13:
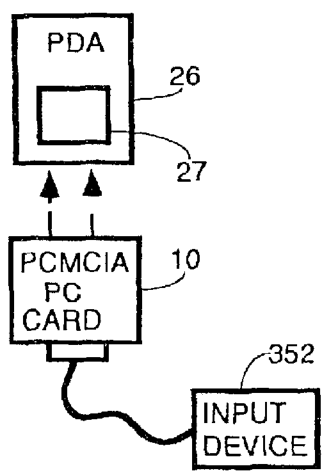
FIG. 13 shows a PC card for any input device which outputs data in HHLC, TTL undecoded, serial RS232 etc., parallel or custom format which is tethered to the PC card by a cable.
Figure 15:
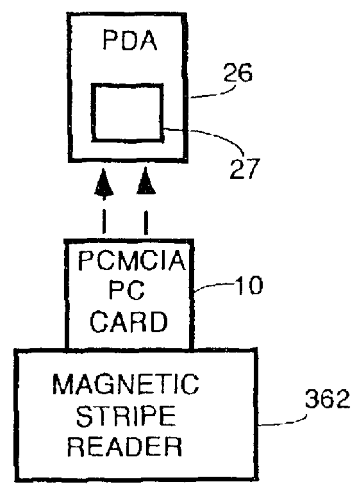
FIG. 15 represents a PC card interface for a magnetic stripe reader.
Figure 14:
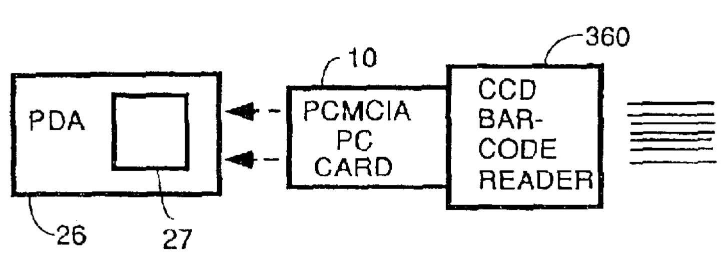
FIG. 14 depicts a PC card interface for a CCD barcode reading engine.
Figure 18:
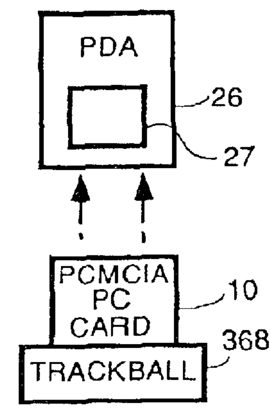
FIG. 18 represents a PC card interface for a trackball.
Figure 16:
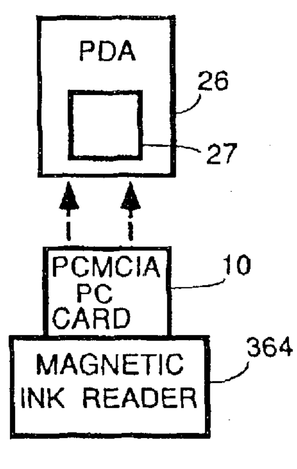
FIG. 16 represents a PC card interface for a magnetic ink reader.
Figure 17:
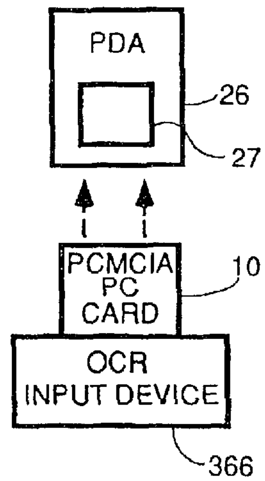
FIG. 17 represents a PC card interface for an Optical Character Recognition input device.
Figure 19:
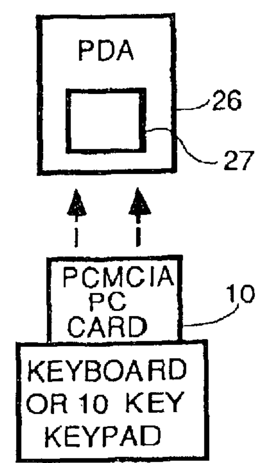
FIG. 19 represents a PC card interface for a keyboard or 10-key keypad.

The difference between the interface of FIG. 8 and the interface of FIG. 12 is in the type of signal received from the input device. In FIG. 8, the type of signal received was a single line on which either a logic 1 or logic 0. These could be at TTL or MOS or CMOS or ECL logic levels and buffer/receiver 36 would convert them to the appropriate logic levels used by microprocessor 38. The interface of FIG. 12 functions to receive virtually any format output from an input device and convert it to signals appropriate for PCMCIA Bus 48 and get the data into the PDA. The circuitry above dashed line 350 represents the interface on the PC card between the output of any conventional input device 352 and the PC card's circuitry that gathers the data, converts it to PCMCIA format for the PCMCIA Bus 48 and causes the data to be input to the PDA. This circuitry can be integrated into the PC card interface of the type shown in FIG. 12 or as shown in FIG. 3. The input device can be either integrated into a housing permanently attached to the PC card or it can be of the clip-on variety such as taught in the parent case or such as is taught in U.S. Pat. No. 4,621,189 assigned to Telxon Corporation, which is hereby incorporated by reference. In alternative embodiments such as are symbolized by FIG. 13, the input device can be tethered to the PC card by a cable carrying data, control and power lines. The input device 352 can be any known peripheral including but not limited to: (1) a laser-based barcode scanning engine which has a port for data, output in other than HHLC format (those type of laser scanners typically use the interfaces shown in FIGS. 3 or 8); (2) a charge coupled device based barcode scanning engine 360 such as is symbolized in FIG. 14; (3) a magnetic stripe reader 362 such as are used to read credit cards etc. as symbolized by FIG. 15; (4) a magnetic ink reader 364 such as is used to read MICR characters often seen on checks and bank drafts, as symbolized by FIG. 16; (5) an optical character recognition device 366 such as is symbolized by FIG. 17; or (6) a trackball, mouse or other pointing device, as symbolized by FIG. 18; or (7) a full size keyboard or 10 key keypad such as are used with full size computers as shown in FIG. 19. Virtually every computer peripheral has either a serial or parallel output port which can be used to connect the input device to the interface circuit of FIG. 12 regardless of whether the input device is integrated into a housing permanently affixed to the PC card or attached thereto by clip-on mechanical and electrical connections.

Dashed line 370 represents the connection from the input device 352 to the appropriate format electrical connection to the PC card interface circuitry regardless of whether the data transfer format is serial, parallel or TTL levels and regardless of whether the input device is tethered to the PC card by a cable or integrated into a housing which is mechanically attached to the PC card. Assuming that the connection 370 represents a serial data path containing the signals defined in any one of the EIA national standard serial format interfaces such as RS232C, RS422, RS423 or RS485, the microprocessor 38 will communicate with the input device through UART or ACIA chip 372. The UART/ACIA is a universal asynchronous receiver/transmitter which receives serial data on line 374 and places that data on the parallel format data bus 50 of microprocessor 38. In some embodiments, the UART may be built into the microprocessor 38 or its functions performed by software and registers within the microprocessor. Data to be transmitted to the input device, if any, can be put on the data bus 50 under program control and the UART will convert that data into a serial stream of data to be sent out on line 374 which is coupled to line 370. Actually lines 374 and 370 are multisignal buses and includes data transfer and control or handshaking lines carrying signals such as Clear to Send, Data Set Ready and the other signals defined in the EIA national standard. Bus 374 is coupled to each of the four different serial "ports" 376, 377, 381 and 381 symbolizing each of four different EIA defined serial interfaces. In additions, an Apple ADB port 375 is also shown to couple to input devices which output their data in ADB format. These ports 376, 377, 381 and 381 and ADB port 375 are referred to as ports even though there may not be an actual connector, and the signal lines in the serial data path may simply pass from the PC card interface circuit directly to appropriate circuitry of the input device integrated in a housing affixed to the PC card by permanent or temporary clip-on connections. The actual signals on bus 374 will depend upon which EIA standard serial port the input device 352 is coupled. Likewise, the particular UART/ACIA 372 selected will depend upon which serial interface defines the connection between the input device 352 and the PC card interface. The RS232C interface port will be used herein as an example symbolizing each of the serial interface embodiments within the teachings of the invention. In the case where a UART is selected for transceiver 372, the UART must be programmed to tell it how many data bits, start bits and stop bits to use and whether parity is odd, even or none etc. This control information depends upon the input device being used and can be given to the UART by: hardwiring the various control input pins to the appropriate logic 0 or logic 1 potential sources; connecting these pins to a status register (not shown but coupled to data bus 50) which can be written with the appropriate data under program control during an initialization process; or supplied via control bus coupled to parallel port 44 on microprocessor 38. UART/ACIA 372 is coupled to clock 82 by line 382 to control its transmit baud rate, and is selected or deselected for operation by chip select line 384 from address decoder 61. The input device 352 may generate an interrupt request on line 353 to the microprocessor 38 to tell the microprocessor that data has been sent to the UART, PIA etc. or the microprocessor 38 can periodically poll the input device via line 353 to determine when data is available for the microprocessor to pick up. In the alternative, the UART/ACIA can generate an interrupt or set a bit in a register which is polled by the microprocessor 38 to indicate when data is available for pickup.

Although the UART/ACIA and microprocessor 38 are shown as coupled to the ADB port 375, other interface electronics and software may be necessary as specified by Apple Computer in their ADB specification entitled "SPECIFICATION, APPLE DESKTOP BUS", Drawing Number 062-0267 Rev. F dated Jul. 17, 1990 or any subsequent revisions to date. The details of that specification and of the commercially available hardware and software in existing computer systems such as the Apple IIci are hereby incorporated by reference.

In embodiments where the input device outputs data in a parallel format, the input device will be connected via bus 370 to a one chip parallel I/O port referred to as a peripheral interface adapter or PIA 386. A PIA is a combination of bus transceivers and registers designed to interface peripheral equipment in parallel manner to external equipment. Although a separate PIA is shown in FIG. 12, the functionality of the PIA 386 may also be embodied in the microprocessor 38 through one of its unused parallel ports. Two or more parallel input/output channels whose I/O directions are programmable are usually available. The microprocessor 38 controls the PIA 386 via parallel port 44 and control bus 380 and through bytes written to the PIA via data bus 50. The microprocessor sends data to and receives data from the PIA via data bus 50. Data bytes are sent to output registers within the PIA and control bytes are sent to control registers within the PIA under program control. The control program executed by microprocessor 38 is responsible for, directing bytes on the data bus 50 to appropriate registers within the PIA by control over the addresses which appear on the address bus 52 and bits or control signals on control bus 380 (control registers within the PIA look to the control program of microprocessor 38 like memory locations since they are decoded using two or three chip select signals on bus 380 or bus 388. The PIA is enabled via the chip select bus 388 from address decoder 61. The PIA notifies the microprocessor 38 that data has been received from the input device and is stored for pickup via an interrupt request on line 390 or by setting a bit in one of the control registers which is periodically polled via the data bus 50. Interrupt and status control signal between the PIA 386 and the input device 352 are passed via interrupt and status control registers within the PIA to which the bus 370 is coupled.

The PIA typically has two data ports which are eight bits wide and which are coupled to the bus 370 for passing data to and receiving data from the input device 352. These ports are directional and each can be programmed to either send or receive data by setting of a control bit in a data direction register within the PIA. When the microprocessor 38 receives an interrupt request from the PIA or polls a bit in a control register within the PIA dedicated to interrupts and notes that data received from the input device is being stored in the PIA for pickup, the microprocessor 38 reads the output register within the PIA associated with the PIA port which has been programmed to receive. The data stored therein then appears on the data bus 50 and can be transferred to some internal register of the microprocessor, the accumulator thereof or to RAM #1 or RAM #2.

Typical PIA accept any signal level below 800 millivolts as logic 0 and anything above 2.0 volts as a logic 1. In the output mode, the PIA will typically supply 1.6 millivolts of sink current or one standard TTL load. The above discussion typically defines the characteristics of port PA of a typical Motorola PIA (Model 6821) Typical Motorola PtA's have different characteristics for their PB ports, and this port can be used generally if high power switching control of the input device is needed (typical current sink capability of one milliamp at 1.5 volts).

The Motorola 6821 PIA also has two discrete programmable I/O lines (CA2 and CB2) and two discrete input-only control lines (CA1 and CB1) which can be coupled to bus 370 and which respond to bits in the control registers in the PIA. The CA1 and CB1 lines can each be programmed to cause interrupts on the rising edge of data at the CA inputs for use by the microprocessor in controlling the input device and in controlling data transfers between the PIA and the input device or microprocessor 38. The CA2 and CB2 lines can be programmed to act as interrupt lines or output lines for use by the microprocessor in controlling the input device and in controlling data transfers between the PIA and the input device or microprocessor 38.

To interface with input devices which do not have either industry standard serial or parallel data outputs interface circuit 400 is provided. The details of this circuit are not critical to the invention and depend upon exactly what the input device output structure and signal levels are. Interface circuitry 400 is designed to accept whatever logic levels are inherent in the technology used by the particular input device 352 coupled to the PC card. The technologies involved can be anything from TTL to MOS/CMOS or ECL. Typically, interface circuit 400 has the same structure as either PIA 386 or ACIA 372 with whatever additional driver/receiver circuitry and level shifting circuitry is necessary to convert from the logic levels in use by the input device 352 to the logic levels used by microprocessor 38 plus the necessary data storage and control circuitry to put the level shifted data on bus 374 in serial format or on data bus 50 in parallel format in a manner consistent with discussion herein of the operation of PIA 386 and the UART/ACIA 372.

Figure 20A:
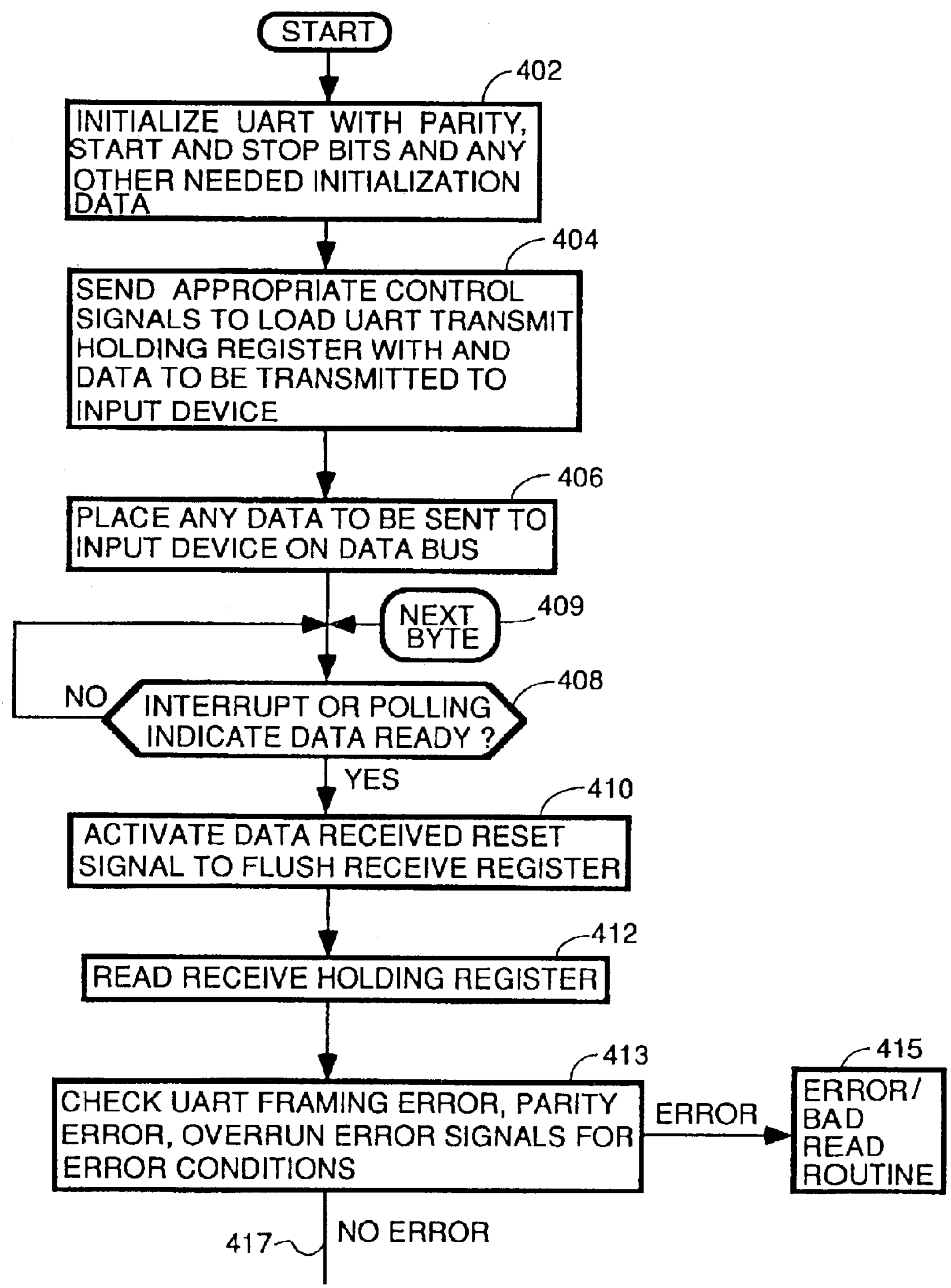
FIGS. 20A and 20B are a flowchart for the processing that occurs on the PC card to receive serial format decoded data from an RS232 etc. output from an input device and transfer it to a PDA.
Figure 20B:
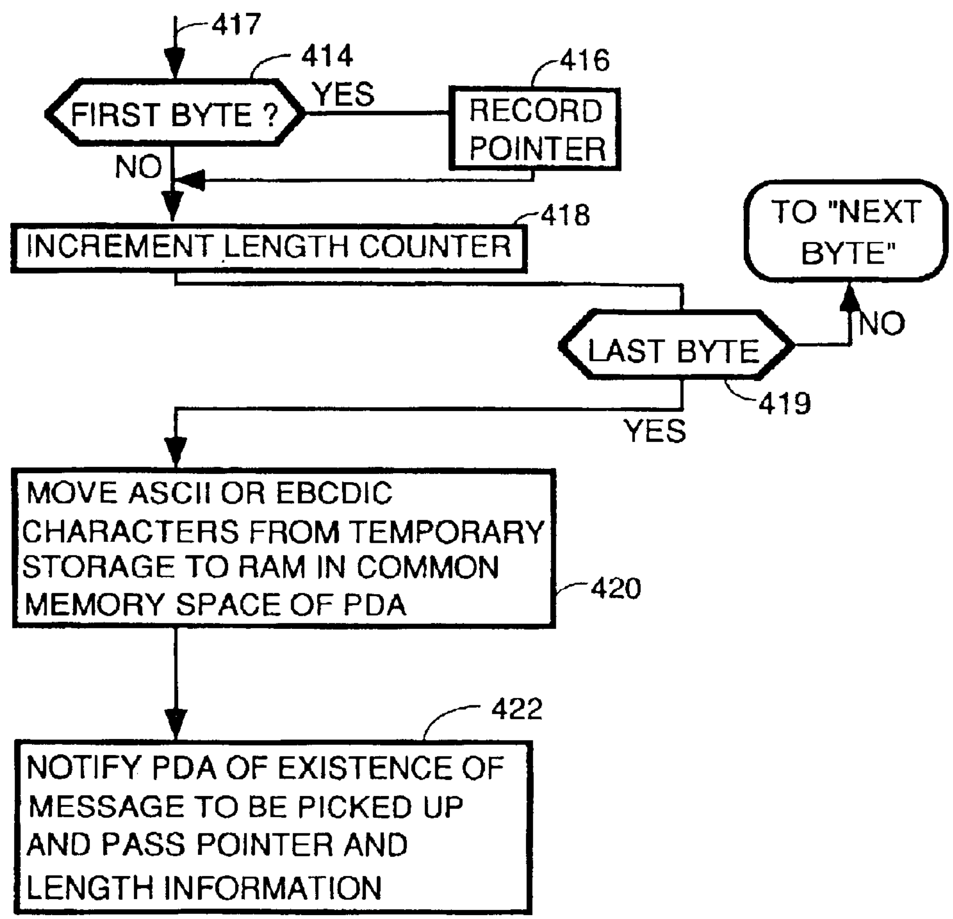

Referring to FIGS. 20A and 20B, there is shown a flow chart for the control process executed by microprocessor 38 to send data to and receive data from the input device via the UART 372. Block 402 represents the process of enabling and initializing the UART with data controlling whether parity is odd, even or not used, and controlling the number of start and stop bits to use in communicating with the input device 352. The UART is enabled by writing its address on address bus 52 thereby causing the address decode circuit to activate the chip select signal on line 384. Data is loaded into the transmit holding register by checking the status of a Transmit Holding Register Empty signal on control bus 380, and if the register is empty, placing the data to be sent to the input device on the data bus 50 (block 406) and activating a Transmit Holding Register Load signal on control bus 380. The UART then automatically performs any necessary handshaking with the input devices 352 such as activating a Request to Send line on bus 370 and waiting for the input device 352 to activate the Clear to Send control signal on bus 370. The data is then output serially at the transmit clock rate on a Transmit Data line of bus 370 by shifting it out of a parallel-in-serial-out shift register within UART/ACIA 372 coupled to line 374.

The data to be sent to the input device depends upon the input device but can include a control bit to start scanning or other data processing therein. Typically scanning or other processing is controlled by the microprocessor 38 under control of the client application 92 in FIG. 5. When the client application directs the input device to start processing, microprocessor 38 applies power thereto via switch 194 and processing automatically starts. Alternatively, power can be applied, and then the microprocessor sends a bit or control byte to the input device via steps 404 and 406 to start transmission of data to the PC card after initialization of the UART/ACIA. In alternative embodiments, the microprocessor 38 can automatically apply power to the input device via switch 194 when the PC card is inserted in its socket and the input device 352 can operate autonomously and gather data and generate an interrupt or set a “data waiting” status bit when data has been collected and is waiting for reading by the microprocessor 38.

The input device 352 typically works autonomously with the UART/ACIA to transmit data destined for microprocessor 38 to the UART/ACIA 372. Typically, the input device will gather data by reading a magnetic strip, scanning a barcode, reading a MICR character etc. and then activate a Request to Send signal line on bus 370. When the UART activates a Clear to Send line on bus 370, the data is transmitted serially to the UART/ACIA where it is shifted into a serial-in-parallel-out shift register within the UART/ACIA. The UART/ACIA 372 then loads the received data in parallel format to a Receive Holding Register within the UART and activates Data Received control/interrupt signal on control bus 380 or as a separate interrupt signal line (not shown). The Data Received signal can be used to set a bit in a register which is periodically polled by microprocessor 38 via data bus 50. The process of waiting for such an interrupt or periodically polling for a change in status of a bit set by the Data Received signal is symbolized by test 408 of FIG. 20A. The process symbolized by block 410 represents the process of activating the Data Received Reset signal on control bus 380 to flush the Receive Register internal to the UART/ACIA 372 to prepare it to receive the next byte. The process of block 412 is then performed to read the Receive Holding Register via data bus 50 and temporarily store it in a register or scratchpad RAM in microprocessor or load the data into RAM#1.

Block 413 represents the process of reading the various error signals generated by the UART/ACIA on the control bus 380 to determine if any error has occurred such as framing, parity, overrun etc. If an error has occurred, the process symbolized by block 415 is performed to perform error recovery, indicate a bad read, request retransmission or any combination of the above. If no error has occurred, path 417 is taken to step 414 on FIG. 20B.

If this is the first data byte received, step 414 detects this fact and processing is vectored to step 416 where a pointer address to the location of this first byte in RAM#1 or RAM#2 is recorded. Step 418 is then performed to increment a length counter (count kept in either software or hardware) which is used to record data that will be later used to tell the PDA how many bytes to read to get the complete message.

The test of block 419 generally represents the process of determining if any further data bytes are to be forthcoming. This can be by a timeout, a signal from the input device, a lack of activity etc. If the last byte has been received, the process of block 420 is performed although in some embodiments, each byte will be transferred into common memory and the PDA notified to pick it up without waiting for receipt of all bytes. If the last byte has not been received, processing flows to the "Next Byte" label on FIG. 20A to pick up the next byte from the UART/ACIA Generally, an input device which outputs its data on a EIA standard serial port, at least in the case of a barcode scanning engine, will have already decoded the barcode, and the serial output data will be ASCII, EBCDIC or characters from some other standard code set. In case the bits being output serially are not decoded, processing then proceeds to the type of decoding processes previously described for raw "image" data. It will be assumed in the process symbolized by FIG. 20A and FIG. 20B that the serial input data has already been decoded and is ASCII characters.

Assuming the data has not already been stored in RAM#2, the microprocessor 38 now moves the data from wherever it was temporarily stored in step 412 to RAM#2 in the shared memory space of the PDA in preparation for transfer to the PDA. This process is symbolized by step 420. In the embodiment of FIG. 12, this step involves asserting the Ready/Busy signal to lock out the PDA from the shared buses 232 and cause the bus multiplexer 212 to coupled address bus 52 to shared address bus 232 and coupled data bus 50 to shared data bus 234. The microprocessor 38 then selects RAM#2 by writing an address therein onto address bus 52 and loads the data to be transferred onto data bus 50 and activates suitable control signals to place RAM#2 in write mode via bus 240.

The microprocessor 38 then notifies the PDA 26 that there is a message to be picked up in RAM#2 (or RAM 50 in the case of an embodiment using the structure of FIG. 3) and passes to the PDA a pointer address indicating where the message starts and length information indicating how many bytes are in the message.

Figure 21:
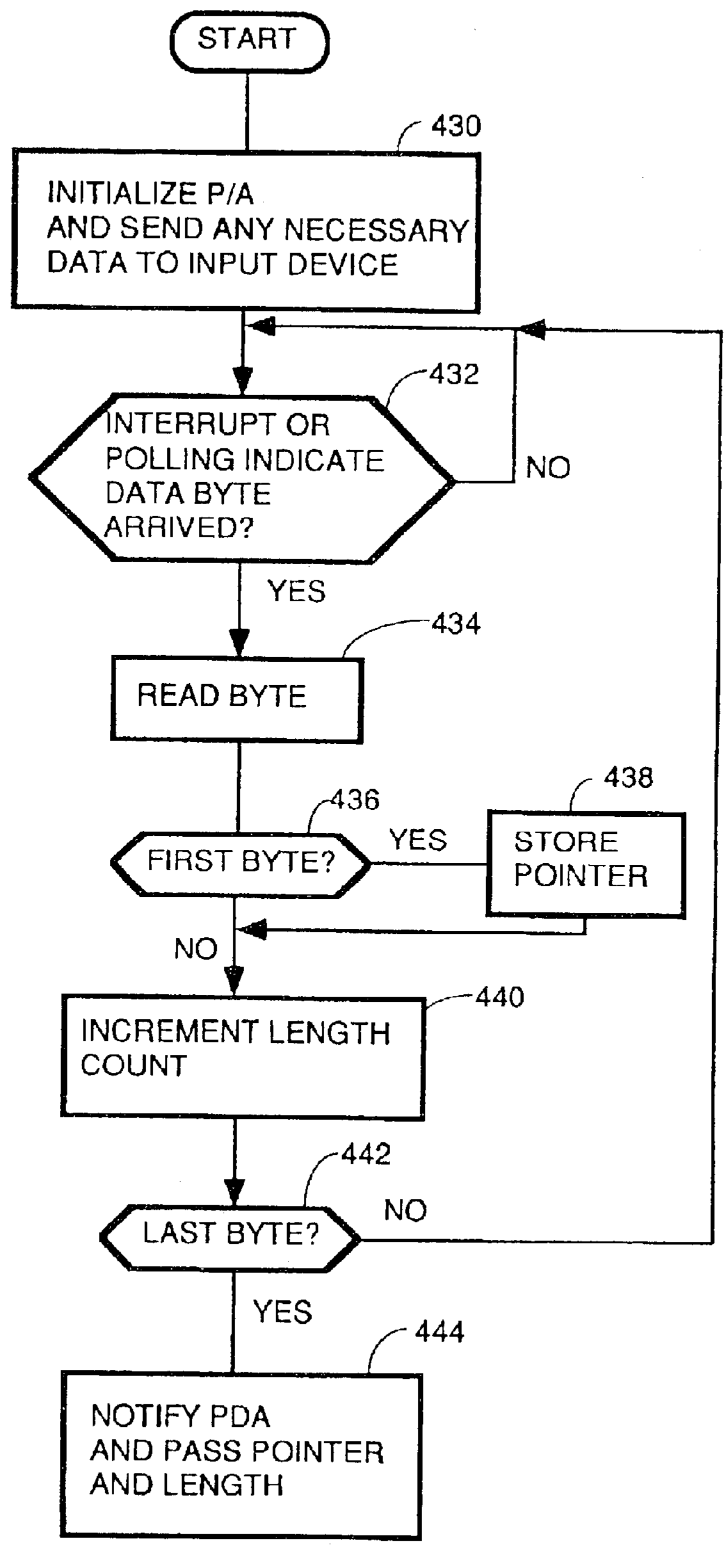
FIG. 21 is a flowchart of the processing on a PC card that receives parallel format decoded output from an input device and transfers it to the PDA.

Referring to FIG. 21, there is shown a flowchart for the processing performed by microprocessor 38 in controlling PIA 386 and using it to communicate with the input device. Block 430 represents the process of initializing the PIA by writing suitable control bits on data bus 50 and suitable control bits on control bus 380 to program the A and B ports of the PIA according to the needs of the particular input device selected for coupling to the PIA. Block 430 also represents the process of sending any necessary data to the input device to control its operations to start gathering data. Some input devices will require no data be sent from the microprocessor 38.

Typically, the input device 352 and the PIA will work autonomously together to transfer data between themselves. For example, after the input device has been powered, it begins gathering data as previously described and when data is ready for transfer to the PIA, an interrupt will be generated on bus 370, usually in the form of activation of the CA1 signal (not separately shown) on bus 370 and loading of the data byte to be transferred in parallel on the eight (or 16 etc.) parallel lines of the data path within bus 370. This data gets latched into a parallel load register within PIA 386. An interrupt will be generated by the PIA on line 390 when a byte has been latched into the PIA and the input device has activated the CA1 signal line. The test of 432 in FIG. 21 symbolizes the process of receiving this interrupt or polling for a changed status bit in one of the PIA control registers indicating a byte is waiting to be read.

Block 434 represents the process of reading the byte that was latched into the PIA from the input device and temporarily storing it. In some embodiments, since the received byte is assumed to be already decoded and the input device is assumed to already have error checked it, the byte will be immediately written into the common memory space and the PDA will be notified of its existence and where to read it. In the embodiment symbolized by FIG. 21, the byte is immediately stored in RAM#2 in the common memory space as are all subsequent bytes until a complete message is received. In other embodiments, the complete message will be stored in RAM#1 and then moved into RAM#2 and the PDA notified only after the complete message is received.

Block 436 represents the process of determining if the byte received was the first byte. If it was, the process of block 438 is performed to store a pointer indicating the address in RAM#2 in which the first byte was stored, and then the process of block 440 is performed to increment the length count. If the byte received is not the first byte, processing flows directly from step 436 to 440 to increment the length count.

The process of block 442 represents the determination of whether the last byte was received either by receipt of a signal from the input device, counting a known number of bytes that are to be sent or some other suitable methodology. If the byte received was not the last, processing vectors to block 432 to wait for the next interrupt or polling indication of the arrival of a new byte. If the test of block 442 indicates that the byte received was the last byte, block 444 is performed to notify the PDA and pass it the pointer and length information. The PDA then performs sufficient memory cycles on shared memory RAM#2 to retrieve the entire message and pass it to the client application 92.

In alternative embodiments for a PC card interface where the input from the barcode scanner is undecoded 1's and 0's defining a binary "image" of the transitions (HHLC) and where the decoding of the "image" is to be done in the PDA instead of the PC card, a two different interface configurations are used. In the first configuration, the circuitry is the same as defined in FIGS. 3 or 8, but the software is different. Basically, the software for this embodiment of interface will sample the input signal line from the receiver/buffer 36 and then simply store this data in RAM 50 or RAM#1 or RAM#2 in FIFO fashion while storing a pointer to where the image data starts and how long it is. The PDA will then be informed of the existence, location and length of the image data and will retrieve it in a plurality of memory cycles. The client application 92 running on the PDA microprocessor (or another separate decoding process) will decode the "image" data in the manner described above in, for example, FIGS. 6A, 6B and 6C, and pass the decoded alphanumeric characters to the client application in execution on the PDA that needs the data.

The second configuration for an interface where the PDA does the decoding substitutes a DMA device for the microprocessor. In addition, any additional logic necessary to perform the control functions the microprocessor 38 performs which cannot be performed by the DMA device will be added. The DMA device will receive data from the input device by interrupt processing etc. and store it in RAM within the Common Memory Space shared by the PDA. The DMA device or its supporting control logic will then notify the PDA of the existence, location and length of the binary "image" data and the PDA will decode it using a process like those previously described and pass the decoded alphanumeric characters to whatever client application running on the PDA, a network server somewhere else or by modem to another process in execution elsewhere.

There are no known barcode scanner interfaces to PDA's which utilize the PCMCIA defined PC card standard. Current portable barcode scanning systems are all proprietary, custom designed systems which are not compatible with hardware or software manufactured by other manufacturers. Users are thus locked into the offerings of only one manufactures which may not fulfill their current or future needs. This proprietary prior art technology is typified by the portable barcode scanning systems offered by Symbol Technologies Inc. and Telxon.

Another significant advantage of using a PC card interface for barcode scanners and other types of input devices is the ease and rapidity with which a malfunctioning system can be repaired. Because PC cards are removable, a malfunctioning barcode reader can be simply removed from the system by pulling out the PC card to which the barcode reader is attached and replacing the unit with another that is known to be good. The defective unit can then be repaired at a more leisurely pace without completely disrupting portable barcode scanning operations.

Another advantage of a PC card interface for an input device is the ability to simultaneously expand the memory capacity of the PDA in single PC card slot PDA's. There are many PC cards currently available which serve the sole purpose of expanding the rather limited memory capacity of some PDA's or providing network connectivity or modem capability. This allows more complex processing to be performed with larger programs.

Another advantage of using a PC card interface for an input device is the execute in-place capability of PC cards. This capability means that the software or data encoded in a PC card's memory can be executed or accessed directly from the memory of the PC card without first downloading it into the PDA memory. This means that there need be no concern that the code implementing the interface for whatever input device is connected to the PDA will be too large to fit into the PDA memory or that the data defining the "image" or decoded message data will be too large to fit in the PDA memory.

Referring again to FIG. 12, there are shown two additional circuits which are useful to add functionality to the PDA and improve user feedback for communication functions or barcode scanning or gathering of other data from the input device 352. A modem 450 coupled to the data bus 50 and the control bus 380 can be used to output the decoded alphanumeric characters or binary "image" data via phone line 452 to a process in execution remotely. Such PC card modem technology is commercially available from Cirrus Logic as model number CL-MD9624ECP/MD1414ECP, the details of which are hereby incorporated by reference. The modem design is not critical to the invention, and the PC card modems available any one of numerous manufacturers will suffice. For example, modems from Advance Circuits, Inc. of Minnetonka, Minn., AMT International Industries, Inc. of Huntington Beach, Calif. or any of the other manufacturers of PC card modems listed in the PCMCIA Reference Book of Spring 1994 (hereby incorporated by reference) will suffice. The details of these modems are hereby incorporated by reference. The modem 450 can be included within the circuits of FIGS. 3 or 8 as well in alternative embodiments as can headphone interface 454. In addition, modem 450 can be a cellular modem of any of the types which are currently commercially available from the sources listed in the PCMCIA Resource Reference Book of Spring 1994. The details of these cellular modems is hereby incorporated by reference.

In addition, a headphone interface 454 coupled to a headset 456 or headset jack provides audible feedback signals to the user for such events as successful decode tones, dial tone received by the modem 450, DTMF dialing tones, ringing sounds, answering modem tones or carrier detected by modem 450. The modem outputs audio signals to the headphone interface 454 via line 458. The headphone interface is also connected to a pin in the parallel output port of the microprocessor 38 by line 464 to receive a signal indicating either a successful decode or a bad read. Typically, the microprocessor 38 will change the logic state of the line 458 at a first audible frequency rate upon achieving a successful decode and will change the logic state of line 464 at a second audible frequency rate upon detection of a bad read. The headphone interface 454 provides buffering and amplification for the signals on lines 464 and 458 and applies the amplified signals to the headset 456 via line 460.

Figure 22:
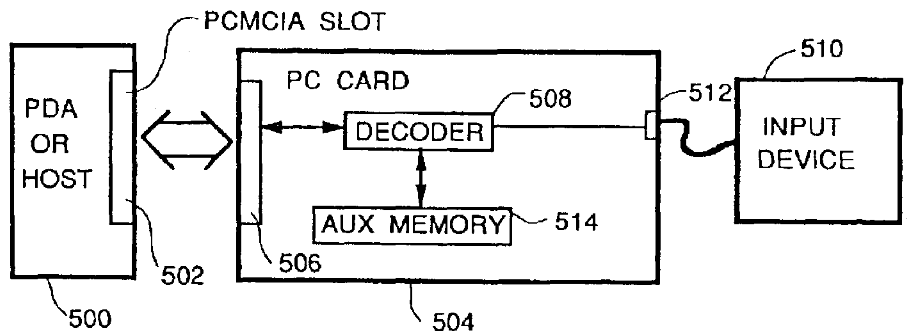
FIG. 22 is a block diagram of an embodiment of a PC card which can decode undecoded barcode scan data from a barcode scan engine which can be either integrated on the PC card or tethered to it by a cable, and which uses only a decoder chip and auxiliary memory and which inputs decoded alphanumeric characters to the host through a PCMCIA slot. The decoded data is also stored in the auxiliary memory of the PC card by the decoder circuitry thereof in some embodiments.

Referring to FIG. 22, there is shown a block diagram of another embodiment of the invention. The embodiment of FIG. 22 symbolizes a class of embodiments where decoded or undecoded data (preferably undecoded) from a barcode scanning device is received by an interface circuit on a PCMCIA form factor PC card, the interface circuit including memory and nonvolatile memory (preferably flash EPROM), the interface for decoding the data and making the decoded data available to any application running on a host computer having a PCMCIA slot and the memory on the PC card. In a subset of species within this genus, the interface circuit on the PC card also makes the PC card memory available to the host computer and makes the decoded barcode data available to the memory on the PC card. This allows barcode scanning devices to be plugged into host computers and have their data sent to the host over a parallel format, open systems bus rather than through a serial port and it also allows scanning all day using a PDA such as in doing inventory and then placing the PC card into a host computer with a PCMCIA slot at the end of the day and rapidly downloading the scanned data into the host through the PCMCIA bus. The architecture of embodiments represented by FIG. 22 is faster, cheaper, more maintainable and more flexible than custom designed portable barcode scanning computers. When the host breaks or becomes obsolete, it can be replaced with a new host. Likewise, when the barcode scanning device breaks or becomes obsolete, it can be quickly replaced with a new one without the need to design a new interface or write new code. Further, when new host PDA's become available with more built-in features, such as built in cellular modems or ethernet interfaces, those features can be used to advantage by the barcode scanning PC card.

Preferably, the amount of nonvolatile memory on the PC card will be sufficient to store a whole day's worth of scan data which can then be downloaded at the end of the day onto another host with a PCMCIA slot by removing the PC card from its portable host computer and placing the PCMCIA card into the PCMCIA slot of a desktop host/mainframe etc. The preferred functionality of the PC card will include hardware and software on the PC card which can decode undecoded barcode scanning data and store the resulting alphanumeric characters either in any memory of the host computer including the keyboard buffer or the memory on the PC card or both.

In FIG. 22, a Personal Digital Assistant or other host computer 500 has a PCMCIA slot 502 which has a connector therein. The connector is circuitry and software of the host computer that implements the PCMCIA interface described in FIG. 5 and the PCMCIA specifications incorporated by reference herein. The details of the software layers 104, 106, 110 and the hardware interface 115 are known to those skilled in the art and are industry standard as are the interface between the various layers. Together, these software drivers and socket hardware implement a PCMCIA bus the conductors of which are the pins of the connector-in PCMCIA slot 502.

A PC card 504 slips into the PCMCIA slot 502. The PC card has a PCMCIA connector and PCMCIA interface circuit 506 which mates with the PCMCIA connector in slot 502. The PCMCIA bus is coupled to a decoder 508 which is usually a programmed microprocessor but which could also be a custom integrated circuit or any other type circuitry capable of decoding undecoded signals received from an input device 510. The input device can be any type device which outputs electrical signals which encode alphanumeric information. The electrical signals can be generated in any way and represent alphanumeric characters in any form of coding of, for example, contrasting areas of an image such as a barcode, two dimensional barcodes such as the codes referred to as PDF-417 or Code 49K or MICR images, OCR output, keyboard codes, magnetic transitions on a magnetic strip etc. Examples of such an input device 510 are an undecoded type electrooptical and/or magnetic or mechanical type input device, or, preferably, an undecoded barcode scan engine 510. Specifically excluded from the type of input devices having interfaces that fall within the scope of the invention are Ethernet™ or other LAN interface circuits, modems, cellular phones or cellular modems and any other input device for which PCMCIA card interface circuitry currently exists in the prior art. Hereafter, the "input device" 510 may be referred to as a barcode scan engine or scan engine, but those skilled in the art will appreciate that such references either in the specification or the claims refer to any type of input device which outputs signals which are either digital in nature and need decoding either in the host computer or the PC card, or are analog in nature and need to be sampled and converted to digital data and then decoded either by the host computer or the PC card and for which a PCMCIA PC card interface does not already exist.

In FIG. 22, the input device 510 is coupled to an input port 512 on the PC card 504 but could also be integrated on the PC card physically. The input port 512 can be any form of input interface circuit that receives electrical signals in whatever form they are output by the input device 510 and converts them to whatever form is used by a decoder 508. The terms input port or input interface circuit as used herein or in the appended claims refer to just such a circuit. The PC cards described herein having an interface circuit for getting alphanumeric characters decoded from signals generated by a barcode scan engine or for getting digital samples of undecoded barcode scan engine output signals into a host computer through the PCMCIA slot of the host or for getting alphanumeric characters output by the barcode scan engine into the host computer through the PCMCIA slot, are sometimes referred to in the claims appended hereto as PC card form factor interfaces to barcode scan engines.

In embodiments where the input device 510 is integrated on the PC card or physically mounted to the PC card, the input port, as that term is used in the claims appended hereto, means the conductor(s) of the data path that couples the electrical signals from the input device either to the decoder circuit or the PCMCIA adapter chip/interface circuit for coupling to the host computer 500.

The PC card also contains auxiliary memory which is used to store decoded alphanumeric data from the decoder 508 prior to delivery to the host computer 500 and which may also be used by the host computer to augment its internal memory to provide additional storage. In alternative species of the genus of embodiments represented by FIG. 22, one or all of the auxiliary memory 514, the PCMCIA interface circuit 506 and the input port 512 can be integrated into the integrated circuit that is currently depicted as decoder 508.

Figure 23:
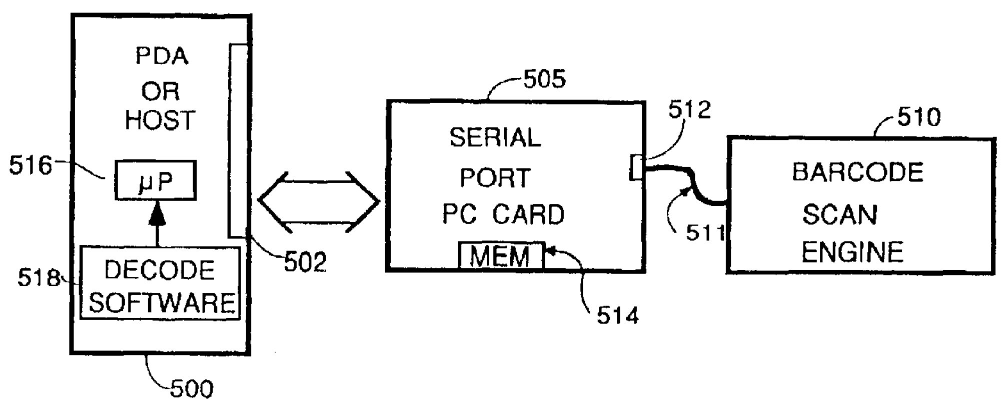
FIG. 23 is a block diagram of the invention that uses a serial port PC card to import undecoded barcode scan engine data into the host through a PCMCIA slot for decoding on the host.

Referring to FIG. 23, there is shown a block diagram of an embodiment of the invention that uses a serial port PC card to import undecoded barcode scanning engine or other input device output signals into a host computer for decoding on the host. In this embodiment, the undecoded output signal of the barcode scanning engine 510 is coupled by signal line 511 to the status pin of serial port 512 on the PC card 505. The PC card can be any serial card, but preferably is a serial card with a buffer 514 that can store the undecoded data from the barcode scanning engine or other input device temporarily until the host has a chance to access the serial card and download the data for decoding. Memory 514 can also be used as external memory for the host through the PCMCIA connector without blocking access to the other circuitry on the PC card, in the manner described below in connection with the description of FIGS. 29A, 29B and 29C. The serial port PC card can run as either a memory card or I/O mapped and can be either interrupt driven or polled and is adaptable to any PCMCIA compatible host computer. Preferably, the serial card has the capability of taking a TTL level output signal on line 511 that transitions between logic 1 and logic 0 and place it on a pin of the PCMCIA bus connector 502 which is polled by the host computer 500 periodically. The host records the logic state at each sample time in a buffer on the host and uses the digital samples derived thereby to decode the alphanumeric characters that are encoded in the samples.

The serial port PC card functions to receive and temporarily store data that is bound for the host computer and to cooperate with the host computer either by an interrupt or polling based scheme to get the stored data into the host for decoding.

The host computer has a microprocessor 516 which is controlled by known decode software 518 to access the data from the serial card 505 and decode it. The details of the decode software 518 are not critical to the invention, and any known decode software will suffice as block 518 in FIG. 23 for controlling processing of the microprocessor 516 in the host computer. However, software of the class exemplified by the flow chart of FIGS. 6A through 6C represents one example of typical details of processing of undecoded barcode signals into alphanumeric characters.

Of course, the use of a full fledged serial card is not necessary in the embodiment of FIG. 23 since RS232 protocol serial communication is not occurring. In an alternative embodiment then, the serial port PC card 505 in FIG. 23 is a custom designed serial communication card which is optimized to handle communications on only one or two (possibly more) serial data lines between the card and the scan engine, one to receive a serial format signal from the scan engine and another, perhaps, to carry a power control signal to the scan engine to start and stop scanning thereby.

Figure 24:
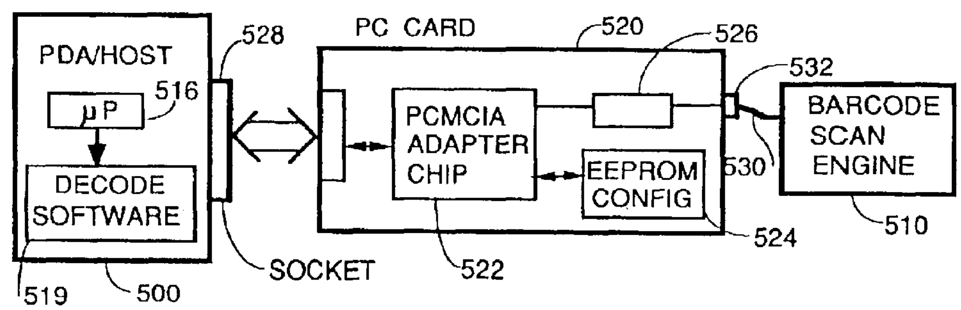
FIG. 24 is a block diagram of another embodiment of the invention, wherein a PC card with a PCMCIA adapter chip receives undecoded data from a barcode scan engine and inputs the undecoded data into a host for decoding by the microprocessor of the host.

An example of a more specialized barcode interface in the PC card form factor where decoding is done on the PDA or host 500 is shown in FIG. 24. As in the case of FIG. 23, the PDA contains a microprocessor 516 processing of which is controlled by decode software 519. The decode software 519 is adapted receive data from a PCMCIA adapter chip 522 on the PC card and decode it. The decode software also includes, in some embodiments, interrupt service routines to receive interrupts from the adapter chip indicating data is ready to be sent to the PDA and for controlling the microprocessor to access the data and store it in a memory of the PDA or host for decoding. The decode software may also include, in some embodiments, routines to write data to an EEPROM memory 524 on the PC card to conFigure the PCMCIA adapter chip. Alternatively, the EEPROM can be used by the host for any purpose.

In the embodiment shown on FIG. 24, the PC card 520 consists of a PCMCIA adapter chip 522, an EEPROM configuration memory 524 and possibly a level shifting or buffering circuit 526. The adapter chip 522 functions to manage the interface to the PDA or host through the PCMCIA socket 528. The PCMCIA socket 528 is intended to represent all the software layers and PCMCIA hardware interface resident on the host and described with reference to FIG. 5. A typical example of the type of adapter chip that could be used is the Z86017 adapter chip which is commercially available from Zilog Inc. of 1355 Dell Avenue, Campbell, Calif. Phone (408) 370-8000.

The function of the configuration memory 524 is to store configuration data which sets up the adapter chip to function in the manner needed to import data from an undecoded barcode scan engine and get it into the host computer 500. The PCMCIA interface has many different modes and peculiarities defined in the PCMCIA specifications incorporated by reference herein. Therefore, typical PCMCIA adapter chips have a host of different features to be compatible with the PCMCIA interface only some of which are needed to interface to a barcode scan engine. The configuration memory stores configuration data that turns on the features of the adapter chip that are needed and defines how the adapter chip is to operate.

The function of the level shifter/buffer circuit 526 is to make any necessary adjustments in voltage levels needed to interface the undecoded signals arriving on input line 530 at input port 532. The buffer circuit 526 optionally may also serve to isolate the adapter chip from any possibly damaging voltages that might be placed on line 530 accidently.

Figure 25:
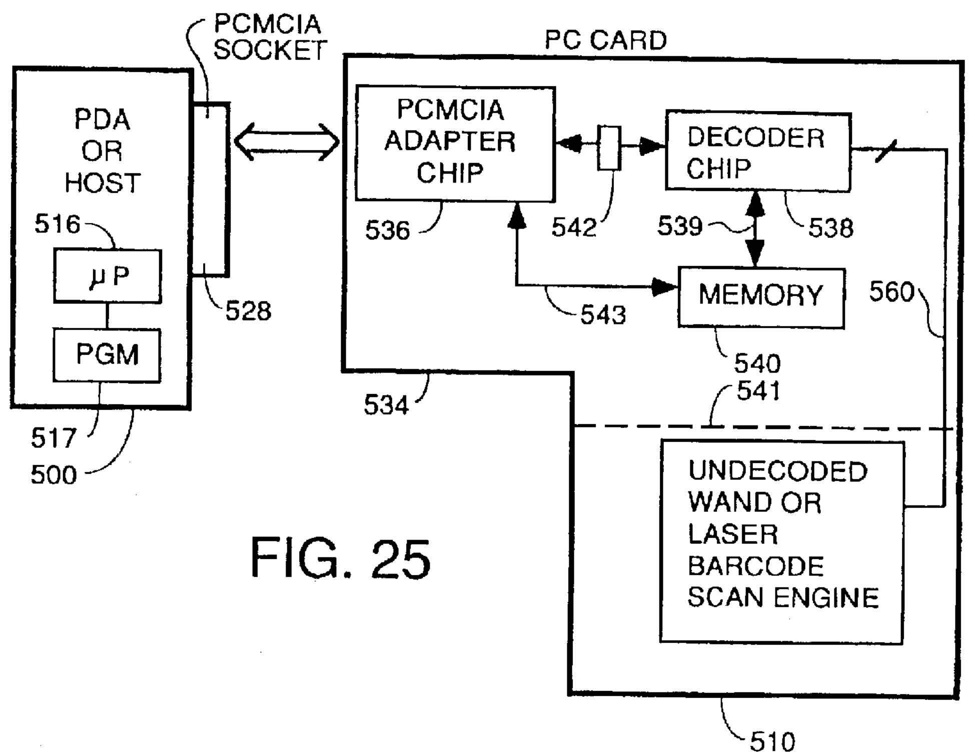
FIG. 25 is a block diagram of a favored embodiment of a PC card with a decoder chip and a PCMCIA interface chip which receives undecoded barcode scan data from an integral or tethered barcode scan engine, decodes the data and sends it to a host computer through a PCMCIA slot and which provides auxiliary nonvolatile memory to the host computer.

Referring to FIG. 25, there is shown a block diagram of the preferred embodiment of practicing the invention. In this embodiment, the PDA or host 500 does not do the decoding of the signals from the scan engine 510. Instead, the decoding is performed by a commercially available barcode decoding integrated circuit on the PC card. The PC card 534 in the embodiment of FIG. 25 is comprised of a PCMCIA adapter chip 536 that handles the interface with the PCMCIA socket 528, a “hardwired” barcode decoder chip 538 and a memory 540. In some embodiments, the memory 540 supports the operation of the decoder chip 538 as symbolized by bus 539. The memory 540 also provides external storage for the PCMCIA adapter chip 536 and/or the host computer 500, as symbolized by bus 543. In the preferred embodiment, the memory 540 is approximately two megabytes of nonvolatile flash EEPROM. In the preferred embodiment, the barcode scan engine 510 is integrated into or physically attached to the PC card in such a way that when the PC card is inserted in the PCMCIA socket, the barcode scan engine extends beyond the PCMCIA slot and is mechanically supported by the PC card’s engagement with the PCMCIA slot. This allows one-hand scanning of barcodes by moving the PDA such that the scan engine’s laser beam or wand optical port passes over the barcode to be scanned within the scanning range of the particular scan engine selected. The scan engine can be laser based, a charge coupled device or a wand. Further, the scan engine can be connected to the PC card by a cable in some embodiments rather than integrated on the PC card as symbolized by dashed line 541.

The undecoded signals from the scan engine 510 are input to the decoder chip 538 where they are decoded into alphanumeric characters. The decoder chip 538 is typically a microcontroller with barcode decoding routines hardcoded into internal ROM. One example of such commercially available chips is the HP 2312 series available from Hewlett-Packard of Palo Alto, Calif. the details of which are hereby incorporated by reference. The decoded characters are stored in memory 540 until the PCMCIA adapter chip 536 retrieves the data from the memory. Block 542 represents any necessary interface circuitry to couple the PCMCIA adapter chip to the decoder chip. In the preferred embodiment, it is an 8-bit parallel interface chip. The adapter chip then generates an interrupt to the PDA or host to tell it that characters are ready to for retrieval by the PDA. In the preferred embodiment, the interrupt to the host passes to the host a pointer to the location on the PC card where the character or message is stored, and if more than one character is stored, the interrupt may also pass length information indicating how many characters are stored. A program 517 in the host 500 then executes an interrupt service routine and perform either an I/O or memory cycle with the PC card to retrieve the decoded alphanumeric character. In the preferred embodiment, the character or message thus retrieved is placed in the keyboard buffer of the host. In alternative embodiments, the retrieved characters can be stored elsewhere in memory of the host for use by any application program.

Figure 26:
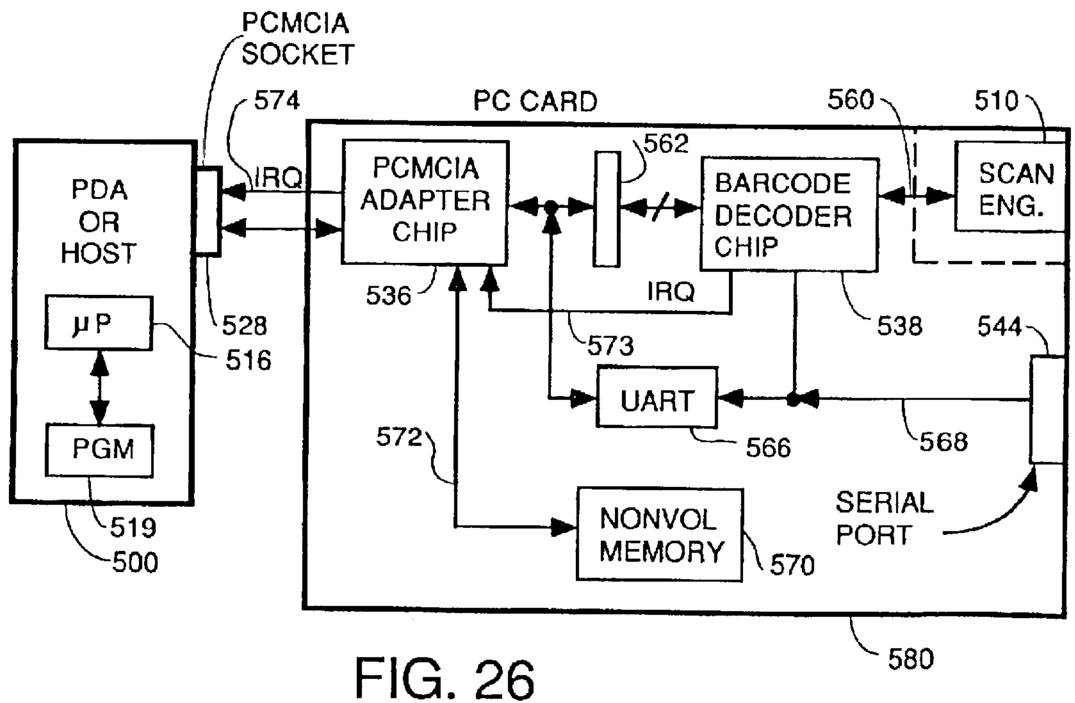
FIG. 26 is a block diagram of a PC card with all the features of the embodiment of FIG. 25 plus a UART which can receive serial decoded data from any input device which outputs serial format alphanumeric characters and which can input the received alphanumeric characters into a host through the PCMCIA slot.

Referring to FIG. 26, there is shown a block diagram of another species of the preferred embodiment where decoding of undecoded barcode scan engine data is done on a PC card. In this embodiment, the undecoded barcode scan engine data can be received from either an undecoded scan engine 510 which is integrated on the PC card or through a serial port such as an RS232 connector which may be connected to any type of decoded barcode scan engine or other type of input device such as a magnetic stripe reader, OCR device, etc. which outputs alphanumeric characters or other data which can be used as input by the PDA or host such as keyboard scan codes that the PDA or host receives and stores in a keyboard buffer.

The embodiment of FIG. 26 uses a PCMCIA adapter chip 536 which is preferably a Zilog Z86017, and a decoder chip 538 which is preferably an HP 2312 from Hewlett Packard. The decoder chip received undecoded barcode scan data on line 560 from the scan engine and decodes it into alphanumeric characters. The decoded characters can be output to the adapter chip 536 in either parallel format through a parallel 8-bit buffer/latch 562 or serially through data path 564 and UART 566. The UART is also coupled by data path 568 to serial port 544. In alternative embodiments, the UART 566 could be eliminated and only parallel data transfer used or the parallel buffer/latch 562 could be eliminated and only serial data transfer used.

The PC card also includes nonvolatile memory 570 that is coupled to the adapter chip 536 via data path 572 which is available for use by the host for any purpose. In some embodiments, the nonvolatile memory will also be accessible to the decoder 538. In the preferred embodiment, memory 570 is Intel flash EEPROM because of its dependable nonvolatility. However, in other embodiments, the nonvolatile memory 570 could also be battery backed up static RAM or battery backed up dynamic RAM.

In the embodiment of FIG. 26, the adapter chip receives an interrupt from the decoder chip 538 via line 573 each time an character has been decoded and is ready for pickup. The adapter chip 536 then picks up the character and generates an IRQ interrupt to the host on line 574. A program 519 stored on the host computer controls operations of a microprocessor 516 in the host 500 to execute an interrupt service routine to retrieve the character from the adapter chip and place it in the keyboard buffer of the host. An exemplary program to perform the function of program block 519 is included herewith at Appendix A. This program is written in C++ and can be ported to any host with a suitable compiler. Alternatively, the program 519 could transmit the character to another application running on a multitasking host computer. In alternative embodiments, the program 519 can control the microprocessor to move the decoded character or message from the adapter chip 536 into the memory space shared between the PC card and the host.

In the embodiment shown in FIG. 26 using the program of Appendix A, the nonvolatile memory 570 is available for use by the host 500 as external memory after the host is rebooted. In such a case, no decoded barcode data can be input to the host. The current state of PCMCIA socket implementations on host computers do not reliably support multifunction PC cards. The only type PC cards that are broadly supported by a wide range of host computers are certain type of flash memory cards, and modem cards or LAN interface cards. Most non-PDA hosts with PCMCIA slots do fully implement the various software and hardware layers discussed in FIG. 5, however many PDAs do not fully implement all the software layers discussed in FIG. 5. This can cause problems with operability of multifunction PC cards or PC cards other than flash memory cards, modem cards or LAN interface cards. The problem with multifunction cards that include flash memory along with other functionality such as the barcode decoding circuitry of the embodiment of FIG. 26 is that when the flash memory driver of the host 500 takes control of the PCMCIA socket for access to the memory, that precludes other driver software on the host 500 from using the PCMCIA socket to access the other functionality on the PC card. Most hosts with PCMCIA sockets come equipped with drivers that execute at boot time and look for PC cards present in the PCMCIA slot, and if they find one, they try to determine what type of card it is and then take over the PCMCIA socket and carry out operations with the PC card. These drivers supplied by the host manufacturer will find flash memory on the PC card 580 in FIG. 26 and will block all access through the PCMCIA socket to the decoded data from the barcode decoding chip. Therefore, it is necessary in the embodiment symbolized by FIG. 26 to disable these drivers and use a custom written driver for controlling PCMCIA socket 528 which will accept the decoded alphanumeric data from the decoder chip 538. In one embodiment where a DOS based host was used, the standard drivers that came with the host were disabled by commenting them out in the config.sys file. In other types of hosts, similar steps should be taken to prevent blocking of the PCMCIA slot by the standard PCMCIA drivers. The custom driver that is used in these embodiments is attached hereto as Appendix A. This driver will still not provide access by the PDA to the flash memory 570 in addition to access to the decoded alphanumeric data unless the host is rebooted, but in other embodiments a different custom driver 519 will provide access to both the nonvolatile memory 570 as well as the decoded alphanumeric data from the decoder chip 538 without rebooting. In some embodiments, this difficulty can be eliminated by eliminating the flash memory, but in the preferred embodiment the flash memory is present because most PDA's and palmtops are severely limited in onboard memory which limits their usefulness.

Figure 27:
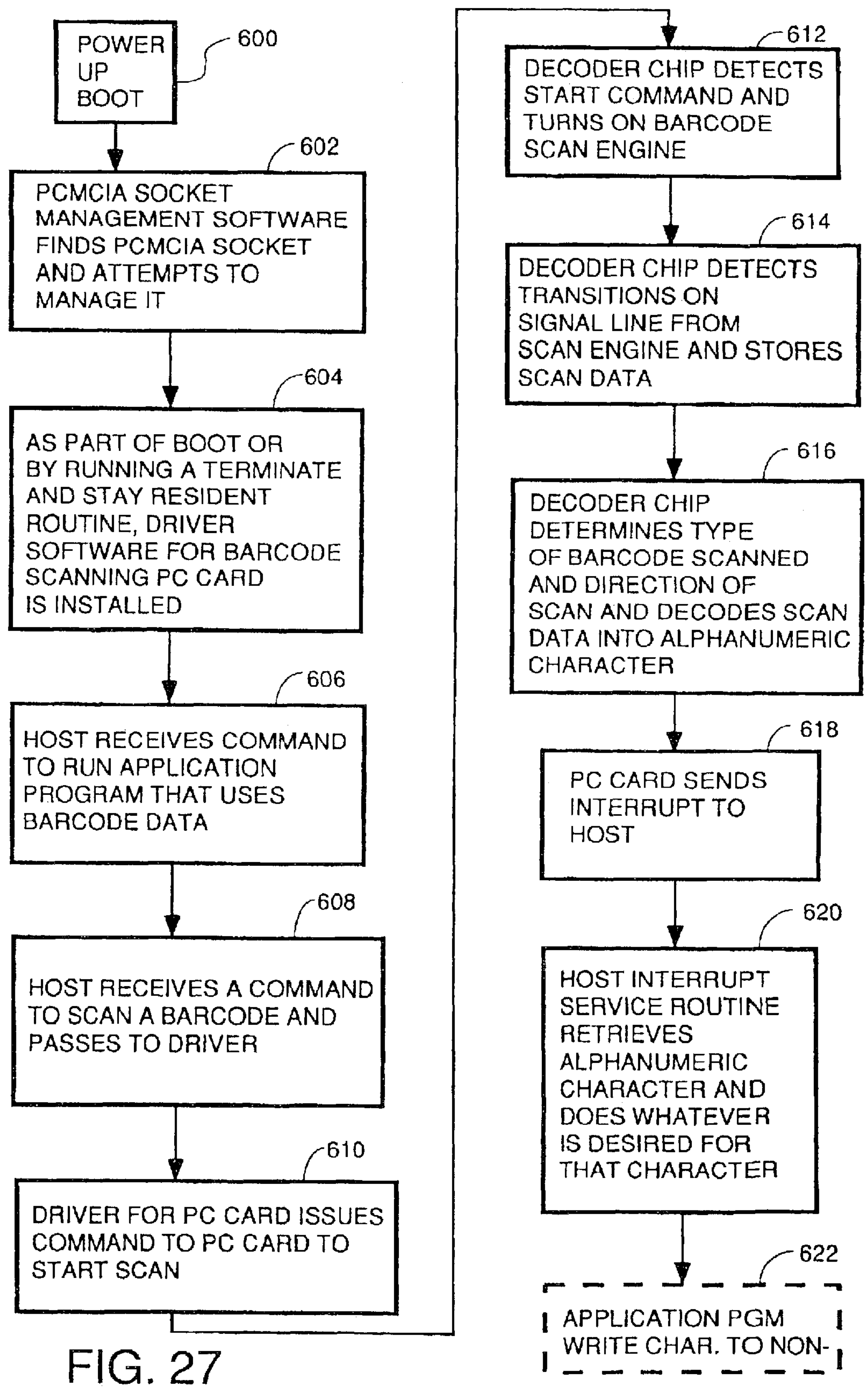
FIG. 27 is a flowchart of a typical process that occurs in scanning barcode data using a host computer having a PCMCIA slot with a PC card having the architecture of either FIG. 25 or FIG. 26.

Referring to FIG. 27, there is shown a flowchart of a typical process that occurs in scanning barcode data using a host computer having a PCMCIA slot with a PC card having the architecture of either FIG. 25 or 26. Block 600 represents the process of "booting" the host computer which happens when power is first applied or a reset is given. Block 602 represents the process whereby the PCMCIA socket software supplied by the manufacturer of the host executes (other than a flash memory driver or other driver supplied by the manufacturer of the host which would block access to the barcode scan engine interface PC card), looks for a PCMCIA socket, finds one and attempts to manage the socket. Block 604 represents the process of installing the driver software for the barcode scan engine interface PC card. Typically this is done at boot time as part of the boot process or subsequently in execution of a terminate and stay resident process. The driver software installed is specifically designed to interface between the operating system of the host and any application programs that require barcode data and the particular circuitry on the PC card. Any driver software that can perform this interface function to receive commands from the operating system and/or application program dealing with configuring, retrieving data from or sending data to the PC card and passing decoded barcode data to the application program and/or operating system will suffice for purposes of practicing the invention. In some important alternative embodiments, the driver software will also serve to interface the host operating system and/or application programs to the nonvolatile memory on the PC card for use as expansion memory.

Block 606 represents the process wherein the host receives a command from a user to run an application program that requires data such as barcode data. This application program however can be any program that uses keyboard data because in the preferred embodiment, the driver for the barcode scan engine interface PC card places the decoded data from the scanned barcode into the keyboard buffer of the host. Therefore, the application started in step 606 can be a spreadsheet, word processor etc.

Block 608 represents the process whereby the host receives a command to scan a barcode. This can be through a command entered to the application program from the keyboard, by light pen or any other form of input and can also be a command entered directly to the operating system of the host through the routines that scan the keyboard, mouse, trackball, touch screen etc. for input data from the user. This start scan command is passed to the driver for the PC card which then sends the appropriate signal to the PC card that scanning of a barcode is desired, as symbolized by block 610.

Block 612 represents the process of the barcode decoder chip 538 in FIGS. 25 and 26 detecting the receipt of this start scan command and sending an appropriate signal to the scan engine to either start scanning or apply power thereto and start scanning.

At this point, as soon as a barcode is brought within the range of the scan engine, barcode scanning signals will begin to appear on bus 560 in the form of transitions between different voltage levels as the light and dark patterns of the barcode are sensed by the scan engine. The decoder chip 538 senses these transitions and does with them whatever it is programmed to do internally by the program stored therein. Typically these transitions are sampled or otherwise processed to determine the relative spacings between the transitions and this spacing information is used in determining what type of barcode was scanned, the direction of scan and in decoding the barcode to generate one or more alphanumeric characters such as ASCII or EBCDIC. This process is represented by blocks 614 and 616.

After at least one alphanumeric character has been decoded, the PC card sends an interrupt to the host computer as symbolized by block 618. Typically, this is done by the decoder chip 538 activating the IRQ interrupt line 573 to the PCMCIA adapter chip 536 which then activates the IRQ interrupt line 574 coupled across the PCMCIA bus to the host PCMCIA connector. Block 620 represents the process carried out by the interrupt service routine that handles interrupts from the PC card to retrieve the alphanumeric character from the PC card and does with the character whatever is appropriate. In some embodiments, the retrieved character will be passed to the application program started in block 606. In other embodiments, the retrieved character will be stored in the keyboard buffer for use by the application started in block 606. In still other embodiments, the retrieved character will be written to the nonvolatile memory on the PC card for portability to another host computer. Alternatively, the interrupt service routine can store all the retrieved characters as they are retrieved either one by one or as a whole message in memory of the host for later batch processing by an application program on that host.

Figure 28:
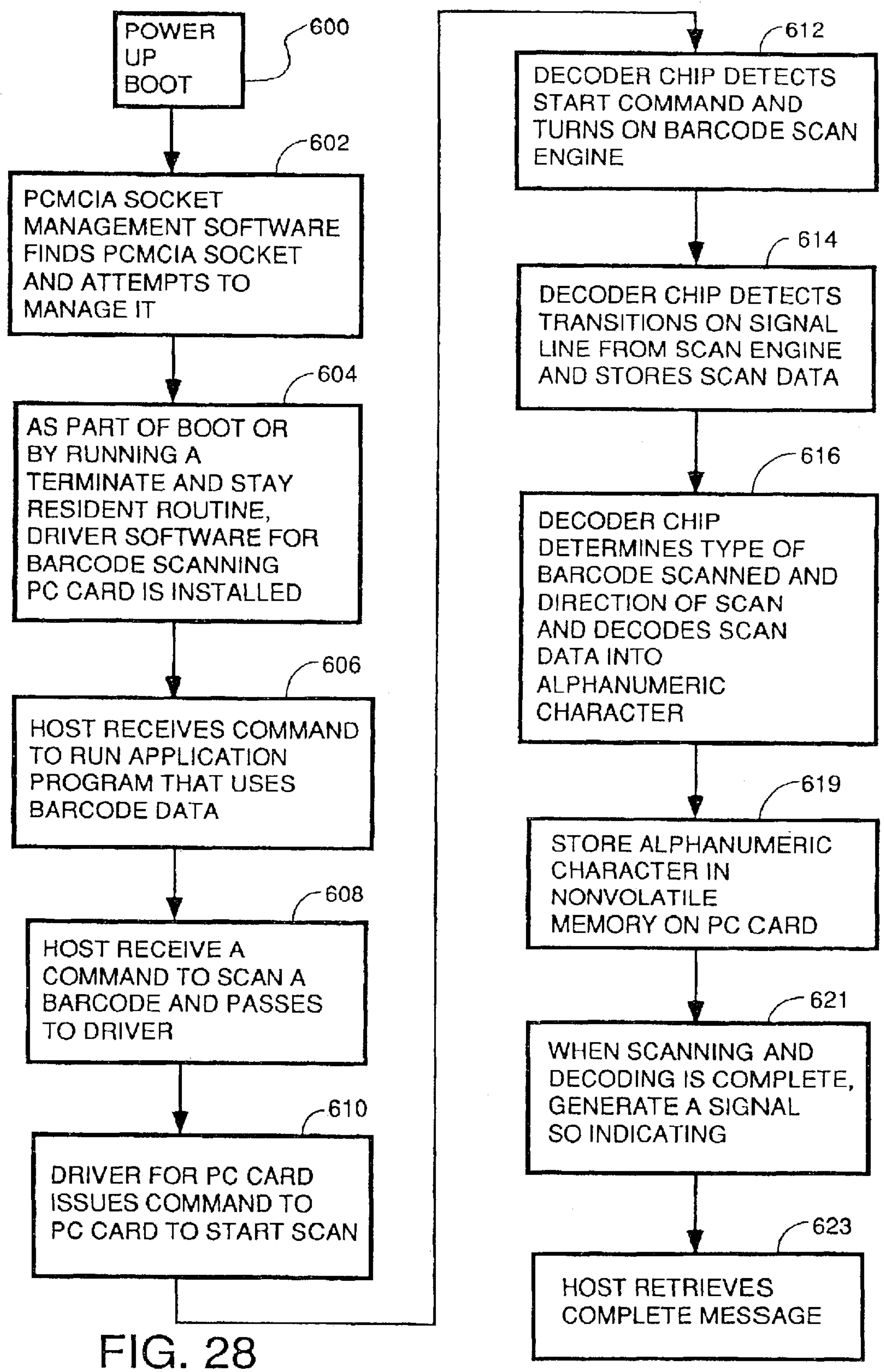
FIG. 28 represents a class of embodiments which are modifications of the embodiments symbolized by FIG. 27 wherein the decoded data from a complete session of barcode scanning of one or more barcodes is stored in the nonvolatile memory on the PC card before an interrupt is generated to the host computer, i.e., an interrupt is not generated for each successful decoding operation.

In some embodiments, the process of FIG. 27 is modified as shown in FIG. 28. FIG. 28 represents a class of embodiments wherein the decoded data from a complete session of barcode scanning of one or more barcodes is stored in the nonvolatile memory on the PC card before an interrupt is generated to the host computer, i.e., an interrupt is not generated for each successful decoding operation. All blocks in FIG. 28 having reference numbers used in FIG. 27 have the same function. The difference starts at block 619 which represents the process of storing the decoded alphanumeric characters from the decoding of one or more barcodes in the nonvolatile memory on the PC card. Typically, the nonvolatile memory has enough capacity to store an entire day's worth of decoded characters from barcode scanning therein without overflow.

In one embodiment, after scanning, decoding and storage of all the alphanumeric characters in the nonvolatile memory is complete, a signal is generated by the PC card indicating that there is data ready for transfer to the host computer. This can be done either by generating an interrupt and sending it to the host, or by setting a flag in some register in the PC card in the shared memory space or I/O space of the host. In the case of use of an interrupt, this interrupt can be generated by the PC card upon receipt of a "finished scanning signal" from the user indicating that all intended scanning has been completed. This signal can be entered in any way such as by a timeout of a software timer on the host which is reset by the decoder chip and PCMCIA adapter each time a successful decoding operation has been completed, etc. The details of how this signal is entered are not critical. After the finished scanning signal is received, an interrupt is sent by the PC card to the host. In the case where a flag is set by the PC card when scanning has been completed such as when no transitions have been detected on the signal line from the barcode scanning engine after a predetermined period. The process of setting this signal is represented by block 621.

In alternative embodiments, block 621 can represent the process of receiving a signal entered by the user through some input means on the host computer such as a command to the barcode application indicating that scanning is complete. Before that command is given, all decoded data is stored in the nonvolatile memory. The barcode application can then access the data and store it in memory of the host in some applications or use the data, or store it in the keyboard buffer or some predetermined memory location for use by another application or write the data out to the nonvolatile memory on the PC card, all as symbolized by block 623.

There follows a more detailed discussion of the details of a custom driver that can interface a barcode scan engine interface PC card having onboard flash memory with a host computer. This driver performs many of the functions of the flow charts of FIGS. 27 and 28.

The PCMCIA specifications did not originally contemplate multifunction cards. PC cards were envisioned as providing extra memory, or a modem etc. or providing some other single function, but were not expected to provide both a function plus additional memory. Therefore, the interface tools necessary to implement such an interface are not present and a driver must be designed which can utilize both the nonvolatile memory and the barcode decoder chip utilizing the tools that are currently available in the PCMCIA interface. In one embodiment of such a driver, the nonvolatile memory 570 is mapped into the shared memory space (zone 1 in FIG. 4) and the registers in the PCMCIA adapter chip 536 are mapped into the shared I/O space (zone 3 in FIG. 4). The problem is how to design a driver for execution on the host which can find out where in the I/O space the registers of the PC card are located and what interrupt number has been assigned to the barcode scan engine interface PC card (hereafter referred to as the barcode card) each time the barcode card is inserted into the PCMCIA socket of the host. This is not as simple a task as one might think since the driver cannot talk directly to the memory technology driver software layer (hereafter MTD) 104 in FIG. 5. It is the MTD 104 which knows where in the I/O space the barcode card's registers are located and what interrupt number has been assigned to the barcode card. These assets are allocated to the barcode card by the Card Services software layer (hereafter CS) 106 in FIG. 5 when the barcode card was first placed in the PCMCIA socket of the host. When the barcode card is inserted, the MTD layer interrogates the CS layer to determine the interrupt assigned by CS to the barcode card and the base address in the I/O space of the first register in the set of I/O registers on the barcode card (usually these registers are internal registers of the adapter chip 536). These two pieces of information are then stored by the MTD in some memory for later use in informing the barcode card driver indirectly through the CS layer.

Figure 29A:
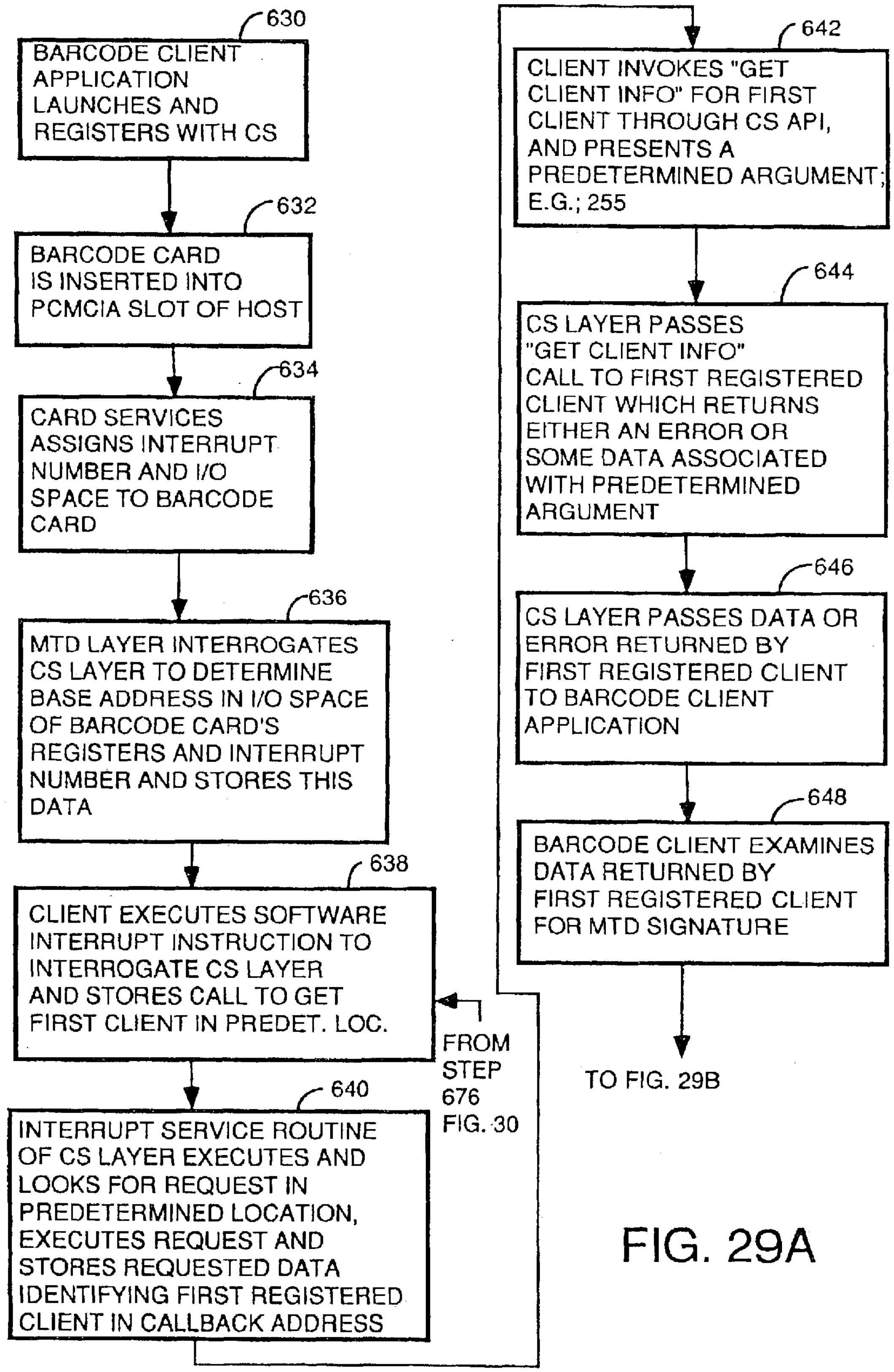
FIG. 29, comprised of FIGS. 29A, 29B, 29C is a flow chart of the process that allows the barcode driver to retrieve decoded barcode data from registers on the barcode card using I/O cycles without destroying the ability of other client applications to access the nonvolatile memory on the barcode card.
Figure 29B:
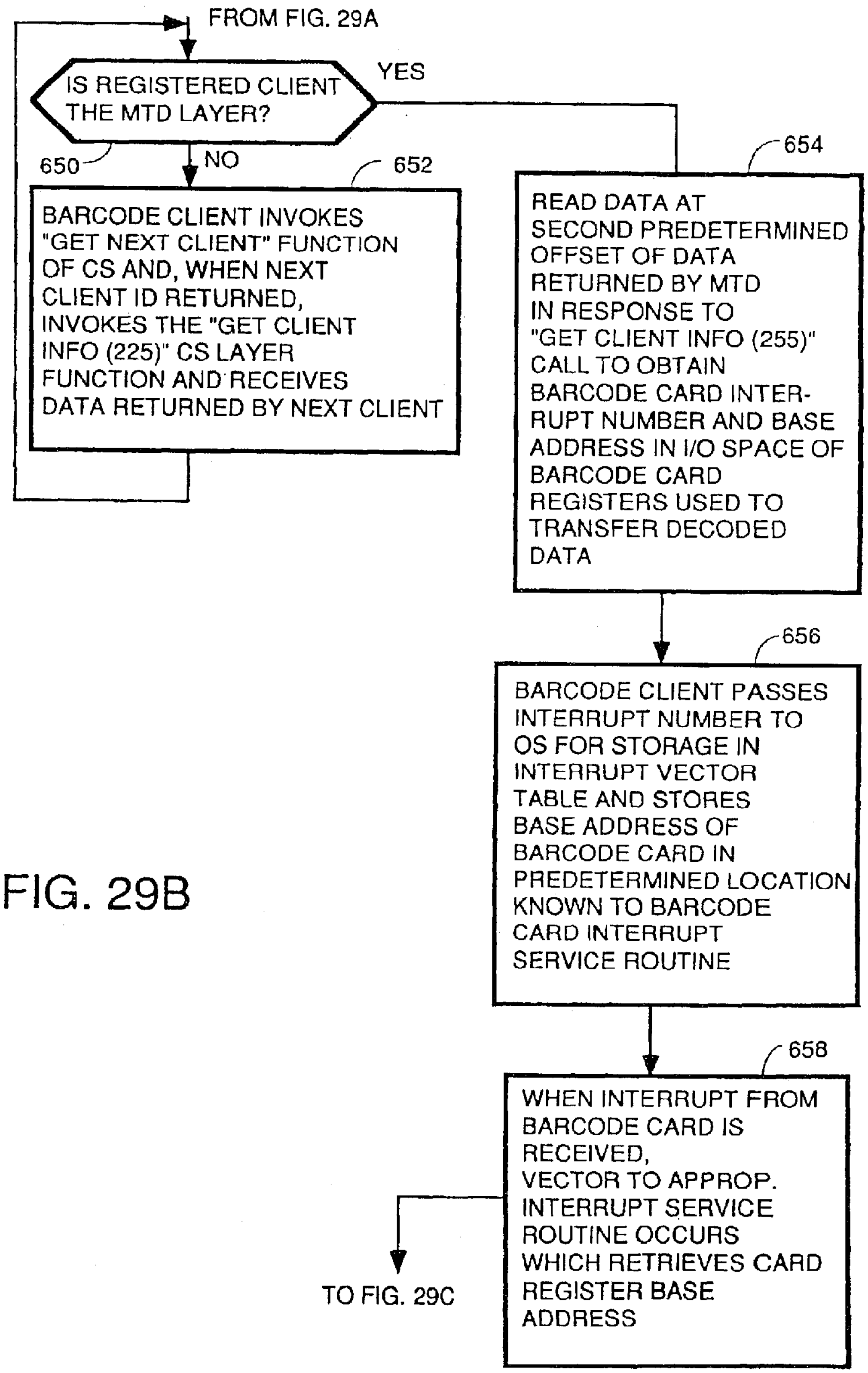
Figure 29C:
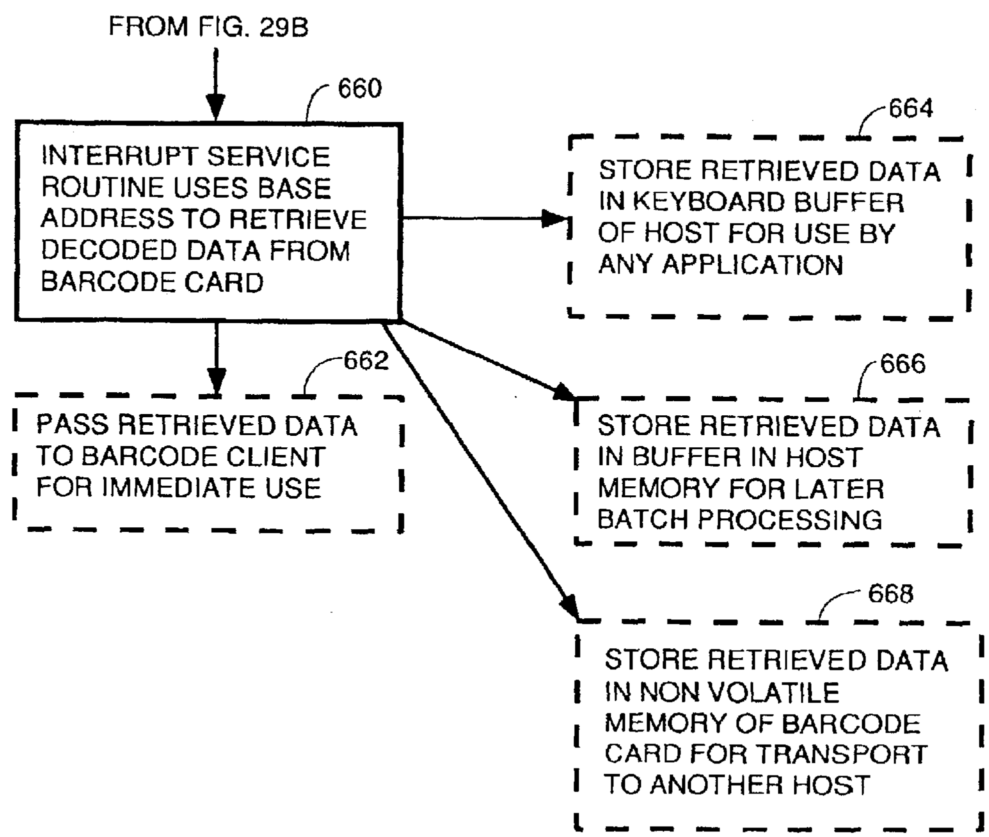

Referring to FIG. 29, comprised of FIGS. 29A through 29C, there is shown a flow chart of the process that allows the barcode driver to retrieve decoded barcode data from registers on the barcode card using I/O cycles. This flowchart details the process that goes on in the client application that needs barcode data, the barcode driver, the CS and MTD layers and on the barcode card to get the adapter chip's registers mapped into the zone 3 I/O space when the barcode card is first inserted into the host and to cooperate in an I/O cycle. Block 630 represents the process that happens in block 606 of FIGS. 27 and 28 when the client application that needs barcode data launches. As part of this process, the client application registers with the CS layer and leaves a callback address. Why this is done is explained below. For convenience, assume that the client application is represented by process 92 in FIG. 5. Block 632 represents insertion of the barcode card into the PCMCIA socket of the host computer 500. This can happen either before or after the client application launches.

Block 634 represents the process performed by the Card Services layer 106 in FIG. 5 of assigning to the barcode card an interrupt number and space in the zone 3 I/O space for the barcode card's registers. The MTD must determine the base address of the barcode cards registers and the interrupt number assigned, so it interrogates the CS layer to get these data items and stores them in some memory assigned to the MTD layer. The client application 92 (hereafter the client) needs to know the two items of data just stored by the MTD to be able to receive decoded barcode data from the barcode card, but the client cannot just ask the MTD layer for this data because of the PCMCIA software architecture.

Therefore, to get the barcode card's interrupt number and the base address of its registers, the client has to obtain this information indirectly by interrogation of the CS layer. This done by using software interrupts. In DOS machines, there are hardware interrupts where a circuit activates an interrupt line and software interrupts where a client application executes an interrupt instruction. In the case of a hardware interrupt, an interrupt controller chip in the host places the interrupt number on the host bus in response to an interrupt acknowledge cycle on the host bus after the interrupt line is activated. The operating system reads this interrupt number and uses it as an index into an interrupt vector table which contains the address of an appropriate interrupt service routine for each specific interrupt. In the case of a software interrupt, the interrupt instruction contains the interrupt number index into the interrupt vector table. Software interrupts are how client applications communicate with the operating system in DOS machines. The CS layer is like an extension of the operating system and is assigned to interrupt number 26.

To interrogate the CS layer to get the base address in the I/O space of the barcode card registers and what interrupt number has been assigned to the barcode card, the client application executes a software interrupt instruction passing interrupt number 26 to the operating system. This causes the host to save its current state on a pushdown stack and vectors processing to an interrupt service routine in the client which invokes a particular function which is part of the CS application programmer's interface (hereafter API). The CS API makes three functions available to its clients: Get First Client; Get Next Client; and Get Client Info. Each process must register with CS each time it launches if it wants to avail it of these services and to receive information from CS such as messages that a new PCMCIA card has just been inserted into the host PCMCIA slot. When a client application process registers with CS, it leaves a callback address in which messages to it from the CS layer are stored. The callback address is frequently polled by the client for messages from CS.

Block 638 represents the process of starting the interrogation process of CS by the client. This process is implemented in one embodiment by execution of a software interrupt and storing in a predetermined location in memory a Get First Client call to the CS API and the identity of the client making the request or the callback address in which the requested data is to be stored. The software interrupt causes processing to be vectored to the interrupt service routine of CS which then executes and looks in the predetermined location in memory and reads the Get First Client call and the identity of the client making the request. The CS layer then stores the identity of the first client process in the callback address of the client that made the request as symbolized by block 640. Those skilled in the art will appreciate other interprocess communication mechanisms that can be used to carry out this interrogation process and other transfers of data between different software processes. For example, different interprocess communication mechanisms with Unix, Macintosh or other operating systems may also be used. Each of these other forms of communication between processes is equivalent to the process described above.

Next, in block 642, the barcode client application 92 invokes the Get Client Info function of the CS API identifying the first registered client identified in block 640 and passes a predetermined argument number (to be explained below). Whether this is done by another software interrupt or some other interprocess communication mechanism is not critical to the invention. The CS layer passes this Get Client Info request to the first registered client via the first registered client's callback address, as symbolized by block 644.

The Get Client Info function has a predetermined number of subfunctions identified by numbers from 128 to 255. One of these subfunction numbers (also called arguments) is reserved for the MTD layers in apparats and processes implementing the teachings of the invention. For the sake of example, assume argument 255 is reserved for the purpose of identifying the MTD layer and passing the information sought by the barcode client application, so the barcode client would make a call Get Client Info (255) to the CS. When the barcode client invokes the Get Client Info function for the first registered client, argument 255 is passed with the Get Client Info call. If the first registered client is not the MTD layer, it will either not understand the subfunction 255 call and return an error, or it will understand it as a call for different data than the barcode client application is looking for and returns some data which means nothing to the barcode client as symbolized by block 644. The returned data from the first registered client is received by the CS layer and sent to the barcode clients callback address, as symbolized by block 646.

This nonmeaningful data returned by the first registered client in response to receipt of argument 255 tells the barcode client that the first registered client is not the MTD layer as symbolized by block 648. The barcode client looks at the returned data using a first predetermined offset to determine if the MTD layer signature is present there. The MTD layer has two predetermined offsets that are known to the barcode client application. If the first registered client had been the MTD layer, the data returned by the MTD in response to receipt of Get Client Info (255) would have contained unique data called a signature at the first offset identifying this client as the MTD layer, and would have contained at the second predetermined offset the base address in the shared I/O space of the registers in the barcode card used for transferring decoded data and the interrupt number assigned to the barcode card. The packet of data returned to CS by the client application in response to the Get Client Info (255) call is sent by CS to the callback address of the barcode client.

If the first registered client is not the MTD, the barcode client invokes the Get Next Client function of the CS layer, as symbolized by the test of block 650 and the process of block 652. After the next client ID is returned to the barcode client, the Get Client Info (255) call is made again for that client, all as symbolized by block 652. The returned data in response to this call is then examined for the MTD signature in the process represented by block 650. This process of checking all registered clients with CS is continued until the MTD client is found.

After the MTD client is found, the barcode client executes the process represented by block 654. This process reads the returned data from MTD in response to the Get Client Info (255) call. The data returned is read at the second predetermined offset known to both the barcode client and the MTD to obtain the interrupt number assigned to the barcode card and the base address in the I/O space for the barcode card registers used to transfer the decoded data. This data was assigned by CS to the barcode card for this particular session.

The process of block 656 represents the process of the barcode client executing a software interrupt appropriate to passing the interrupt number assigned to the barcode card to the operating system. This interrupt causes the operating system to execute an interrupt service routine that retrieves the interrupt number assigned to the barcode card and the start address of the interrupt service routine that processes interrupts from the barcode card to pass decoded data to the host. The operating system then stores this interrupt number and service routine address in the interrupt vector table.

Blocks 658 and 660 represent the process carried out by the interrupt service routine for the barcode card in retrieving decoded data after an interrupt is received from the barcode card. When the PCMCIA adapter chip 536 activates the IRQ interrupt request line, the interrupt controller chip in the host places the interrupt number assigned to the barcode card on the host bus in response to the host bus interrupt acknowledge cycle. The operating system then uses this number as an index for entry into the interrupt vector table to retrieve the start address of the appropriate interrupt service routine for the barcode card in the barcode card driver. Processing is then vectored to this service routine which executes and conducts an I/O cycle with the barcode card to retrieve whatever decoded data is stored in the barcode card's registers.

Optional blocks 662, 664, 666, and 668 represent the most useful possibilities for what the interrupt service routine for the barcode card does with the retrieved decoded data. In block 662, the decoded data would be passed to the barcode client for immediate use. If the interrupt service routine is part of the barcode client, this simply amounts to storing the data in a predetermined location known to the routine that needs the data or passing a message to that routine where the retrieved data can be found in the memory of the host. Where interrupt routine is not part of the barcode client, the data is passed to the barcode client by any suitable interprocess data transfer mechanism. Block 664 represents the process of storing the retrieved data in the keyboard buffer of the host computer for use by any application that takes data from the keyboard buffer. Block 666 represents the process of storing the retrieved data in a buffer in the main memory of the host. Such a buffer could be FIFO if the order of scanned data is important, a circular buffer, a LIFO buffer etc. Block 668 represents the process of storing the retrieved data in the nonvolatile memory of the barcode card for transport to another host or later use by the host that stored the data. Data storage into the nonvolatile memory is conducted by conventional memory cycles carried out with whatever type of nonvolatile memory is in use on the barcode card.

Throughout the foregoing discussion, the barcode client application 92 has been stated as the process which does the interrogation of the CS layer and the process where the returned data from the registered clients is examined and processed. These are the essential functions of a driver for the barcode card, and, in alternative embodiments, a separate driver process to implement this interrogation and identification of the MTD client function. This driver would obtain the interrupt number and base address data from the MTD and store it for use by any barcode application that wanted it. This separate driver embodiment uses an API to interface the driver to the barcode client application. This software architecture is preferred from the standpoint of decoupling the barcode client applications from the need for reprogramming when the details of the driver or card interface change as the PCMCIA standard evolves.

The above described processes have been detailed in the context of how DOS hosts work. Those skilled in the art will-appreciate numerous modifications or alternative ways of achieving the same results in Macintosh, Unix, IBM, DEC or other host platforms and operating systems. The particular details of how these functions are achieved are not critical and other ways of achieving the same result are deemed to be equivalent and are intended to be included within the scope of equivalents of the appended claims. In addition, references in the discussion of FIGS. 1–21 of interrupts passing data are to be understood as references to a process wherein when the barcode card interrupt is activated, the interrupt service routine which executes accesses a particular predetermined register, registers or one or more predetermined memory locations on the barcode card to get the information "passed" with the interrupt.

Figure 30:
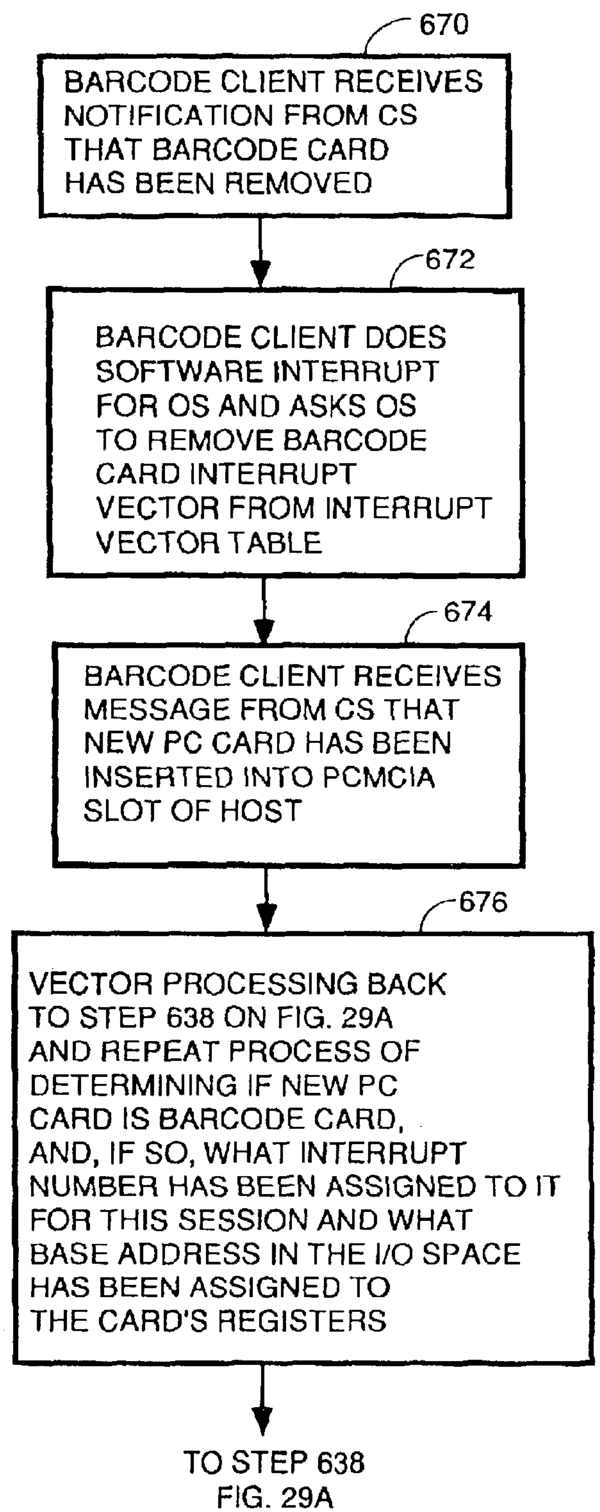
FIG. 30 is a flowchart of an exemplary process of mapping the registers of the barcode card into the I/O space of the host and assigning an interrupt number to the barcode card which occurs each time the barcode card is removed and re-inserted into the host PCMCIA socket.

The above described process of mapping the registers of the barcode card into the I/O space of the host and assigning an interrupt number to the barcode card must be accomplished each time the barcode card is removed and re-inserted into the host PCMCIA socket. The process of FIG. 30 represents one exemplary process for achieving that end. Block 670 represents the process of the driver or barcode client application 92 with driver embodied therein receiving a message from the CS layer that the barcode card has been removed from the PCMCIA slot. When this message is received, the interrupt number for the barcode card in the interrupt vector table is no longer any good because CS probably will not assign the same interrupt number to the barcode card the next time the card is inserted. Therefore, the barcode client must instruct the operating system to remove the current interrupt vector for the barcode card stored in the interrupt vector table. Block 672 represents this process where the barcode client executes a software interrupt to the operating system and instructs it to remove the current interrupt vector entry for the barcode card.

Block 674 represents the process of receiving a message from the CS layer that a new PC card has been inserted into the PCMCIA slot of the host. The CS layer sends this message to all registered clients whenever any new PC card has been inserted. This is the reason the barcode client registered with the CS layer back in step 630 of FIG. 29A. Each client application must then determine if the PC card inserted is the PC card that client application interfaces with. The barcode client must know therefore if the new PC card is the barcode card and, if so, must know the interrupt number assigned to the card and the base address in the I/O space of the barcode card's registers. In order to do this, the barcode client simply follows the same procedure previously described of interrogating the CS layer and getting information about each of its clients. The CS layer automatically registers the PC card as a client whenever a new PC card is inserted into the PCMCIA slot of the host. Therefore, block 676 simply represents the process of vectoring processing back to step 638 on FIG. 29A where processing resumes as previously described.

The above described functions of the MTD layer make it clear that the MTD layer will be specially designed to interface with Card Services in the manner described above to identify itself to the barcode client application 92 which contains a barcode card driver or to a separate barcode driver. The MTD layer will also include-routines to interface with Card Services and to manage the barcode card so that the barcode client application can write data into the nonvolatile memory on the PC card. These routines will include routines to export an application programmers interface (API) to Card Services. The CS layer then provides this API to any driver or client application which needs to invoke the functions thereof to write data to the nonvolatile memory of the barcode card. The MTD layer also serves to mask from the client applications and the other layers of software the details of how reading and writing to the particular nonvolatile memory on the barcode card is accomplished, all details thereof being implemented to the MTD layer. In other words, when a client barcode application or driver for the barcode card wants to write data into the nonvolatile memory on the barcode card, it need only invoke the write function of the API presented by Card Services and present the data and possibly an address in which to write the data. In most embodiments, the addresses where data is written into nonvolatile memory are supplied by the barcode client application, but in other embodiments, data can be written into sequential addresses supplied by the MTD or some other process. A mapping of these addresses to sequence numbers can be used to translate the sequence number to an actual address. Thus, the barcode client application need only request a read of data item #3, and the MTD will map item #3 to the actual address to read and carry out the read transaction. Once the barcode client application or separate barcode card driver invokes the write function of the CS API, CS passes the message along to MTD, and the MTD layer carries out the write transaction by doing all the necessary steps to make the write cycle happen for whatever type of nonvolatile memory is on the barcode card.

All the above described functions of providing an API to the CS layer for allowing a client to access nonvolatile memory on a PC card and providing the functionality to read and write to a nonvolatile memory on a PC card are part of the prior art. Numerous flash EEPROM PC cards are currently commercially available from numerous sources such as Intel Corporation, Advanced Micro Devices, Inc. etc., and the details of the how these cards and the MTD and CS layers and drivers on their hosts work are hereby incorporated by reference. Further, the PCMCIA Card Services Specification, Release 2.1 dated July 1993, at Section 3.6 gives further details about interfacing to flash memory PC cards, and this discussion is incorporated by reference. Therefore, only an abbreviated discussion of this functionality will be given in FIG. 31 here for completeness.

Figure 31:
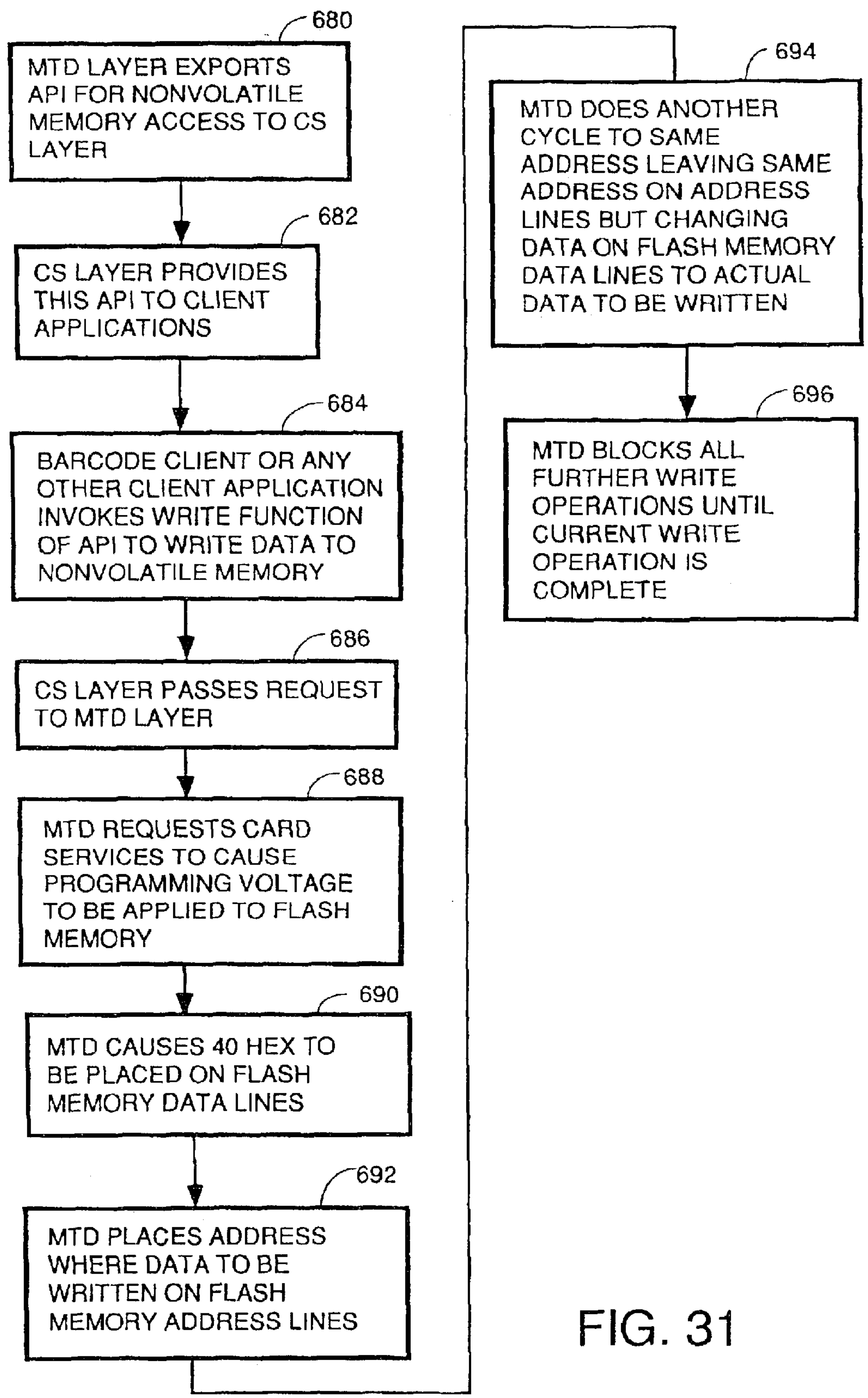
FIG. 31 is a flowchart of one embodiment of the process that goes on in the host and PC card when a client application writes data to a nonvolatile memory on the barcode PC card.

Referring to FIG. 31, there is shown one embodiment of the process that goes on in the host and PC card when a client application writes data to a nonvolatile memory on the barcode PC card. In the preferred embodiment, the nonvolatile memory being written is approximately 2 megabytes of Intel 28F008SA bytewide flash EEPROM, the data sheet of which is hereby incorporated by reference. Block 680 represents the process wherein the MTD layer provides to the CS layer an API for presentation to client applications for accessing the nonvolatile memory on the PC card. Block 682 represents the process carried out by the CS layer in providing this API to client applications. Block 684 represents the process carried out by any client application including the barcode client application in invoking the write function of the API. FIG. 31 shows the process for writing to a flash EEPROM nonvolatile memory, but the process symbolized by FIG. 31 is similar if other types of nonvolatile memory are used. In addition, the process of reading the nonvolatile memory is similar. In a read process, block 684 represents invoking the read function of the API. Block 686 represents the process of the CS layer passing the request to the MTD layer. Block 688 represents the process carried out by the MTD layer in requesting the CS layer to cause the programming voltage to be applied to the flash EEPROM on the PC card. This step is omitted where other types of nonvolatile memory are used and in read transactions. Block 690 represents the process carried out by the MTD layer causing the placing of the number 40 in the hexadecimal numbering system) onto the flash memory data lines. This number is not the data to be written, but is a signal to the flash memory that the next data that appears on the data lines is to be written into the memory. Block 692 represents the process of placing the address where the data to be written is to be stored in the flash memory. Block 694 represents the process carried out by the MTD of carrying out another cycle with the flash memory while leaving the address on the address lines what it was in step 692 but changing the data placed on the flash memory data lines to the actual data to be stored. Block 696 represents the process carried out by the MTD layer of blocking all further read or write transactions to the flash memory until the current write operation is complete. Writing to flash EEPROM is not instantaneous since the process requires Fowler-Nordheim tunneling of charge carriers into a floating gate after the programming voltage has been applied and this tunneling effect takes some time to accomplish. The MTD layer determines when the write operation has been completed in one of three different ways. The first option is for the MTD layer to block all further transactions for a predetermined interval during which the write operation is guaranteed by the manufacturer to have been completed. The second option is for MTD layer to write a 70 hex to any address. This causes the flash memory to return the contents of a status register on the data lines, one bit of which indicates whether the write operation is completed or not. The third option is for the MTD layer to read the Ready/Busy line status. When this output line from the flash memory on the PC card is logic low, the flash memory is busy writing. Any one of these options is acceptable for purposes of practicing the invention.

By using an MTD layer specifically designed for interfacing any client application to the nonvolatile memory on the barcode card through the PCMCIA slot without blocking client barcode applications access to the barcode card decoding circuitry through the PCMCIA slot, certain advantages are achieved. By providing such an MTD, the burden of supporting changes over time of an open system file format for data storage in the nonvolatile memory is shifted to the programmers of the client applications that desire to access the nonvolatile memory on the barcode card. It also eliminates the need to devise a proprietary file format for file storage in the nonvolatile memory of the barcode card and to support all client applications on numerous PDA and other hosts with PCMCIA slots that desire access to the nonvolatile memory. By merely providing the MTD layer that can provide access to the nonvolatile memory without blocking access to the barcode decoding circuitry, there is decoupling between the software written by the applicants and the burden of supporting numerous diverse client applications and hosts to support either migrations in an open systems file system standard or a proprietary file system standard. However, all of the following three options are within the teachings of the invention (each option includes provision of a barcode client application which can control the barcode card to start and stop scanning and unload decoded data): (1) use of a proprietary file system, as opposed to an open file system standard such as the DOS file system, and then provide for every host platform at least a client that can read and write the nonvolatile memory on the barcode card as well as provide access for barcode clients to the barcode card decoding circuitry; (2) use of a conventional file system and provision of a driver which incorporates functionality to allow clients to read or write to the nonvolatile memory using the open file system as well as to access the barcode decoding circuitry; (3) provide a custom MTD layer such as that disclosed herein which provides all clients access to the nonvolatile memory on the barcode card through the PCMCIA slot without simultaneously blocking access to the barcode decoder circuitry on the barcode card through the PCMCIA slot.

Figure 32:
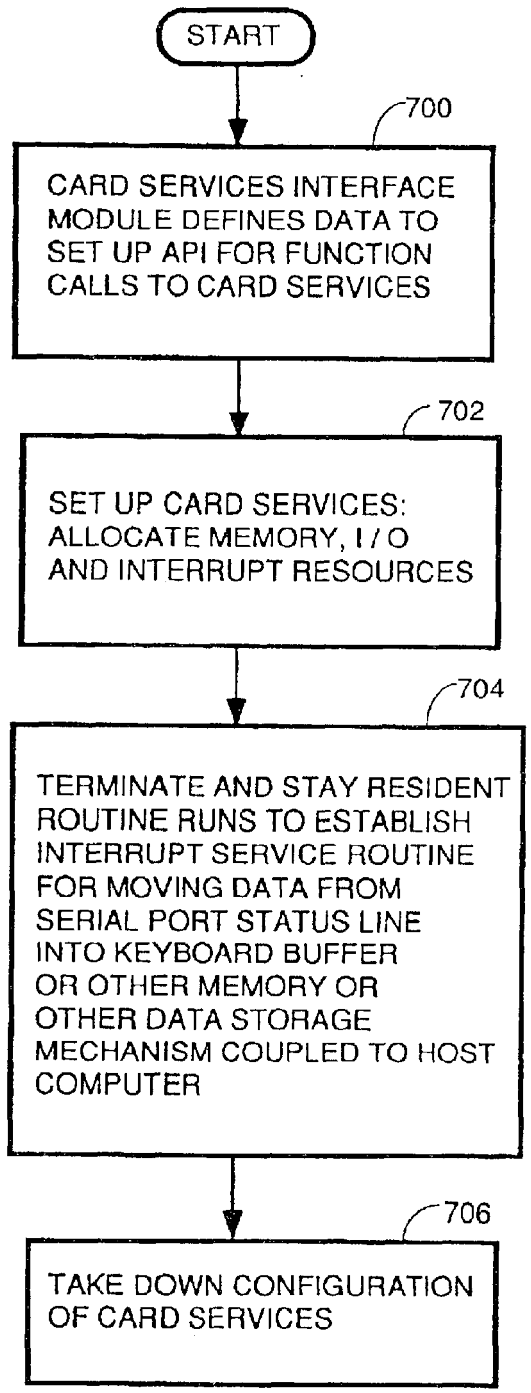
FIG. 32 is a flowchart of the processing carried out by an alternative embodiment of a barcode client routine executed on the host computer for interfacing the host to the barcode card using a terminate and stay resident routine or driver for receiving interrupts.

Referring to FIG. 32, there is shown a flowchart of the processing carried out by an alternative embodiment of a barcode client routine executed on the host computer for interfacing the host to the barcode card using a terminate and stay resident routine or driver for receiving interrupts. This alternative embodiments is designed for use with decoded barcode scan engines that put out decoded data, i.e., no PCMCIA card is needed to do the decoding, and wherein the decoded data is input to the host/PDA through a status line of a serial port. There are four main modules in this alternative embodiment represented by blocks 700, 702, 704 and 706. Block 700 serves to define data to set up an API for the Card Services interface so that function calls to Card Services can be made by the barcode client application. Block 702 sets up Card Services for the barcode card by causing Card Services to allocate memory, input-output and interrupt resources to the barcode scan engine if necessary. Block 704 is shown as a terminate and stay resident routine, but it can also be a driver (the difference will be explained below). The process represented by block 704 embodies an interrupt service routine to accept interrupts from the barcode scan engine and deal with them. The interrupt service routine gets the serial format data from the scan engine via a status line of a standard serial port such as an RS232 port and deposits the decoded data received from the barcode card in the keyboard buffer of the host computer. In alternative embodiments, the decoded data retrieved from the serial port can be deposited in any other memory or register of the host computer or in any other data storage device coupled to the host such as internal/external memory such as a rotating magnetic media. The process of block 704 can also be performed by a driver as opposed to a terminate and stay resident routine. A driver is put into execution at boot time by the config.sys file in DOS machines whereas a terminate and stay resident routine can be started under control of the user either through a keyboard command or a command in his or her autoexec.bat file. Block 706 functions to take down the configuration of Card Services thereby allowing the memory, input-output and interrupt resources to be re-allocated to other uses.

Figure 33:
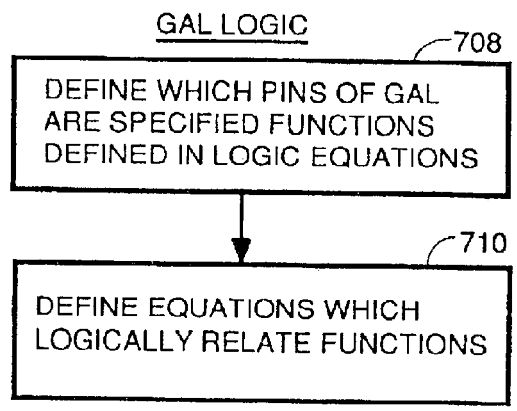
FIG. 33 is a block diagram of the flow of the program that programs the GAL logic configuration for a gate array logic controller in the hardware embodiment shown in FIG. 36.

Referring to FIG. 33, there is shown a block diagram of the flow of the program that programs the GAL logic configuration for a gate array logic controller in the hardware embodiment described below. A program similar to the flow chart shown on FIG. 33 is included herewith as Appendix C. The GAL or gate array logic serves to provide the Boolean logical relationships between the various signals generated which are input to and output from the decoder chip and the PCMCIA adapter chip. Block 708 represents the process of defining which pins of the GAL chip are assigned as the various functions (signals) that are to be logically related to each other by the GAL chip. Block 710 represents the process of programming the GAL with the Boolean logic relationships that define the interrelationships between the functions assigned to the various pins of the GAL in block 708.

Figure 34:
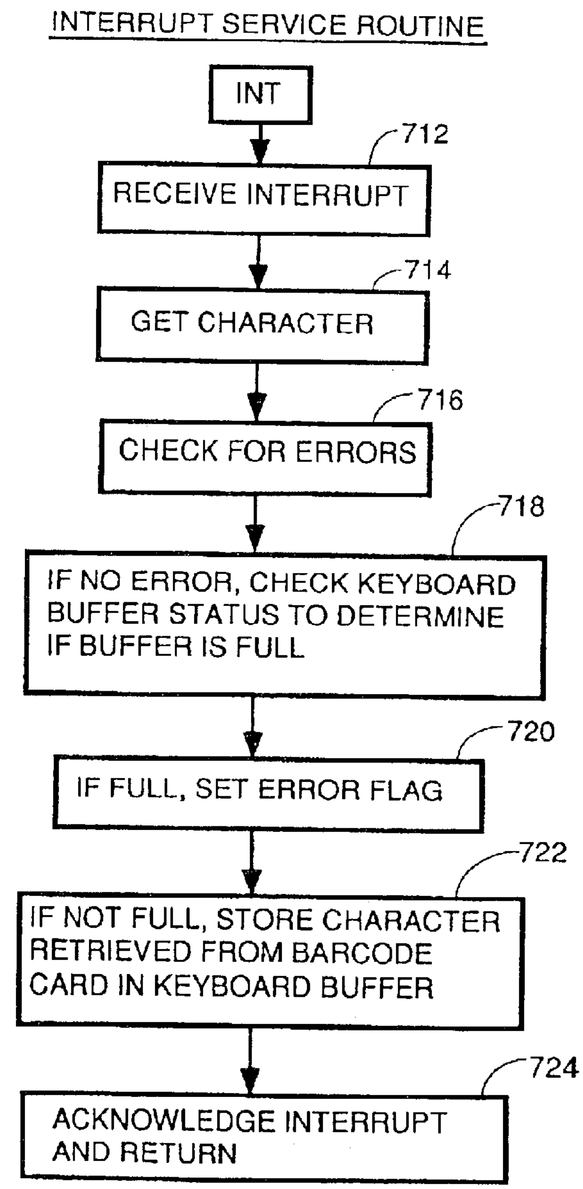
FIG. 34 shows a detailed flowchart of an interrupt service routine which may be part of or which cooperates with a barcode client for receiving data from a barcode card and stores it in a keyboard buffer.

Referring to FIG. 34, there is a shown a detailed flowchart of an interrupt service routine which may be part of or which cooperates with a barcode client for receiving data from a barcode card and stores it in a keyboard buffer. A program written in assembly language for an Intel 80×86 host processor is included herewith as Appendix A. Although the routine of FIG. 34 is depicted as storing the data in the keyboard buffer, it could just as easily store the data in RAM of the host or in any other data storage device of the host. Block 712 represents the process of receiving the interrupt which includes saving the machine status before starting the interrupt service routine. This is followed by the process of getting the character decoded by the barcode card, as represented by block 714. In block 716, an error check is performed to determine if the character is valid. Typically this would be done by checking an error status line from the PC card which will have a logic state indicating whether or not an error has occurred. If there was an error, block 716 represents the process of flushing the data that may be erroneous such as the sample data and any resulting decoded alphanumeric data from wherever this data is stored on the PC card. Because the PC card receives data from the scan engine whenever a scan is performed but may not have already offloaded the decoded data from the last successful decode operation if the host does not offload the data in time, it is possible that data overrun can occur. Also, bad data can result from any of the, reasons noted earlier herein in describing the decoding routines. Therefore, if an error has occurred, the invalid data must be flushed. If there was no error, the status of the keyboard buffer is checked to determine if it is full, as represented by block 718. Of course, if some or the memory or other data storage device is being used to store the retrieved characters where there is no danger of overflow, this step could be eliminated as can the process of block 720. Block 720 represents the process of setting an error flag if the keyboard buffer is full. If the error flag is set for any reason, all the data from the scan is discarded and the barcode will have to be scanned and decoded again.

If the keyboard buffer is not full, the retrieved character is stored in the keyboard buffer. In the case of another memory or data storage device where there is no danger of overflow, the character retrieved from the barcode card is stored in the memory. Block 724 represents the process of acknowledging the interrupt and returning to the calling routine.

Figure 35A:
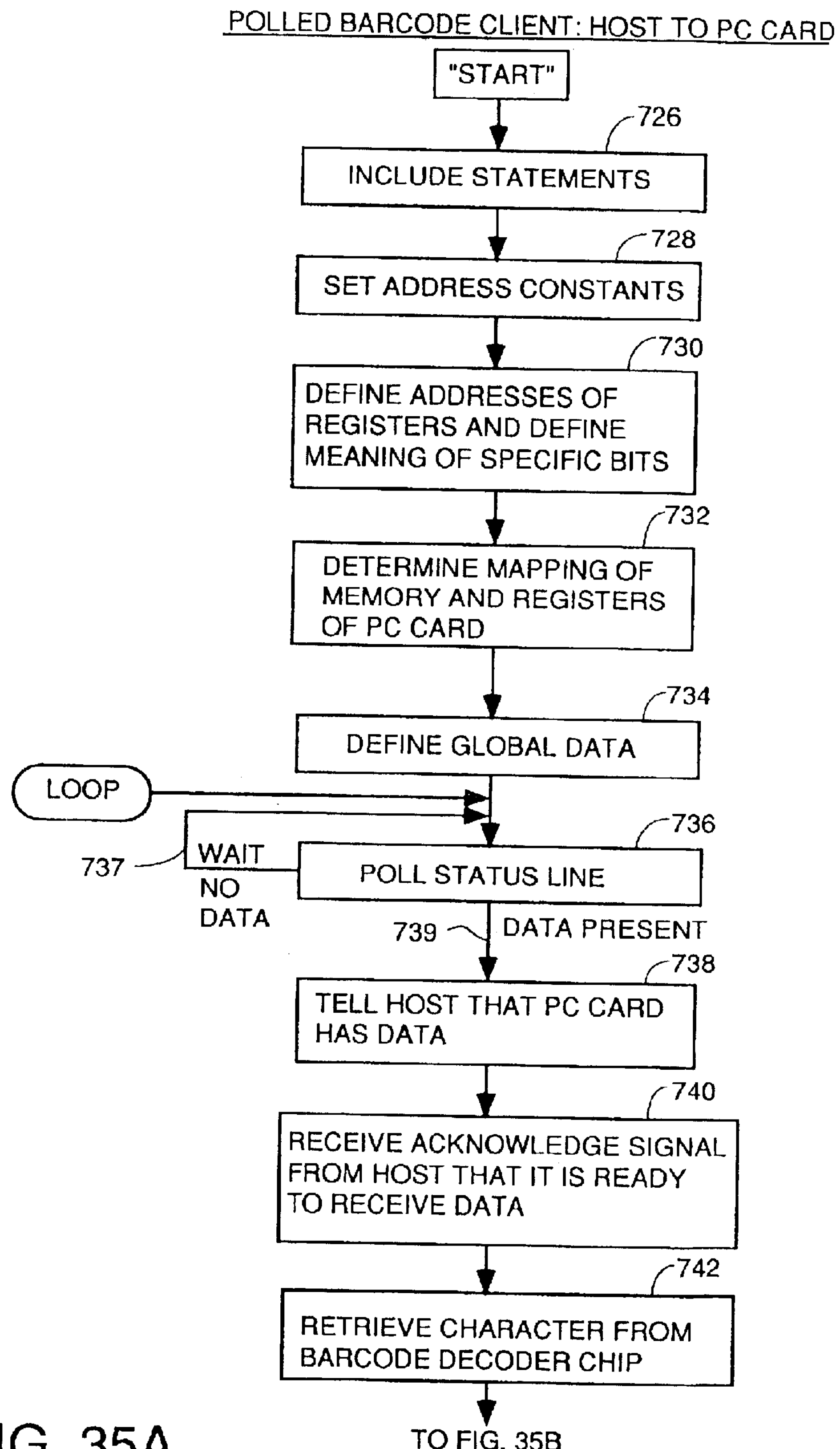
FIG. 35, comprised of FIGS. 35A and 35B, is a flowchart for an alternative barcode client application for interfacing a host to a barcode card in the PCMCIA form factor using a polled architecture and not utilizing the custom memory technology driver layer described earlier herein.
Figure 35B:
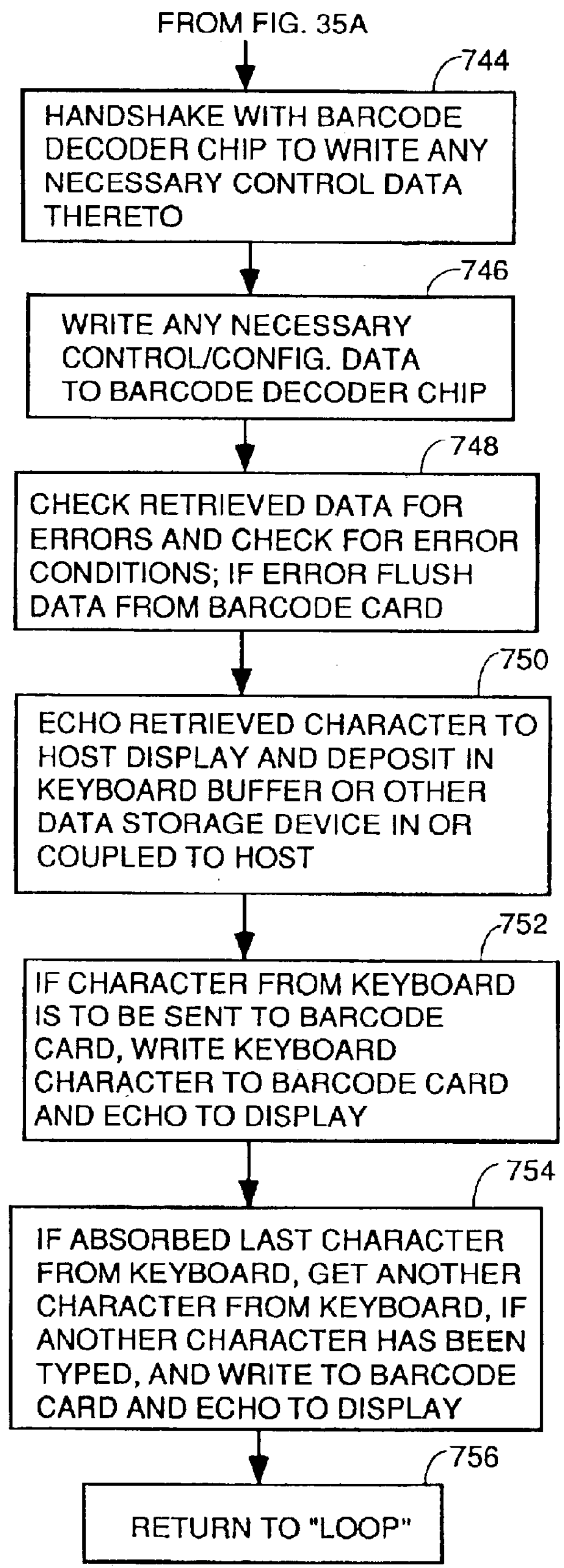

Referring to FIG. 35, comprised of FIGS. 35A and 35B, there is shown a flowchart for an alternative barcode client application for interfacing a host to a barcode card in the PCMCIA form factor using a polled architecture and not utilizing the custom memory technology driver layer described earlier herein. A program written in C source code and which is similar to the program outlined in FIG. 35 is included herewith as Appendix A. The program represented by FIG. 35 requires that any PCMCIA software supplied by the manufacturer of the host computer that would block access to the barcode card through the PCMCIA slot be disabled such as by commenting out any interfering calls to drivers that would so interfere.

The purpose of the barcode client application of FIGS. 35A and 35B and Appendix A is to retrieve data from the HP 2312 barcode decoder chip on the PC card and to write configuration and control data to the decoder chip, if necessary. The program starts out with a variety of include statements that help define the interface to DOS (or some other operating system) as symbolized by block 726 and setting of names of address constants in block 728. The address constants are offsets where items of information with predetermining meaning are to be placed. Block 730 represents the process of defining the addresses of various registers in the barcode decoder chip on the barcode card and defining the meaning of specific bits therein. Block 732 represents the process of determining the mapping of the memory and registers of the barcode decoding PC card in any appropriate fashion. The manner in which the determination of this mapping is done is not believed to be critical to the invention. Finally, the preparatory work is finished in block 734 by defining global data.

Block 736 represents the polling of the status line used to indicate whether the barcode card has data waiting to be read by the host. In the preferred embodiment, this is the RTS status line. The process represented by block 736 is repeatedly performed. Typically, this would be performed by implementing a DO loop with a wait statement that is executed each time the test of block 736 indicates there is no data ready, as symbolized by line 737. After the wait instruction, test 736 is performed again. Once test 736 indicates that there is data ready for delivery, as symbolized by line 739, processing branches to the first part of a handshake protocol implemented by block 738 where the host CPU is informed that the barcode card has indicated that it has data ready for delivery to the host. Next, block 740 is performed which represents waiting for and receiving an acknowledgment from the host CPU that it is ready to receive the data from the barcode card.

Block 742 represents the process of retrieving the decoded alphanumeric character from the HP 2312 barcode decoder chip on the barcode card. Since the 2312 needs to be configured, configuration data is occasionally sent from the host to the 2312 barcode decoding chip. This process also requires a handshake similar to the process used to retrieve decoded data from the 2310. The handshaking process is represented by block 744. Block 746 represents the process of writing any necessary control or configuration data to the barcode decoder chip. Block 748 represents the process of checking for errors that would render the retrieved data unreliable or incorrect. Such errors were described above. If an error condition is found, the host causes the barcode card to flush all data from the current scan and wait for incoming data from the next scan, as symbolized by block 748. If no errors were found, the retrieved character from the barcode card is displayed on the display of the host and deposited in the keyboard buffer or other data storage device in or coupled to the host, all as represented by block 750.

Block 752 represents the process of determining if any characters have been entered into the host from, for example, the keyboard of the host that are to be written to the barcode decoder chip. If there is such a character, it is written to the barcode card by the host and echoed on the display of the host in readable form. Block 754 represents the process of checking to see if another character has been entered into the host from, for example, the keyboard which is to be sent to the barcode card. If another character has been typed or is ready to be sent, the character is written to the barcode card and echoed to the display of the host in readable form. Block 756 represents the process of returning to "loop" at the top of the routine symbolized by block 736.

Figure 36:
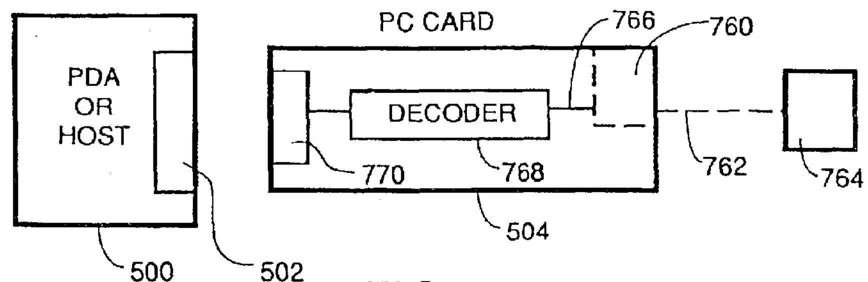
FIG. 36 is a block diagram of one broad embodiment of the invention wherein a decoder on a PC card decodes undecoded barcode scan signals into alphanumeric characters and cooperates with the host to get these alphanumeric characters into the host's memory or keyboard buffer.

Referring to FIG. 36, there is shown a block diagram of a broad concept within the teachings of the invention. In this embodiment, a host computer or PDA has a PCMCIA slot 502 with associated driver software described elsewhere herein. The host computer 500 also has a barcode client application that interfaces with the driver software for the PCMCIA slot to write data to and read data from a PC card 504 which plugs into the PCMCIA slot 502. The PC card 504 interfaces to a conventional barcode scan engine 762 or 764. The barcode scan engine may be integrated on the card as symbolized by the box 760 outlined in dashed lines, or the scan engine may be connected to the PC card by a cable symbolized by dashed line 762. The barcode scan engine 762 or 764 may be a laser based scan engine, a CCD or other imaging type device, a wand or other types of barcode scan engines that may be developed in the future.

The barcode scan engine outputs an undecoded scan signal on line 766 to a decoder 768. The purpose of the decoder is: to decode the barcode scan signal into one or more alphanumeric characters, notify the host computer 500 of the presence of one or more decoded characters waiting for delivery to the host computer, and cooperate with the host computer in getting one or more decoded characters into the memory, keyboard buffer or other storage device of the host computer via data transfer across the PCMCIA slot. The decoder may be any known decoding circuitry or microprocessor controlled by known decoding software and coupled with interface circuitry 770 to interface with the PCMCIA bus and PCMCIA driver software on the host computer 500. The interface circuitry can be commercially available PCMCIA interface adapter circuit.

Figure 37:
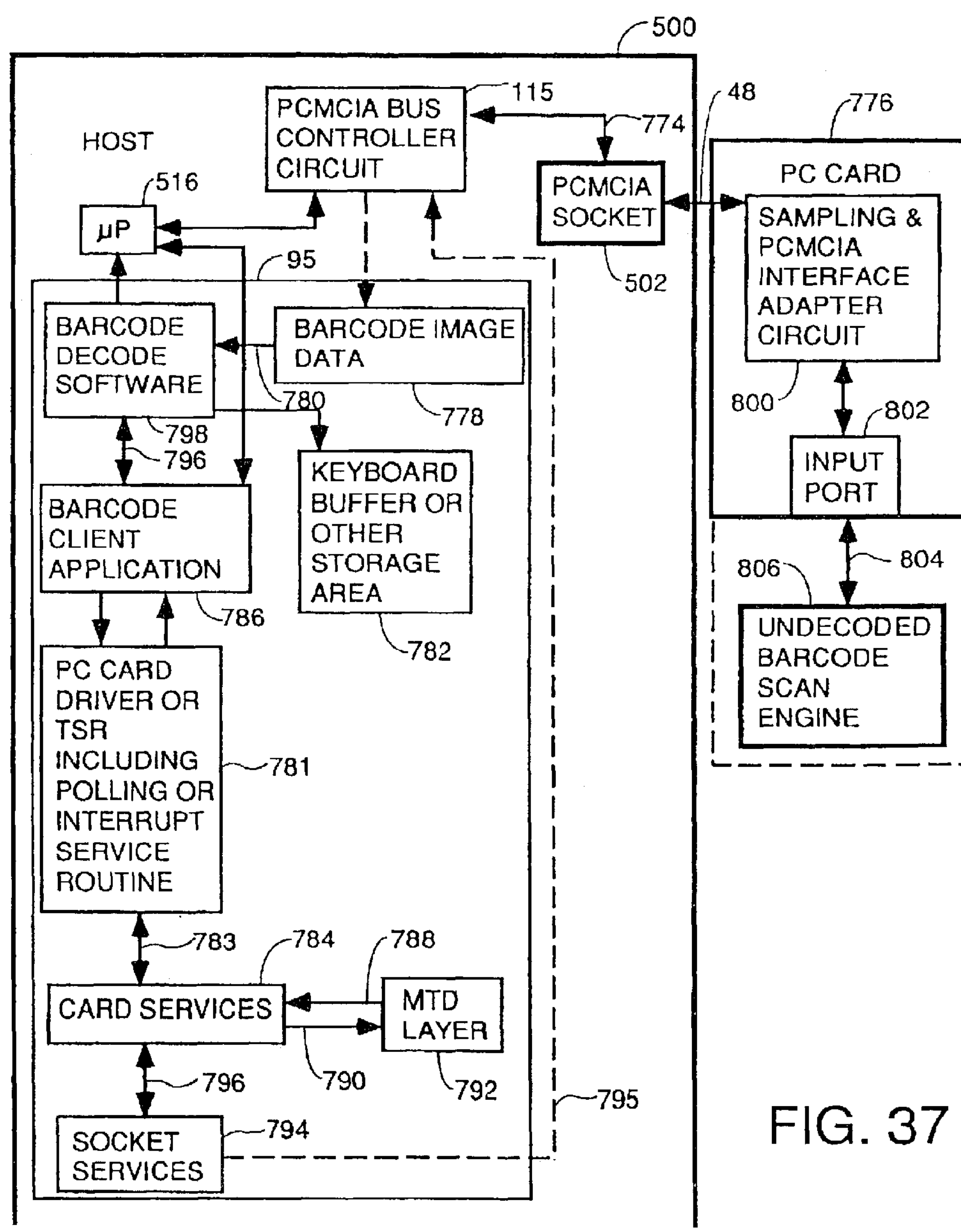
FIG. 37 is a block diagram of a system including a host computer which does decoding on-board the host and a PC card which only passes digitized samples of the barcode pattern to the host for decoding.

Referring to FIG. 37, there is shown a block diagram of a system including a host computer which does decoding on-board the host and a PC card which only passes digitized samples of the barcode pattern to the host for decoding. FIG. 37 is intended to be an adjunct to the software architecture diagram of FIG. 5 showing a typical software architecture for an embodiment where the decoding is done on the host and not on the PC card to show the relationships between the various routines controlling the host microprocessor 516 although not all the details such as the keyboard, display, input device etc are shown. The host computer 500 in this embodiment only receives sample data from the PC card and not complete alphanumeric characters. The sample data comes in through the PCMCIA socket 502 (circuits or software routines with the same reference numbers as circuits or software routines in previous drawings have the same structure and function generally) and is passed via bus 774 to a PCMCIA bus controller circuit 115 the functions to drive data onto and receive data from the PCMCIA bus 48. The barcode image data samples generated by the PC card 776 are read by the host from a register or memory in the I/O space (or memory space in some embodiments) of the PC card and are transferred over the PCMCIA bus 48 through the PCMCIA bus controller 115 into a block of memory 778 in the host RAM 95 reserved to store the sample data. The sample data may be stored in RAM 95 directly by the PCMCIA bus controller circuit 115 via DMA transactions, or it may be read by the microprocessor 516 and stored in RAM 95.

The manner in which the barcode image data is read from the PC card can be similar to the process previously described with reference to FIGS. 29A through 29C by which a driver routine or terminate and stay resident routine 780 in FIG. 37 determines the base address in the I/O space of the PC card register(s) from which data is to be read upon receipt of an interrupt from the PC card and determines the interrupt number. However, the process of FIGS. 29A through 29C was specifically designed for PC cards that also had nonvolatile memory on board which was in the memory space of the host and which the host had to access through the PCMCIA bus. In the system of FIG. 37, the PC card does not have any nonvolatile memory which must be accessible to the host, so simpler known processes to access data from PC cards which are presently commercially available may also be used. If the method of FIGS. 29A through 29C is to be used, data path 782 represents the interrogation of the CS layer 784 by the barcode client application 786 through driver 780 to get client information about the various clients of the CS layer to find out which client is the PC card and then to find out the base address and interrupt number of the PC card. Data paths 788 and 790 represent the interchange of calls and data passing between the CS layer and the MTD layer to implement this process.

The PC card will generate an interrupt when it has stored therein a predetermined number of samples that need to be stored in the host RAM. The processing of this interrupt request is as described above with reference to block 658 in FIG. 29B. I/O transactions between the host and PC card are carried out by the barcode client 786 using the driver 780, Card Services 784, the memory technology driver layer 792, the socket services layer 794 and the PCMCIA bus controller 115. Card services talks to the socket services layer via data path 796. Socket services 794 controls the PCMCIA bus controller circuit 115 as symbolized by dashed line 795. All data paths between various software layers or between software layers and hardware circuits are only symbolic and interprocess communication may by any known method such as interrupt, interprocess pipeline, shared memory, control and data signals etc. will suffice. The purpose of socket services is to mask the details of the particular PCMCIA bus controller 115 used so as to present a uniform programmatic interface to the CS layer 784.

Once the barcode client application has processed the interrupt(s) from the PC card and knows that there is sample data from a complete barcode stored in the barcode image data buffer 778, the barcode client application 786 invokes the barcode decode software routine 798 via data path 796. The barcode decode software routine then runs and accesses the barcode image data as symbolized by data path 780. The barcode decode routine then carries out processing identical or similar to that described in FIG. 6B. The details of the barcode decode routine are not critical to the invention and any known barcode decoding routine may be substituted for routine 798. After the alphanumeric character or characters are decoded from the image data, the character(s) are passed to the barcode client 786 for use or storage in the keyboard buffer or other storage area of the host as symbolized by block 782.

The PC card 776 in the system shown in FIG. 37 contains only a sampling and PCMCIA interface adapter circuit 800 which is connected to an input port 802. The input port 802 is coupled to the undecoded barcode scan engine 806 via bus 804. The scan engine can be tethered or integrated onto the PC card.

Figure 38:
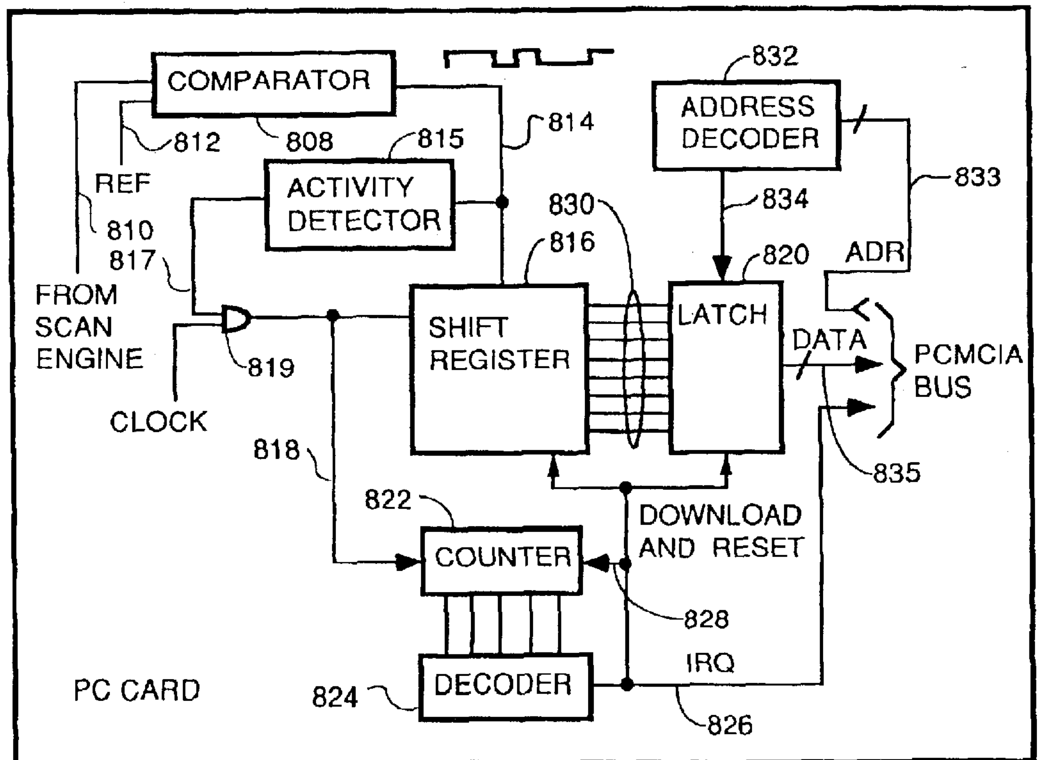
FIG. 38 is a block diagram for one embodiment of the sampling and PCMCIA interface circuit 800 in FIG. 37 using an interrupt driven architecture.

Referring to FIG. 38, there is shown a block diagram of one embodiment for the sampling and PCMCIA interface circuit 800. A comparator receives the analog output signal from the scan engine photodetector or other imaging technology on line 810 and compares the voltage level to a fixed reference voltage on line 812. The output of the comparator 808 on line 814 changes states between logic 0 and logic 1 each time the signal on line 810 exceeds or drops below the reference voltage. The resulting output signal varies between logic 1 and logic 0 in accordance with the light and dark patterns of the barcode. In some embodiments, the comparator 808 may be part of the undecoded barcode scan engine so the input port 802 will effectively be line 814.

The signal on line 814 is effectively sampled and shifted into a shift register 816 in synchronization with a clock signal on line 818. The shift register is typically a serial-in-parallel-out shift register which has its parallel format data ports coupled to the data input of a latch 820. An activity detector 815 monitors for transitions on line 814 and activates a signal line 817 when activity is detected. Activation of the signal on line 817 causes AND gate 819 to gate the clock signal through to line 818. A counter 822 counts the clock pulses on line 818, and when the number of clock pulses equals the number of storage cells in the shift register, the counter count is decoded by a decoder 824 which activates an IRQ interrupt signal line 826. In some embodiments, a counter that rolls over at a maximum count equal to the number of shift register cells and signals this fact can be substituted. Activation of the IRQ signal is used to reset the counter via line 828, to cause the shift register to parallel load its content onto bus 830 and to cause latch 820 to latch the data on bus 830. Latch 820 is located at a known location in the shared I/O or memory space of the host and PC card. Activation of the IRQ interrupt causes the barcode client application 786 to perform an I/O transaction with the PC card. As part of this transaction, the address of the latch 820 will be sent across the PCMCIA bus to a decoder 832 via address lines 833. The decoder 832 decodes the address and activates the chip select and/or output enable signal on line 834. This causes the latch 820 to place its data on the data lines 835 for transfer to the host. This process is repeated until activity ceases on line 814.

Figure 39:
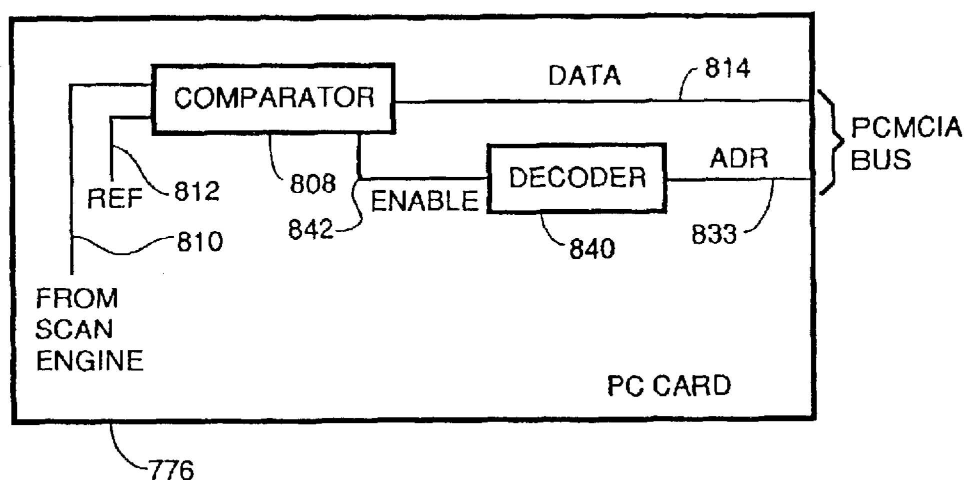
FIG. 39 is a block diagram of a polled type architecture for sampling and PCMCIA interface adapter circuit 800 in FIG. 37.

In an alternative embodiment shown in FIG. 39, all the complexity of the shift register, counter and decoder is eliminated and a simple polling scheme is used. In this embodiment, the PC card 776 includes only a comparator 808 and a decoder 840. The comparator 808 has an address in the shared I/O or memory space of the host and PC card which is known to the barcode client. The barcode client 786 or driver 780 includes a routine to periodically poll the comparator output and read its state to take samples of the barcode image. This is done by writing the address of the comparator on address lines 833. This causes decoder 840 to activate the ENABLE signal on line 842 which enables the output of the comparator 808 so as to drive its current state onto data line 814 which is coupled to the host through the PCMCIA bus. By repeatedly polling the binary state on data line 814, a series of binary samples of the barcode image can be loaded into the host for decoding.

Figure 40:
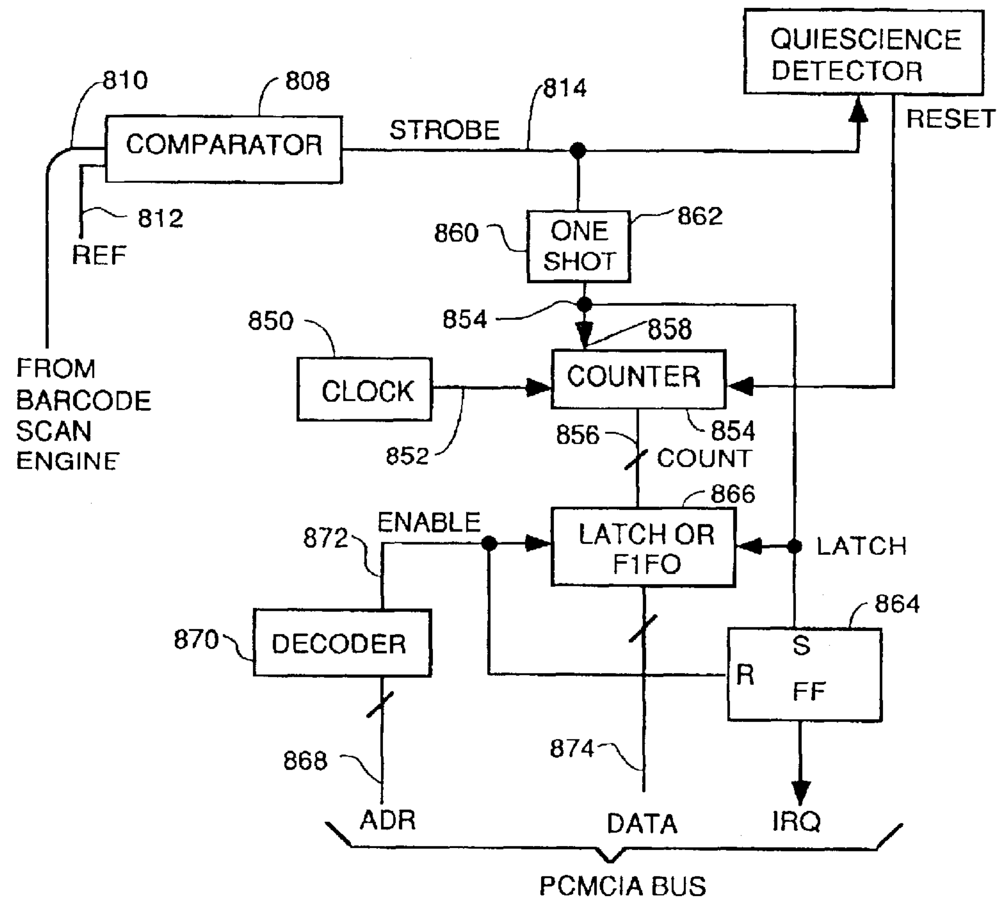
FIG. 40 is another embodiment of sampling and PCMCIA interface adapter circuit 800 in FIG. 37 using a timer type arrangement to generate compress the sample data.

In the embodiments of FIGS. 38 and 39, the barcode image data is not compressed and it is up to the barcode decoding software 798 to calculate the ratios between the run lengths of logic 1 and logic 0's and then decode the alphanumeric characters from the ratios of the run lengths. Referring to FIG. 40, there is shown another embodiment for the sampling and PCMCIA interface adapter circuit 800 in FIG. 37 which does some of the work of compressing the barcode image data for the host. In this embodiment, the comparator 808 works as in the embodiments of FIGS. 38 and 39 except that its output data line 814 is used as a strobe signal, and, in some embodiments, as the interrupt signal IRQ. The way this embodiment works is to use the time of every transition on line 814 as the data that is sent to the host so that host can calculate the ratios of run lengths from the differences in times between transitions. To implement this scheme, a clock 850 having a frequency high enough to give the desired resolution, e.g., 100 kHz, drives the clock input of a counter 854 (typically a 15 bit counter). The counter has a parallel data count output 856 which is driven with the count value each time a strobe pulse is received at an enable input 858. The STROBE signal on line 814 is coupled to an edge sensitive trigger input on a monostable multivibrator or "one shot" 862. Any circuit that can detect transitions on line 814 and generate a suitable strobe signal for counter 854, latch 866 and flip flop 864 will suffice for purposes of practicing the invention. Each time any transition occurs on line 814, "one shot" 862 generates a pulse on line 854 which causes the current count of counter 854 to be driven onto bus 856. The output pulse of the one shot on line 854 is also connected to the set input of an SR flip flop 864 and the latch or load input of a latch or FIFO 866. Thus, each time a transition occurs on line 814, flip flop 864 is set, and the count in counter 854 is latched into latch or FIFO 866. The Q output of the flip flop 864 is coupled to the IRQ interrupt pin of the PCMCIA bus and causes the interrupt service routine dedicated to the PC card on the host to run. This interrupt service routine knows the address of the latch or FIFO 866 in the shared I/O or memory space of the host and PC card and writes that address onto address lines 868 on the PCMCIA bus. Decoder 870 receives this address and activates an ENABLE signal on line 872 to cause latch or FIFO 866 to drive the data stored therein onto the data lines 874 of the PCMCIA bus for transfer to the barcode image buffer. If a FIFO is used, the next data on the stack in FIFO order that has not already been read by the host is "popped" onto data lines 874. A FIFO is preferred for storage device 866 because it is possible that more than one transition on line 814 can occur before the interrupt service routine executes and unloads the data on data lines 874. A FIFO stack can store more than one count while waiting for the host interrupt service routine to execute.

When the decoder 870 activates the ENABLE signal, the flip flop 864 is reset by virtue of the connection of line 872 to the reset input of the flip flop thereby deactivating the interrupt request until the next strobe pulse on line 854.

In some of the embodiments symbolized by FIGS. 38, 39 or 40, the comparator will be part of the scan engine such that the scan engine puts out a "wand" type signal. A wand signal only has logic 1 or logic 0 levels. It transitions between them in accordance with the light and dark patterns of the barcode. In such embodiments, if the scan engine is not integral with the PC card, the circuitry on the PC card starts with the output line 814 from the comparator in the scan engine.

Referring to FIG. 41, there is shown a block diagram of the preferred embodiment for a PC card which decodes undecoded barcode signals from either an on-board barcode scan engine or an external barcode scan engine and which has on-board nonvolatile flash EEPROM. The circuit of FIG. 41 uses a decoder MPU 900 of the class exemplified by the Hewlett Packard HP 2312 or 2320 series and optionally includes two on-board nonvolatile flash EEPROMs 902 and 904 which are accessible to the host computer. The flash EEPROM is supported by two byte steering circuits 906 and 908. These byte steering circuits are each 8 bit buffers and are present to satisfy the PCMCIA specification's requirement that the flash memory high byte be readable on either the high byte 910 or low byte 912 of data lines on the PCMCIA bus represented by box 914. If it were not for this particular requirement of the PCMCIA specification, these circuits could be eliminated. The high byte of output data from the flash memory appears on bus 916 which is coupled to the data inputs of both steering buffers. Thus, the high byte of data from the flash memory 902 can be latched into either buffer 906 and output on the high byte 910 (pins D15–D8) of the PCMCIA data bus or can be latched into buffer 908 and output on the low byte 912 (pins D7–D0) of the PCMCIA bus. This byte steering function is a function not supported by the Zilog PCMCIA adapter chips such as chip 522 in FIG. 24 and 536 in FIGS. 25 and 26 and anywhere else that a PCMCIA interface circuit for the PC card is called out using that chip. In some cases, that will be acceptable. However, the PCMCIA specification calls for that function, so to be compatible with the specification and software written in compliance therewith, this function will have to be supplied externally to the Zilog chip.

Buffers 906 and 908 are bidirectional, so data can be written into the flash memory 902 through these two buffers or read from flash memory 902 through these buffers. Data is written into or read from the low byte flash memory 904 through the low byte 912 of the PCMCIA data bus. Address information is supplied to the two flash memories 902 and 904 via address bus 918.

Card Info ROM 920 stores the "card information structure" as that term is defined in the PC□MCIA specification.

This is data that defines how the card is organized.

Control register 922 stores two "pacing" signals that are involved in the handshaking protocol for I/O send and receive transactions between the host computer and the PC card. These signals are asserted based upon certain signals on line 924 generated by the decoder MPU 900 and which are stored in a status register 926. The handshaking protocol is dependent upon the particular design of the decoder MPU. However, for the HP 2312 series from Hewlett Packard, the protocol involves the decoder MPU asserting specific one of the three signals on bus 924 at specified times. The host reads the status of these signals in the status register 926 under control of the barcode client or interrupt service routine, and, in response, the host computer 500 under control of the barcode client application or interrupt service routine writes appropriate control signals to control register 922. The handshaking protocol is similar to the request to send and clear to send protocol for serial data transmission via RS232 connections. Further, a Boolean logic combination of the signals stored in the status register 926 and the control register 922 is used to generate the interrupt to the host indicating that a decoded alphanumeric character is ready for delivery to the host. The details of this protocol and interrupt generation will be made more clear later in connection with the discussion of Control and Interrupt Logic 928. Control and Interrupt Logic 928 coordinates interrupts and generates chip select signals to control addressing of various of the registers in implementing interrupts and I/O transactions between the host and the PC card.

A data register 929 stores the alphanumeric character decoded by the decoder MPU 900. This character is written into the data register 929 via a multiplexed data/address bus 930. Register 929 is mapped into the I/O space of the PC card and its base address in the I/O space is determined by the barcode client in accordance with the process described in FIGS. 29A–29C. Upon receiving an interrupt, the host under control of the barcode client will use this base address to address data register 929 and get the decoded character.

A command register 932 stores ASCII commands from the barcode client application on the host that are used to control or modify the way the decoder MPU 900 performs the decoding operation. For example, by sending appropriate strings of ASCII bytes to the decoder MPU 900 through command register 932, the decoder MPU can be controlled so as to add user specified prefixes or suffixes to the data decoded from particular types of barcodes being scanned in aid of some formatting requirements the user may have.

The decoder MPU stores data and/or program information it needs for its operations in a local SRAM 934. Because the decoder 900 does not have enough pins to write the necessary 11 bit address to the address port of the SRAM, an address latch 936 is used to store the lower 8 bits of the address. A separate 3 bit address bus 938 is used to deliver the 3 most significant bits of the address from the decoder to the SRAM address port. To access the SRAM, decoder 900 first writes the lower 8 bits of address on the multiplexed data/address bus 930 and these get latched into the address latch 936 and applied to the SRAM address port via bus 940. Then the decoder 900 puts the upper three bits of address on bus 938 and places any data to be written to the SRAM or receives any data from the SRAM on bus 930. There is a control line 942 that carries a signal from the decoder 900 to the address latch 936 that tells the latch 936 when to latch the address information on bus 930. In other embodiments where a different decoder MPU is used that has sufficient pins for addressing and data, the address latch can be eliminated and possibly separate address and data buses can be used.

A Configuration Option Register 948, a Card Status Register 950 and a Pin Replace Register 952 are all registers required by the PCMCIA specification to allow the Card Service software layer to talk to the PC card. All three of these registers are mapped into the Attribute Space of the PC card. This memory space is zone 2 in FIG. 4 and is also sometimes referred to as the Card Information Services space. These registers are written using memory cycles. The Card Info ROM 920 is also mapped into the Attribute Space. The flash memory chips 902 and 904 are mapped into the memory space, and all the other registers on the PC card are mapped into the I/O space.

The Configuration Option Register 948 stores 6 bits of configuration index data that controls how the PC card is set up. The embodiment of FIG. 41 ignores all but the least significant bit of this 6 bits of data. The least significant bit tells the PC card whether the host computer wants the PC card to be in memory mode or I/O mode. All PC cards are required to start operations in memory mode according to the specification, but I/O mode is more useful for the barcode decoding process. Because the PCMCIA bus pins have different meanings and signal names assigned to them in memory mode versus I/O mode, the least significant bit of the bits stored in the Configuration Option Register 948 tell the circuitry on the PC card what pins on the PCMCIA bus are what signals at any particular time. When the barcode client wants to perform an I/O transaction with the PC card, it calls Card Services and informs it of that fact. Card Services then writes 6 bits of data to the Configuration Option Register 948 with a logic 1 in bit 0. When bit 0 is a logic 1, the Control and Interrupt Logic 928 interprets the signals on the PCMCIA bus with their I/O mode meaning thereby causing the card to function in I/O mode.

The Card Status Register 950 stores data of which only two bits are significant in this embodiment. Bit 1 of this register is used to enable the interrupt to the host. In other words, the host computer can mask interrupts by controlling the logic state of bit 1. If bit 1 is a logic 1, interrupts can be generated by the PC card, but if bit 1 is a logic 0, no interrupts to the host are allowed. The barcode client may also set bit 3 of the Card Status Register 950 if it desires to receive digital audio from the PC card for gating to the host's speaker or other audio transducer for audible feedback to the user while barcodes are being scanned. The decoder MPU 900 generates a digital audio signal on a particular pin when a successful decode has occurred. When bit 3 of the Card Status Register 950 is set and the PC card is in the I/O mode, this digital audio signal is made available on the PCMCIA bus for the host to use. In alternative embodiments, a headphone interface 901 is also provided to receive this digital audio signal and convert it to the proper form for driving headphones plugged into the headphone interface.

The Pin Replace Register 952 stores the memory mode state of certain shared pins on the PCMCIA bus when the PC card is in I/O mode and those pins are used for different signals significant to I/O mode. The most important of these shared pins is the interrupt signal in I/O mode and the RDY/BSY status in memory mode. A pin on the PCMCIA bus carries this RDY/BSY status signal in memory mode, but the same pin is used for the interrupt signal in the I/O mode. To enable determination of the RDY/BSY status of the card when operating in I/O mode, the status of the RDY/BSY pin is written into the Pin Replace Register 952 for use during the I/O mode.

The particular embodiment shown in FIG. 41 has the capability of receiving undecoded barcode signals from either an internal or external barcode scan engine. An integral barcode scan engine 964 which is integrated on or otherwise physically integral with the PC card supplies scan signals on line 966 to one input of the multiplexer 960, while an external barcode scan engine supplies undecoded barcode signals to another input of the multiplexer 960 via line 968. The barcode client controls which of these two signal lines 966 or 968 is coupled to the decoder MPU 900 on signal line via a bit in Control Register 922. The status of this bit is communicated to the switch control input of the multiplexer 960 via line 962.

Because some scan engines have LED's on them that are to be lighted when a successful decode has occurred, an LED buffer amplifier 972 is provided. This amplifier receives and LED feedback signal from the decoder 900 via line 974. The amplifier is necessary in the depicted embodiment, because the decoder MPU output signal is not strong enough to drive a LED located several feet away from the MPU. The amplifier 972 also buffers the MPU from any potentially damaging voltages that might accidently find their way onto line 976.

In an alternative species within the genus represented by FIG. 41, a motion sensor 929 is integrated on the PC card and generates a signal which can be polled or generates and interrupt each time motion is sensed near the PC card. This signal is sent to the barcode client application controlling execution by said host computer through the PCMCIA bus so that the barcode client application can send data to the decoder 900 to cause the input device or barcode scan engine to start scanning. In another alternative embodiment, the signal from the motion sensor is sensed by the Control and Interrupt logic 928 which then generates a signal to cause the internal scan engine 964 or an external scan engine or other input device to start operating. In some embodiments, this triggering action caused by motion will be gated by a bit set in the control register by the barcode client application, i.e., no scanning is started unless the barcode client application says it is ready to receive data from an input device.

In another alternative species of the genus represented by FIG. 41, a conventional hand operated trigger switch mounted on the PC card or connected to the PC card by a cable can be used to control start of scanning. Control of scanning start or start of operation of another input device is by the same processes described above for the motion sensor 929.

Control of the circuitry on the PC card is provided by the Control and Interrupt Logic 928 in accordance with the Boolean logic relationships given in Table 1 below. The below listed control and address signals from the PCMCIA bus and the below listed control signals generated on the PC card are coupled to the Control and Interrupt Logic 928 via data paths 980 and 982. The interrupt generated by the Control and Interrupt Logic 928 is sent to the host via data path 984 under the conditions defined below in Table 1. The chip select signals are not shown on FIG. 41 but are activated under the conditions defined below in Table 1.

TABLE 1

Control and Interrupt Logic Description

SECTION A

The Control and interrupt logic uses the following PCMCIA signals:
A7 through A0--used to address specific I/O and CIS registers
−CE1 and −CE2--help determine PCMCIA transfer type
−OE and −WE/−PGM--help determine PCMCIA transfer type TABLE 1-continued Control and Interrupt Logic Description +RDY/−BSY--prevents access when applying power, and signals interrupt when enabled
+WP--used to signal whether write protection is in effect
−REG--help determine PCMCIA transfer type
BVD1 and BVD2--is used for audio feedback when enabled
−RESET--reset logic
−IORD and −IOWR--help determine PCMCIA transfer type
−INPACK--acknowledge I/O input transfers

SECTION B

In addition, the following signals are used:
−FBSYI and −FBSYO--indicate that flash memory is in use
AUDIO--audio feedback from Decoder MPU
EXTWP--external write protect input, e.g. write-protect switch
−FLASH 1 and −FLASHO--used to select flash memories
−BWR--used to write data to Command register
−BOE--used to read data from Data register
BRESET--used to reset Decoder MPU

SECTION C

Address Decoding is as follows:

| | |
|---|---|
| Card info ROM= | !−REG & !AO & !−OE & !−CE1 & !A7 (64 bytes using A6 to A1) |
| High Flash byte= | (−REG & !−CE2) # (−REG &!−CE1 & −CE2 & AO) |
| Low flash byte= | −REG & !−CE1 & !(−REG & !−CE1 & −CE2 & AO) |
| Write PCMCIA registers= | !−REG & !AO & !−WE & !−CE1 & A7 (3 bytes using A2 and A1) |
| Read PCMCIA registers= | !−REG & !AO & !−OE & !−CE1 & A7 (3 bytes using A2 and A1) |
| Control register= | !−REG & !AO & IOMODE & !−IOWR & !−CE1 & !A1 |
| Status register= | !−REG & !AO & IOMODE & !−IORD & !−CE1 & ! A1 |
| Command register= | !−REG & !AO & IOMODE & !−IOWR & !−CE1 & A1 |
| Data register= | !−REG & !AO & IOMODE & !−IORD & ! −CE1 & A1 |

SECTION D

Interrupt logic is as follows:

| | |
|---|---|
| If IOMODE is false: | RDY=!(!−FBSY1#!−FBSYO) |
| If IOMODE is true: | RDY= (!−BRTS & !RTSMASK & !INTMASK) #(!=BCDY & !BCRD & !INTMASK) #(!=BDDY & !BCWR & !INTMASK) |

Note:
IOMODE is bit zero of the Config Option register.
Note:
INTMASK is a unique control register bit, RTSMASK is a unique control register bit. −BRTS, −BCRD, and −BDWR are status bits generated by the Decoder MPU. −BCDY, and −BDDY are unique control register bits read by the Decoder MPU to pace the command and data transfers.

Section A of Table 1 defines the address (A7–A0) and control signals on the PCMCIA bus 914 which are coupled to the Control and Interrupt Logic 928. The definitions of the various control signals is given more completely in the PCMCIA specifications incorporated by reference herein. The control signals in Section B of Table 1 are not PCMCIA signals but are signals generated by the circuitry on the PCMCIA card that are also used by the Control and Interrupt logic to generate interrupt and chip select signals at the appropriate times. The Boolean Logic equations in Section C of Table 1 define the logic in the Control and Interrupt logic 928 to activate the chip select inputs of the circuit elements listed on the left side of Section C. In Section C, & represents the Boolean AND function, ! represents the Boolean NOT function and # represents the Boolean OR function. For example, when the combination of signals listed on the first line of Section C results in a true result when their current logic states are combined in accordance with the Boolean logic functions listed on the first line, the chip select of the Card Info ROM is activated and the ROM can be read.

The Boolean equations of Section D represent the signals and Boolean logic functions which control when an interrupt to the host is generated by the PC card. The first line of Section D defines the combination of signals that control the state of the RDY/BSY pin on the PCMCIA bus during memory mode when this pin indicates the ready for access or busy-no access state of the flash EEPROM. The second line of Section D pertains to what combination of signals when combined using the Boolean functions given on that line in I/O mode which will result in an interrupt being generated.

The Computer Program Listing Appendix included herein on compact disc, hereby incorporated by reference, provides a C language source code listing of an exemplary communication program for execution on the host computer for communicating with the decoder MPU 900 in FIG. 41; an exemplary barcode assembly language support program for providing the runtime environment for the C code that is linked to the C code before compiling to make an executable program; an exemplary card service program or a Card Service client application which is useful for debugging the PC card; and a program for programming a gate array logic chip so as to provide proper control for the decoder MPU 900 if the HP 2210 type decoder chip is used.

Although the invention has been described in terms of the preferred and alternative embodiments disclosed herein, those skilled in the art will appreciate other alternative embodiments that do not depart from the spirit and scope of the teachings of the invention. All such embodiments are intended to be included within the scope of the claims appended hereto.

What is claimed is:

1. A computing system with improved data entry capabilities, comprising:

a portable host computer having a connection for an expansion card, the connection selected from the group consisting of a slot or docking bay; and an expansion card engaged within said connection and having first interface circuit for interfacing said expansion card to a data input device, second interface circuit interfacing said expansion card to said host computer through an electrical connector in said connection, and expansion memory accessible by the host computer.

2. The system of claim 1 further comprising expansion nonvolatile memory on said expansion card which is interfaced to said host computer by said second interface circuit and to which said host computer can write data or program instructions and from which said host computer can retrieve data or program instructions.

3. A computing system according to claim 1 wherein the portable host computer is selected from the group consisting of a personal digital assistant, a handheld computer or a personal communicator.

4. A system for waking up a barcode scanning circuit on a PCMCIA card upon detection of motion, comprising:

a PCMCIA card having a control circuit and a barcode scanner thereon and having a window out which light to illuminate a barcode is emitted;

a motion sensor having a beam generator and structured to emit a motion sensing beam out said window and structured to transmit a motion sensed signal to said control circuit when motion is sensed;

a power source;

a switch controlled by said control circuit to couple said power source to said barcode scanner when said motion sensed signal is received.

5. A system for starting a barcode scanning process upon detection of motion, comprising:

a handheld host computer having a PCMCIA card slot with a PCMCIA bus therein and programmed with a barcode client application and programmed with PCMCIA card driver software;

a PCMCIA card engaged in said PCMCIA slot and having an on-board barcode scan engine and an input for receiving undecoded barcode signals from an external barcode scanning device and a multiplexer under control of said barcode client application for selecting barcode signals from said on-board barcode scan engine or an external barcode scan engine and a decoder coupled to decode the selected barcode scan signals into one or more alphanumeric characters and storing said characters in a memory, and having interface circuitry to interface said PCMCIA card to said host computer under control of said barcode client application and said PCMCIA card driver software, and having a motion sensor which generates a motion sensed signal which is detected by said host by polling or interrupt through said PCMCIA bus each time motion is sensed;

and wherein said barcode client application, upon detection of said motion sensed signal, sends data to said PCMCIA card to cause a barcode scanning process carried out by the selected barcode scan engine to begin.

6. A system for, upon detection of motion, waking up a data input device that feeds data into an expansion module for engaging into an externally accessible expansion bay of a handheld, portable host computer, comprising:

an expansion module configured to mechanically and electrically engage an expansion bay of a handheld, portable computing device, said expansion module having a control means for controlling said expansion module and having a data input device either mounted on said expansion module or coupled thereto via a port;

a motion sensor having a beam generator and structured to emit a motion sensing beam to detect motion in the vicinity of said expansion module, and structured to transmit a motion sensed signal to said control circuit when motion is sensed;

a power source;

a switch controlled by said control circuit to couple said power source to said data input device when said motion sensed signal is received.

7. A system for, upon detection of motion, starting a data inputting process by an expansion module engaged in an expansion bay of a handheld, portable host computer, comprising:

a handheld, portable host computer having an expansion bay with an expansion bus therein and programmed with a client application suitable for the type of data input device on or coupled to any expansion module engaged by said expansion bay and programmed with expansion module driver software;

an expansion module engaged said expansion bay and coupled to an input device capable of gathering data from objects in the vicinity of said input device and storing said data in a memory, and having interface circuitry to interface said expansion module to said host computer under control of said client application and said expansion module driver software, and having a motion sensor which generates a motion sensed signal which is detected by said host by polling or interrupt through said expansion bus each time motion is sensed;

and wherein said client application, upon detection of said motion sensed signal, controls said host computer to send data to said expansion module to cause a data gathering process carried out by said input device to begin.

8. A process carried out between a host computer and a PCMCIA card inserted therein to detect insertion into said host computer of a PCMCIA card that has functionality said host does not have and further includes expansion memory for the host and processing to interface the PCMCIA card functionality including on-board expansion memory on said PCMCIA card to said host computer such that data can be retreived from the PCMCIA card without block access by said host computer to said expansion memory, comprising the steps of:

launching a barcode client application and registering said client application with a card services registry;

detecting insertion of a PCMCIA card;

assigning to said PCMCIA card an interrupt number and a base address for registers in said PCMCIA card in the I/O space of said host computer and getting this base address and interrupt number information to said barcode client application;

passing the interrupt number of said PCMCIA card and a starting address of an interrupt service routine that processes interrupts to retrieve barcode data from said PCMCIA card to the operating system of said host computer, and storing said base address of said PCMCIA card in a memory location known to said interrupt service routine, and storing said interrupt number and interrupt service routine starting address in an interrupt vector table maintained by said operating system;

retrieving barcode information from said PCMCIA card using said interrupt service routine and I/O cycles and storing and retrieving data from said expansion memory using memory cycles.

9. A scanning system comprising a handheld host computer comprised of a handheld unit, personal data assistant, or palmtop computer;

a plug-in peripheral having a housing, a card-shaped section, and a data reading system disposed in said housing, said host computer having a slot for accepting the card-shaped section of the plug-in peripheral;

an open system interface for providing communication between the peripheral and the host computer, wherein the plug-in peripheral includes on-board non-volatile memory available for use by the host.

* * * * *

UNITED STATES PATENT AND TRADEMARK OFFICE

CERTIFICATE OF CORRECTION

PATENT NO. : 6,923,377 B2
APPLICATION NO. : 10/365713
DATED : September 20, 2005

INVENTOR(S) : Joel R. Postman, George B. Miller and Ronald C. Fish

It is certified that error appears in the above-identified patent and that said Letters Patent is hereby corrected as shown below:

Drawing Sheet 2
FIG. 3 for element “DATA BUS” change element numeral “50” to --54--.

On Title Page Item -57-
Abstract
Line 10, after “input device” change “which” to --with--.

Column 3
Line 24, change “have” to --having--.

Column 7
Line 9, add --is-- after “which”.
Line 52, delete comma after “II”.

Column 9
Line 29, insert --42-- after “on line”.

Column 9
Line 51, change “bus 50” to --bus 54--.

Column 10
Line 18, change “data bus 50” to --data bus 54--.
Line 60, change “buses 52 and 50” to --buses 52 and 54--.
Line 67, change “buses 50 and 52” to --buses 54 and 52--.

Column 13
Line 53, after “immediately” change “set” to --sets--.

Column 17
Line 50, between “function” and “serving”, change “as” to --of--.

Column 18
Line 57, in “line,189” replace comma with a space.

Column 19
Line 10, after “PDA” change “fail” to --fails--.
Lines 10-11, before “quickly” delete “can”.
Line 52, before “suitable” change “generated” to --generate--.

UNITED STATES PATENT AND TRADEMARK OFFICE

CERTIFICATE OF CORRECTION

PATENT NO. : 6,923,377 B2
APPLICATION NO. : 10/365713
DATED : September 20, 2005
INVENTOR(S) : Joel R. Postman, George B. Miller and Ronald C. Fish It is certified that error appears in the above-identified patent and that said Letters Patent is hereby corrected as shown below:

Column 20
Line 8, insert --be-- between "can" and "processed".

Column 21
Line 66, change "devices" to --device--.

Column 22
Line 56, change "show" to --shown--.

Column 27
Line 52, change "PtA's" to --PIA's--.

Column 31
Line 11, delete sole "a".
Line 48, change "manufacturers" to --manufacturer--.

Column 32
Line 27, add --from-- after "available".

Column 33
Line 55, add --of-- after "type".

Column 35
Line 39, add --to-- after "adapted".

Column 36
Line 60, delete "to" after "ready".

Column 41
Line 52, change "cards" to --card--.
Line 62, add --is-- after "This".

Column 43
Line 14, change "clients" to --client's--.

Column 44
Line 57, replace hyphen with a space.

Column 45
Line 50, replace hyphen with a space.

CERTIFICATE OF CORRECTION

PATENT NO. : 6,923,377 B2
APPLICATION NO. : 10/365713
DATED : September 20, 2005

INVENTOR(S) : Joel R. Postman, George B. Miller and Ronald C. Fish

It is certified that error appears in the above-identified patent and that said Letters Patent is hereby corrected as shown below:

Column 46
Line 23, delete “the” after “of”.

Column 49
Line 16, change “or” after “some” to --of--.

Column 51
Line 7, insert --any-- between “be” and “commercially”.
Line 26, after “115” change “the” to --that--.

Column 52
Line 8 change “may” to --made--.

Column 54
Line 67, change “PC□MCIA” to --PCMCIA--.

Column 57
Line 2, before “barcode scanner” change “integral” to --internal--.
Line 15, before “LED” change “and” to --an--.

Column 57
Line 24, between “generates” and “interrupt” change “and” to --an--.

Column 60
Line 62, change “engaged” to --engaging--.

Signed and Sealed this

Fifteenth Day of May, 2007

JON W. DUDAS
*Director of the United States Patent and Trademark Office*

UNITED STATES PATENT AND TRADEMARK OFFICE

CERTIFICATE OF CORRECTION

PATENT NO. : 6,923,377 B2
APPLICATION NO. : 10/365713
DATED : August 2, 2005

INVENTOR(S) : Joel R. Postman, George B. Miller and Ronald C. Fish

It is certified that error appears in the above-identified patent and that said Letters Patent is hereby corrected as shown below:

Drawing Sheet 2
FIG. 3 for element “DATA BUS” change element numeral “50” to --54--.

On Title Page Item -57-
Abstract
Line 10, after “input device” change “which” to --with--.

Column 3
Line 24, change “have” to --having--.

Column 7
Line 9, add --is-- after “which”.
Line 52, delete comma after “II”.

Column 9
Line 29, insert --42-- after “on line”.

Column 9
Line 51, change “bus 50” to --bus 54--.

Column 10
Line 18, change “data bus 50” to --data bus 54--.
Line 60, change “buses 52 and 50” to --buses 52 and 54--.
Line 67, change “buses 50 and 52” to --buses 54 and 52--.

Column 13
Line 53, after “immediately” change “set” to --sets--.

Column 17
Line 50, between “function” and “serving”, change “as” to --of--.

Column 18
Line 57, in “line,189” replace comma with a space.

Column 19
Line 10, after “PDA” change “fail” to --fails--.
Lines 10-11, before “quickly” delete “can”.
Line 52, before “suitable” change “generated” to --generate--.

UNITED STATES PATENT AND TRADEMARK OFFICE

CERTIFICATE OF CORRECTION

PATENT NO. : 6,923,377 B2
APPLICATION NO. : 10/365713
DATED : August 2, 2005
INVENTOR(S) : Joel R. Postman, George B. Miller and Ronald C. Fish It is certified that error appears in the above-identified patent and that said Letters Patent is hereby corrected as shown below:

Column 20
Line 8, insert --be-- between “can” and “processed”.

Column 21
Line 66, change “devices” to --device--.

Column 22
Line 56, change “show” to --shown--.

Column 27
Line 52, change “PtA’s” to --PIA’s--.

Column 31
Line 11, delete sole “a”.
Line 48, change “manufacturers” to --manufacturer--.

Column 32
Line 27, add --from-- after “available”.

Column 33
Line 55, add --of-- after “type”.

Column 35
Line 39, add --to-- after “adapted”.

Column 36
Line 60, delete “to” after “ready”.

Column 41
Line 52, change “cards” to --card--.
Line 62, add --is-- after “This”.

Column 43
Line 14, change “clients” to --client’s--.

Column 44
Line 57, replace hyphen with a space.

Column 45
Line 50, replace hyphen with a space.

UNITED STATES PATENT AND TRADEMARK OFFICE

CERTIFICATE OF CORRECTION

PATENT NO. : 6,923,377 B2
APPLICATION NO. : 10/365713
DATED : August 2, 2005
INVENTOR(S) : Joel R. Postman, George B. Miller and Ronald C. Fish It is certified that error appears in the above-identified patent and that said Letters Patent is hereby corrected as shown below:

Column 46
Line 23, delete “the” after “of”.

Column 49
Line 16, change “or” after “some” to --of--.

Column 51
Line 7, insert --any-- between “be” and “commercially”.
Line 26, after “115” change “the” to --that--.

Column 52
Line 8 change “may” to --made--.

Column 54
Line 67, change “PC□MCIA” to --PCMCIA--.

Column 57
Line 2, before “barcode scanner” change “integral” to --internal--.
Line 15, before “LED” change “and” to --an--.

Column 57
Line 24, between “generates” and “interrupt” change “and” to --an--.

UNITED STATES PATENT AND TRADEMARK OFFICE

CERTIFICATE OF CORRECTION

PATENT NO. : 6,923,377 B2
APPLICATION NO. : 10/365713
DATED : August 2, 2005
INVENTOR(S) : Joel R. Postman, George B. Miller and Ronald C. Fish It is certified that error appears in the above-identified patent and that said Letters Patent is hereby corrected as shown below:

Column 60
Line 62, change "engaged" to --engaging--.

This certificate supersedes Certificate of Correction issued May 15, 2007.

Signed and Sealed this

Fifth Day of June, 2007

JON W. DUDAS
*Director of the United States Patent and Trademark Office*